United States Patent
Kimura et al.

(10) Patent No.: US 11,582,674 B2
(45) Date of Patent: Feb. 14, 2023

(54) COMMUNICATION DEVICE, COMMUNICATION METHOD AND DATA STRUCTURE

(71) Applicant: SONY CORPORATION, Tokyo (JP)

(72) Inventors: Ryota Kimura, Tokyo (JP); Hiroaki Takano, Tokyo (JP); Hirofumi Kasai, Tokyo (JP); Ryo Sawai, Tokyo (JP); Fumio Teraoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 85 days.

(21) Appl. No.: 17/048,567

(22) PCT Filed: Mar. 20, 2019

(86) PCT No.: PCT/JP2019/011677
§ 371 (c)(1),
(2) Date: Oct. 16, 2020

(87) PCT Pub. No.: WO2019/208033
PCT Pub. Date: Oct. 31, 2019

(65) Prior Publication Data
US 2021/0160756 A1 May 27, 2021

(30) Foreign Application Priority Data
Apr. 24, 2018 (JP) .............................. JP2018-083102

(51) Int. Cl.
*H04W 40/02* (2009.01)
*H04W 12/08* (2021.01)
*H04W 16/26* (2009.01)

(52) U.S. Cl.
CPC ........... *H04W 40/02* (2013.01); *H04W 12/08* (2013.01); *H04W 16/26* (2013.01)

(58) Field of Classification Search
CPC ..... H04W 40/02; H04W 12/08; H04W 16/26; H04W 12/06; H04W 40/22; H04W 40/34;
(Continued)

(56) References Cited

U.S. PATENT DOCUMENTS

2015/0236948 A1* 8/2015 Dunbar ................... H04L 45/22
370/225
2017/0339110 A1* 11/2017 Ni ......................... H04L 47/2483
(Continued)

FOREIGN PATENT DOCUMENTS

| JP | 2016-046736 A | 4/2016 |
| JP | 2016-149729 A | 8/2016 |
| JP | 2018-033016 A | 3/2018 |

OTHER PUBLICATIONS

Halpern, et al., "Service Function Chaining (SFC) Architecture", Internet Engineering Task Force (IETF), RFC 7665, Oct. 2015, 32 pages.
(Continued)

*Primary Examiner* — Jamal Javaid
*Assistant Examiner* — Shawn D Miller
(74) *Attorney, Agent, or Firm* — Chip Law Group

(57) ABSTRACT

A communication device is provided that makes a single or a plurality of functions desired by a service user act on a packet desired by the service user in a service for transferring a packet in a network. A communication device is provided that includes a communication unit that communicates with another node and a control unit that controls the communication by the communication unit, in which the control unit generates path information with a target node, and in the path information with the target node, at least information regarding communication with at least a single relay node that exists between the communication device and the target node, information regarding a function to be
(Continued)

performed by the relay node, and content of processing according to the function execution result by the relay node are written.

15 Claims, 48 Drawing Sheets

(58) Field of Classification Search
CPC ....... H04L 45/127; H04L 45/54; H04L 45/64; H04L 63/0892
See application file for complete search history.

(56) References Cited

U.S. PATENT DOCUMENTS

2018/0091410 A1* 3/2018 Browne .............. H04L 41/5009
2018/0227221 A1* 8/2018 Starsinic ............. H04L 45/306

OTHER PUBLICATIONS

International Search Report and Written Opinion of PCT Application No. PCT/JP2019/011677, dated Jun. 11, 2019, 06 pages of ISRWO.

* cited by examiner

FIG. 7A

| Type = AF Setup Request |
| --- |
| Requester App ID = PID-p1 |
| AF Credential = Cred-p1-af1 |
| AF Node IP Address = IP-afn1 |
| AF File Name = FName-af1 |
| AF Parameters = Params-af1 |

FIG. 7B

| Type = AF Setup Response |
| --- |
| Requester App ID = PID-p1 |
| Status = OK |
| AF ID = AF-1 |
| AF Session Key = SKey-p1-af1 |
| AFC Daemon Data Port = DPt-afcd1 |
| Time to Live = TTL-p1 |

FIG. 8A

| Type = AF AA Request |
| --- |
| Requester App ID = PID-p1 |
| AF Credential = Cred-p1-af1 |
| AF Node IP Address = IP-afn1 |
| AF File Name = FName-af1 |

FIG. 8B

| Type = AF AA Response |
| --- |
| Requester App ID = PID-p1 |
| Status = OK |

FIG. 9A

| Type = AFC Daemon Invoke Request |
|---|
| Requester App ID = PID-p1 |

FIG. 9B

| Type = AFC Daemon Ready Indication |
|---|
| Requester App ID = PID-p1 |
| Status = OK |
| AFC Daemon Data Port = DPt-afcd1 |
| AFC Daemon Control Port = CPt-afcd1 |

FIG. 9C

| Type = AFC Daemon Invoke Response |
|---|
| Requester App ID = PID-p1 |
| Status = OK |
| AFC Daemon Data Port = DPt-afcd1 |
| AFC Daemon Control Port = CPt-afcd1 |

FIG. 10A

| Type = AF Invoke Request |
|---|
| Requester App ID = PID-p1 |
| AF Session Key = SKey-p1-af1 |
| AF File Name = FName-af1 |
| AF Parameters = Params-af1 |

FIG. 10B

| Type = AF Invoke Response |
|---|
| Requester App ID = PID-p1 |
| Status = OK |
| AF ID = AF-1 |

FIG. 16A

| Type = AF Setup Request |
|---|
| Requester App ID = PID-p1 |
| AF Credential = Cred-p1-af1-2 |
| AF Node IP Address = IP-afn1 |
| AF File Name = FName-af1-2 |
| AF Parameters = Params-af1-2 |

FIG. 16B

| Type = AF Setup Response |
|---|
| Requester App ID = PID-p1 |
| Status = OK |
| AF ID = AF-1-2 |
| AF Session Key = SKey-p1-af1-2 |
| AFC Daemon Data Port = DPt-afcd1 |
| Time to Live = TTL-p1 |

FIG. 17A

| Type = AF AA Request |
|---|
| Requester App ID = PID-p1 |
| AF Credential = Cred-p1-af1-2 |
| AF Node IP Address = IP-afn1 |
| AF File Name = FName-af1-2 |

FIG. 17B

| Type = AF AA Response |
|---|
| Requester App ID = PID-p1 |
| Status = OK |

FIG. 18A

| |
|---|
| Type = AF Invoke Request |
| Requester App ID = PID-p1 |
| AF Session Key = SKey-p1-af1-2 |
| AF File Name = FName-af1-2 |
| AF Parameters = Params-af1-2 |

FIG. 18B

| |
|---|
| Type = AF Invoke Response |
| Requester App ID = PID-p1 |
| Status = OK |
| AF ID = AF-1-2 |

FIG. 19

Requester Table

| |
|---|
| Ptr to Next Requester Table = [null] |
| Requester App ID = PID-p1 |
| Time to Live = TTL-p1 |
| Ptr to AF Node Table = |

AF Node Table

| |
|---|
| Ptr to Next AF Node Table = [null] |
| AF Node IP Address = IP-afn1 |
| AFC Daemon Data Port = DPt-afcd1 |
| AFC Daemon Control Port = CPt-afcd1 |
| Ptr to AF Table = |

AF Table

| |
|---|
| Ptr to Next AF Table = |
| AF File Name = FName-af1 |
| AF ID = AF-1 |
| AF Session Key = SKey-p1-af1 |

AF Table

| |
|---|
| Ptr to Next AF Table = [null] |
| AF File Name = FName-af1-2 |
| AF ID = AF-1-2 |
| AF Session Key = SKey-p1-af1-2 |

FIG. 23A

| |
|---|
| Type = AF Delete Request |
| Requester App ID = PID-p1 |
| AF Node IP Address = IP-afn1 |
| AF ID = AF-1-2 |
| AF Certificate = Cert-p1-af1-2 |

FIG. 23B

| |
|---|
| Type = AF Delete Response |
| Requester App ID = PID-p1 |
| Status = OK |
| AF ID = AF-1-2 |

FIG. 24A

| |
|---|
| Type = AF Stop Request |
| Requester App ID = PID-p1 |
| AF ID = AF-1-2 |
| AF Certificate = Cert-p1-af1-2 |

FIG. 24B

| |
|---|
| Type = AF Stop Response |
| Requester App ID = PID-p1 |
| Status = OK |
| AF ID = AF-1-2 |

| Type = AF Delete Response |
| Requester App ID = PID-p1 |
| Status = OK |
| AF ID = AF-1 |

| Type = AF Stop Request |
| Requester App ID = PID-p1 |
| AF ID = AF-1 |
| AF Certificate = Cert-p1-af1 |

| Type = AF Stop Response |
| Requester App ID = PID-p1 |
| Status = OK |
| AF ID = AF-1 |

| Type = AFC Timeout Extend Request |
| Requester App ID = PID-p1 |
| AF ID = AF-1 |
| AF Certificate = Cert-p1-af1 |
| Time to Live = TTL-p1-2 |

| Type = AFC Timeout Extend Response |
| Requester App ID = PID-p1 |
| Status = OK |

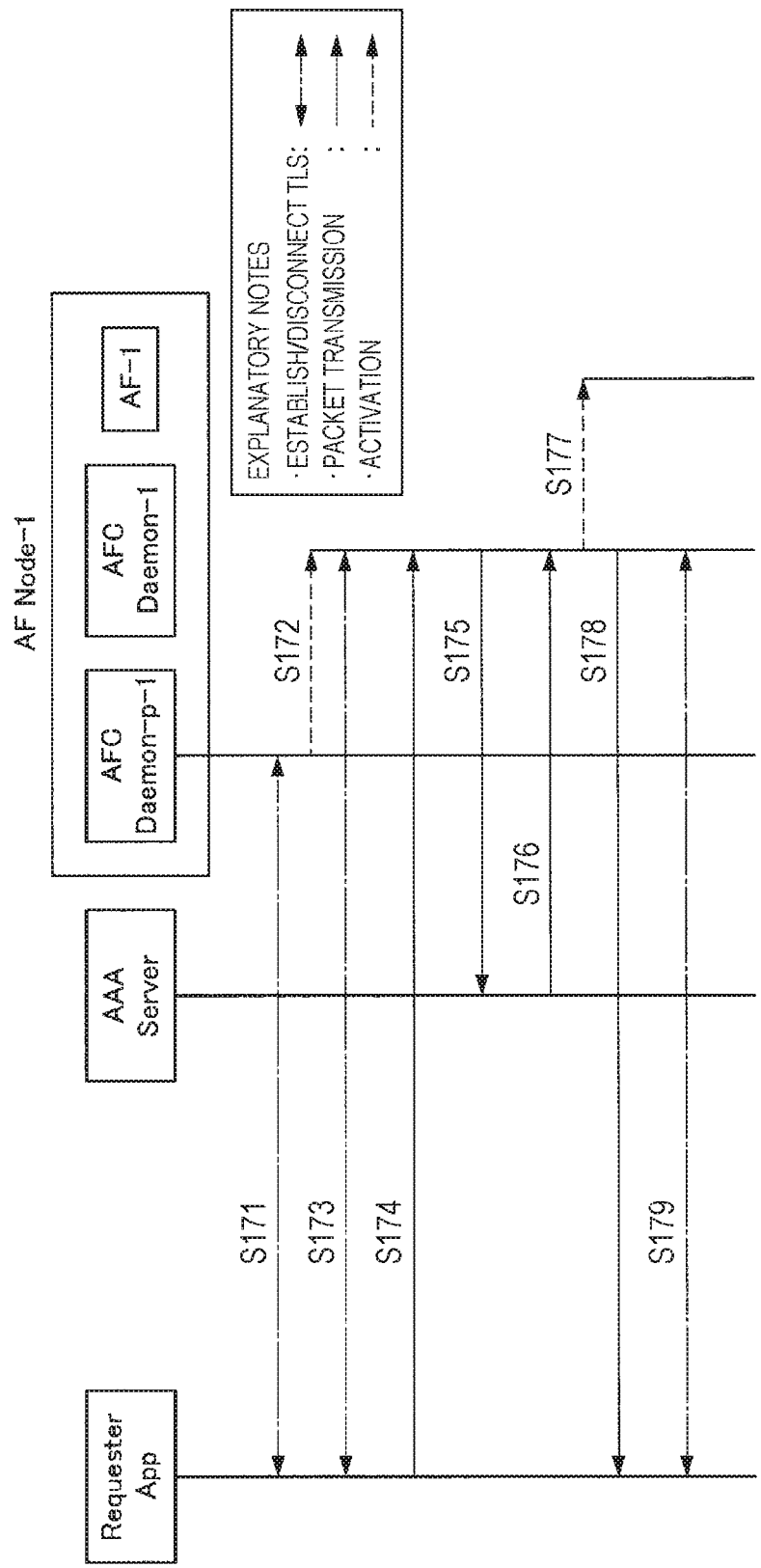

COMMUNICATION DEVICE, COMMUNICATION METHOD AND DATA STRUCTURE

CROSS REFERENCE TO RELATED APPLICATIONS

This application is a U.S. National Phase of International Patent Application No. PCT/JP2019/011677 filed on Mar. 20, 2019, which claims priority benefit of Japanese Patent Application No. JP 2018-083102 filed in the Japan Patent Office on Apr. 24, 2018. Each of the above-referenced applications is hereby incorporated herein by reference in its entirety.

TECHNICAL FIELD

The present disclosure relates to a communication device, a communication method, a data structure, and a computer program.

From a viewpoint of network providers and service providers, to transfer a packet that is transferred in a network as necessary to a server device that is not included in an original packet transfer path and to make the packet act a Service Function (SF) that operates in the server device are referred to Service Function Chaining (SFC). Examples of the SF include a Network Address Translation (NAT), a Load Balancer, a Web Application Firewall (WAF), or the like.

Non-Patent Document 1 describes an SFC architecture. Furthermore, Patent Document 1 describes a method for autonomously and dispersively detecting and recovering a failure in a device or a link in order to enhance availability of a virtualized network service function.

CITATION LIST

Patent Document

Patent Document 1: Japanese Patent Application Laid-Open No. 2016-46736

Non-Patent Document

Non-Patent Document 1: J. Halpern and C. Pignataro. Service Function Chaining (SFC) Architecture, October 2015, RFC 7665.

SUMMARY OF THE INVENTION

Problems to be Solved by the Invention

In the SFC, the SFs such as a WAF, a Load Balancer, or the like are prepared from a viewpoint of the network providers and the service providers. That is, a type of a packet to be subject to the SFC is determined depending on intention of the network providers and the service providers.

Therefore, in the present disclosure, a novel and improved communication device, communication method, data structure, and computer program that can make a single or a plurality of functions desired by a service user act on a packet desired by the service user in a service for transferring a packet in a network are proposed.

Solutions to Problems

According to the present disclosure, a communication device is provided that includes a communication unit that communicates with another node and a control unit that controls the communication by the communication unit, in which the control unit generates path information with a target node, and in the path information with the target node, at least information regarding communication with at least a single relay node that exists between the communication device and the target node, information regarding a function to be performed by the relay node, and content of processing according to the function execution result by the relay node are written.

Furthermore, according to the present disclosure, a communication device is provided that includes a communication unit that communicates with another node and a control unit that controls the communication by the communication unit, in which the control unit determines whether the communication device is a target node or a relay node by referring to path information transmitted from the other node, when the communication device is the target node, the control unit transfers a packet received from the other node to an application in an upper layer, and when the communication device is the relay node, the control unit makes a function of the communication device act on the packet received from the other node on the basis of information written in the path information and executes processing on the basis of content written in the path information according to a result of performing the function.

Furthermore, according to the present disclosure, a data structure is provided that is used in a communication device including a communication unit that communicates with another node and a control unit that controls the communication by the communication unit, in which, as path information between the communication device and a target node, at least the path information between the communication device and the target node includes at least information regarding communication with at least a single relay node that exists between the communication device and the target node, information regarding a function performed by the relay node, and content of processing according to a result of performing the function by the relay node.

Furthermore, according to the present disclosure, a communication method is provided that includes communicating with another node and controlling the communication with the other node, in which the control of the communication with the other node includes generation of path information with a target node, and in the path information with the target node, at least information regarding at least a single relay node that exists between a communication device and the target node, information regarding a function to be performed by the relay node, and content of processing according to a result of performing the function by the relay node are written.

Furthermore, according to the present disclosure, a communication method is provided that includes communicating with another node and controlling the communication with the other node, in which the control of the communication with the other node includes to determine whether a device is a target node or a relay node by referring to path information transmitted from the other node, when the device is the target node, a packet received from the other node is transferred to an application in an upper layer as the control of the communication with the other node, and when the device is the relay node, a function included in the device is made to act on the packet received from the other node on the basis of information written in the path information, and processing is executed on the basis of the content written in the path information according to the execution result of the function, as the control of the communication with the other node.

Furthermore, according to the present disclosure, a computer program for causing a computer to execute processing is provided that includes communicating with another node and controlling the communication with the other node, in which the control of the communication with the other node includes generation of path information with a target node, and in the path information with the target node, at least information regarding at least a single relay node that exists between a communication device and the target node, information regarding a function to be performed by the relay node, and content of processing according to a result of performing the function by the relay node are written.

Furthermore, according to the present disclosure, a computer program for causing a computer to execute processing is provided that includes communicating with another node and controlling the communication with the other node, in which the control of the communication with the other node includes to determine whether a device is a target node or a relay node by referring to path information transmitted from the other node, when the device is the target node, a packet received from the other node is transferred to an application in an upper layer as the control of the communication with the other node, and when the device is the relay node, a function included in the device is made to act on the packet received from the other node on the basis of information written in the path information, and processing is executed on the basis of the content written in the path information according to the execution result of the function, as the control of the communication with the other node.

Effects of the Invention

As described above, according to the present disclosure, it is possible to provide a novel and improved communication device, communication method, data structure, and computer program that can make a single or a plurality of functions desired by a service user act on a packet desired by the service user in a service for transferring a packet in a network.

Note that the above effects are not necessarily limited, and any effect that has been described in the present specification or other effect which may be found from the present specification may be obtained together with or instead of the above effects.

BRIEF DESCRIPTION OF DRAWINGS

FIG. 7A is an explanatory diagram illustrating an example of a format of a message.

FIG. 7B is an explanatory diagram illustrating an example of the format of the message.

FIG. 8A is an explanatory diagram illustrating an example of the format of the message.

FIG. 8B is an explanatory diagram illustrating an example of the format of the message.

FIG. 9A is an explanatory diagram illustrating an example of the format of the message.

FIG. 9B is an explanatory diagram illustrating an example of the format of the message.

FIG. 9C is an explanatory diagram illustrating an example of the format of the message.

FIG. 10A is an explanatory diagram illustrating an example of the format of the message.

FIG. 10B is an explanatory diagram illustrating an example of the format of the message.

FIG. 16A is an explanatory diagram illustrating an example of the format of the message.

FIG. 16B is an explanatory diagram illustrating an example of the format of the message.

FIG. 17A is an explanatory diagram illustrating an example of the format of the message.

FIG. 17B is an explanatory diagram illustrating an example of the format of the message.

FIG. 18A is an explanatory diagram illustrating an example of the format of the message.

FIG. 18B is an explanatory diagram illustrating an example of the format of the message.

FIG. 19 is an explanatory diagram illustrating an exemplary structure of the table.

FIG. 23A is an explanatory diagram illustrating an example of the format of the message.

FIG. 23B is an explanatory diagram illustrating an example of the format of the message.

FIG. 24A is an explanatory diagram illustrating an example of the format of the message.

FIG. 24B is an explanatory diagram illustrating an example of the format of the message.

FIG. 31 is a flowchart illustrating an example of the AF setting processing.

MODE FOR CARRYING OUT THE INVENTION

Figure 1:
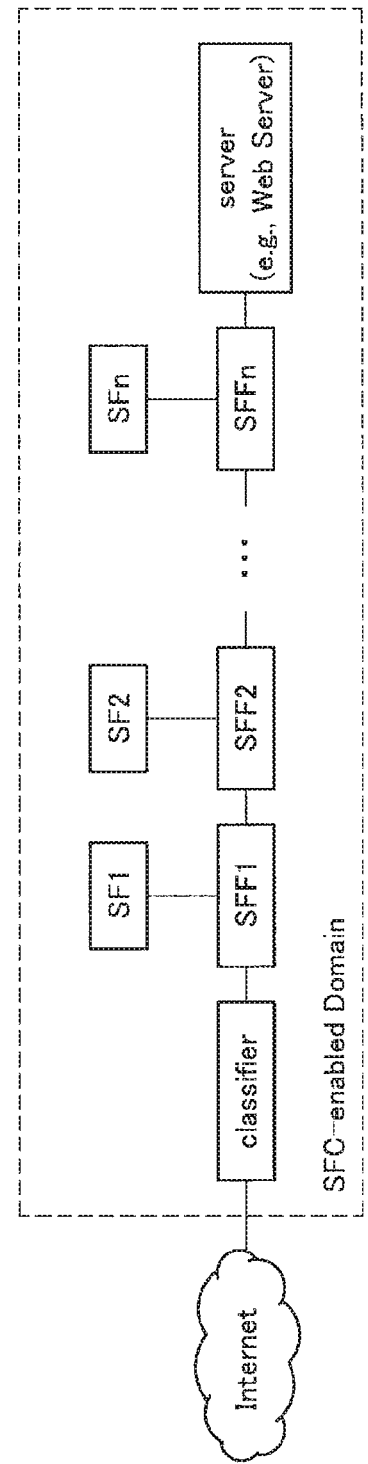
FIG. 1 is an SFC architecture example disclosed in Non-Patent Document 1.

Hereinafter, preferred embodiments of the present disclosure will be described in detail with reference to the accompanying drawings. Note that, in the present specification and the drawings, components having substantially the same functional configuration are denoted with the same reference numeral so as to omit redundant description.

Note that the description will be made in the following order.

1. Embodiment of The Present Disclosure
1.1. SFC Architecture Example
1.2. Specific Explanation of AFC
1.3. Exemplary Functional Configuration of Communication Device
2. Summary

1. Embodiment of The Present Disclosure

1.1. SFC Architecture Example

Before describing the embodiment of the present disclosure in detail, first, an SFC architecture example will be described. FIG. 1 is an SFC architecture example disclosed in Non-Patent Document 1.

In the SFC architecture illustrated in FIG. 1, a range to which SFC is applied is referred to as an SFC-enabled Domain. A classifier, a service function forwarder (SFF), a service function (SF), a server, or the like exist in the SFC-enabled Domain.

A case of an access from the Internet to a Web server in FIG. 1 is considered. A packet that enters the SFC-enabled Domain from the Internet first reaches the classifier. The classifier determines which SF is applied to this packet from a header of the packet, inserts the information into the packet as a Network Service Header (NSH), and then relays the packet. For example, a case is assumed where only an SF1 is applied to this packet.

When an SFF1 receives this packet, recognizes that the SF1 is applied to this packet from content of the NSH, and transfers this packet to the SF1. The SF1 processes this packet and returns the packet to the SFF1. The SFF1 transfers this packet to an SFF2. Since only the SF1 is applied to the packet in this example, an SFFn simply relays this packet from the SFF2, and this packet finally reaches the Web server.

In the SFC having such an architecture, an SF such as a WAF, a Load Balancer, or the like is prepared from the viewpoint of network providers and service providers. That is, a type of a packet to be subject to the SFC is determined depending on intention of the network providers and the service providers.

On the other hand, an architecture to be desired below is used to make one or a plurality of functions desired by a service user act on a packet desired by the service user in a service that transfers a packet in a network. In the present embodiment, such an architecture is referred to as Application Function Chaining (AFC), and the function made to act in the AFC architecture is referred to as an Application Function (AF).

1.2. Specific Explanation of AFC (Assumed Environment)

The AF is assumed to be provided to users by the network providers and the service providers. For example, it is assumed that the network provider release a list indicating specifications of the AF (function, input format, and output format), a name of a node in which the AF is installed (may be one or more), specifications of the node in which the AF operates, usage fees, or the like on a Web or the like to the outside. Moreover, a user may install an AF created by the user in a node specified by the user. As described above, it is assumed that the user recognizes what kind of AF is installed to which node in advance. Various AF functions are assumed. For example, in a case where the service provider provides a service for distributing a moving image from a server to a client, conversion of a bit rate of the moving image to be distributed, conversion of a resolution of the moving image, or the like are considered.

An application that requests setting or deletion of the AF is referred to as a Requester Application, and a node in which the Requester Application operates is referred to as a Requester Node. A process for transmitting data to be applied to an AFC is referred to as a Sender Application, and a node in which the Sender Application operates is referred to as a Sender Node. A process for receiving a packet from the Sender Application via the AFC is referred to as a Receiver Application, and a node in which the Receiver Application operates is referred to as a Receiver Node. In a case of bidirectional communication, each of the both processes serves as the Sender Application and the Receiver Application. There is a case where the Sender Application serves as the Requester Application, and there is a case where the Receiver Application serves as the Requester Application.

A node in which the AF operates is referred to as an AF Node. In the present embodiment, an AFC Manager is introduced as a function for managing the setting and the deletion of the AF. The AFC Manager has a fixed port number (well-known port) for control communication. Note that, in the present embodiment, a procedure in a case where the AFC Manager is not introduced is considered.

As a function for authenticating and authorizing whether the Requester Application has an authority for using the AF, an Authentication, Authorization and Accounting (AAA) server is introduced. The AAA server has a well-known port for control communication. In the present embodiment, an example in which the AF Node and the AFC Manager operate in individual nodes is indicated. However, the AFC Manager and the AAA server may operate in the Sender Node, the Receiver Node, or the AF Node.

An operation of the AFC is as follows. First, the Requester Application sets an AF desired to be used to an AF Node desired to be used. For example, it is assumed that an AF-1, an AF-2, and an AF-3 be respectively set to an AF Node-1, an AF Node-2, and an AF Node-3. A case is assumed where the Requester Application serves as the Sender Application. The Sender Application may select any one of the AF-1, the AF-2, and the AF-3 that have already been set, use the AF-1, the AF-2, and the AF-3 in any order, and configure the AFC. For example, the order may be an order of Sender Application→AF-1→AF-2→AF-3→Receiver Application or an order of Sender Application→AF3→AF-1→Receiver Application. In this way, a logical communication path between the Sender Application, the AF-1, the AF-2, the AF-3, and the Receiver Application is not established (that is, connectionless type) by the setting of the AF, and the AFC is realized by specifying an AF to be passed through to a header of a data packet at the time of data transmission.

It is assumed that a secure communication path can be established between the Requester Application and the AFC Manager. It is assumed that the AFC Manager and the AAA server have a trust relationship and a secure communication path exist between the AFC Manager and the AAA server. It is assumed that the AFC Manager and the AF Node have a trust relationship and a secure communication path exist between the AFC Manager and the AF Node.

It is assumed that a daemon process called an AFC Daemon-p operate in an AFC Node. The AFC Daemon-p has a well-known port for control communication. The AFC Daemon-p activates an AFC Daemon that is a child process in response to a request from the Requester Application. The AFC Daemon executes subsequent processing related to the AFC. Note that, in a case where the AFC Manager is not introduced, it is assumed that a Transport Layer Security (TLS) connection can be established between the Requester Application, the AFC Daemon-p, and the AFC Daemon-p. In the AF Node, the AFC Daemon receives a data packet from the Sender Application or another AF Node and inputs a data portion of the data packet to the AF. The AF processes the data and outputs the result to the AFC Daemon. A first byte of the output from the AF is assumed to indicate a termination state (normal, abnormal, or the like) of the AF processing. The AFC Daemon packetizes the data received from the AF and transmits the packetized data to an AF Node at the next stage or the Receiver Application.

Figure 2:
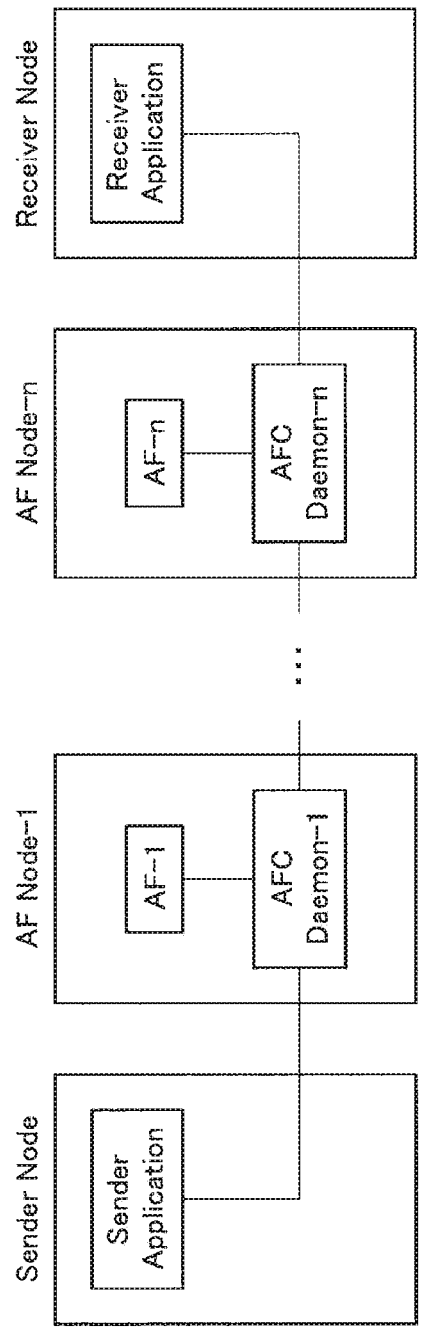
FIG. 2 is an explanatory diagram illustrating an example of a shape of an AFC.
Figure 3:
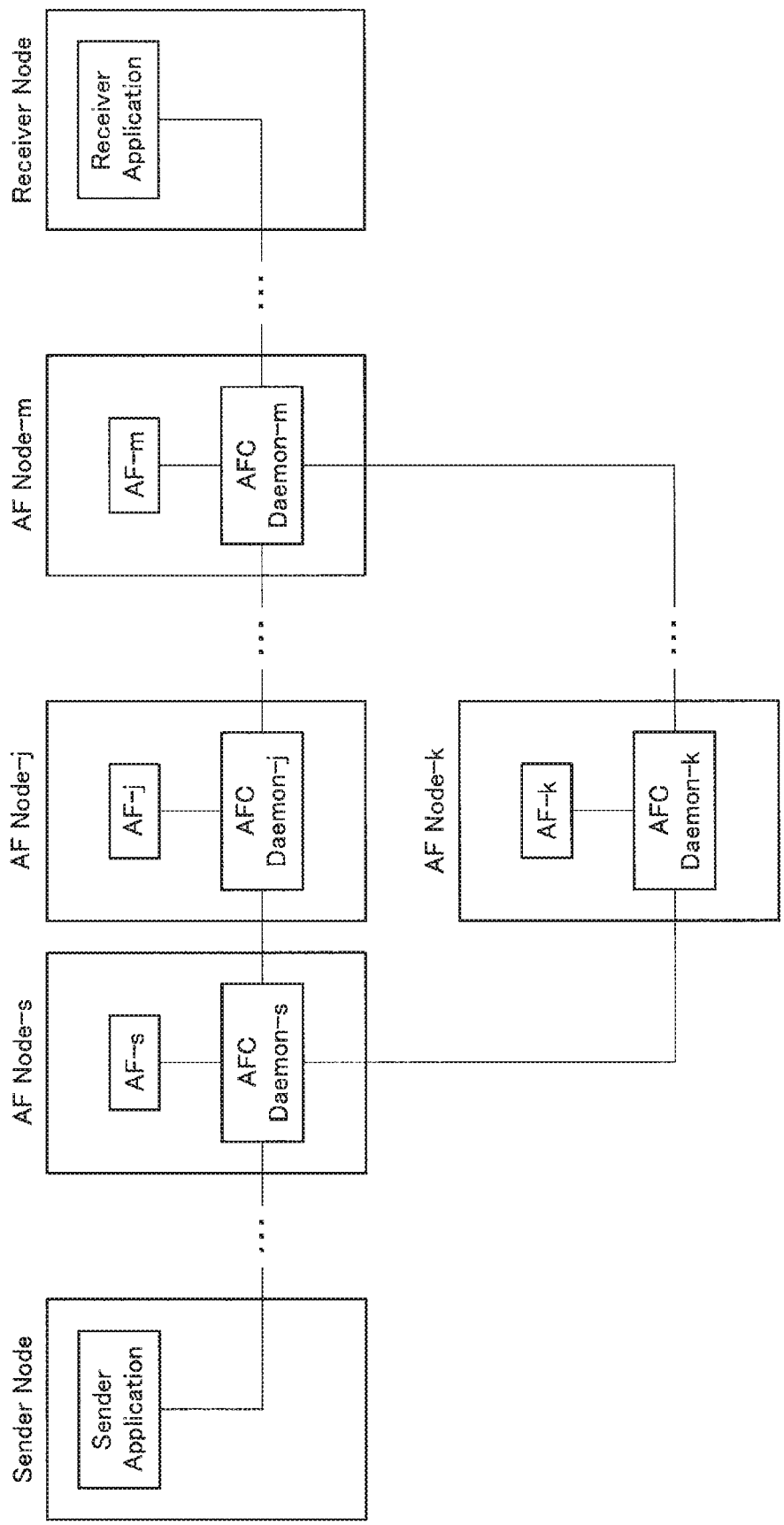
FIG. 3 is an explanatory diagram illustrating an example of the shape of the AFC.
Figure 4:
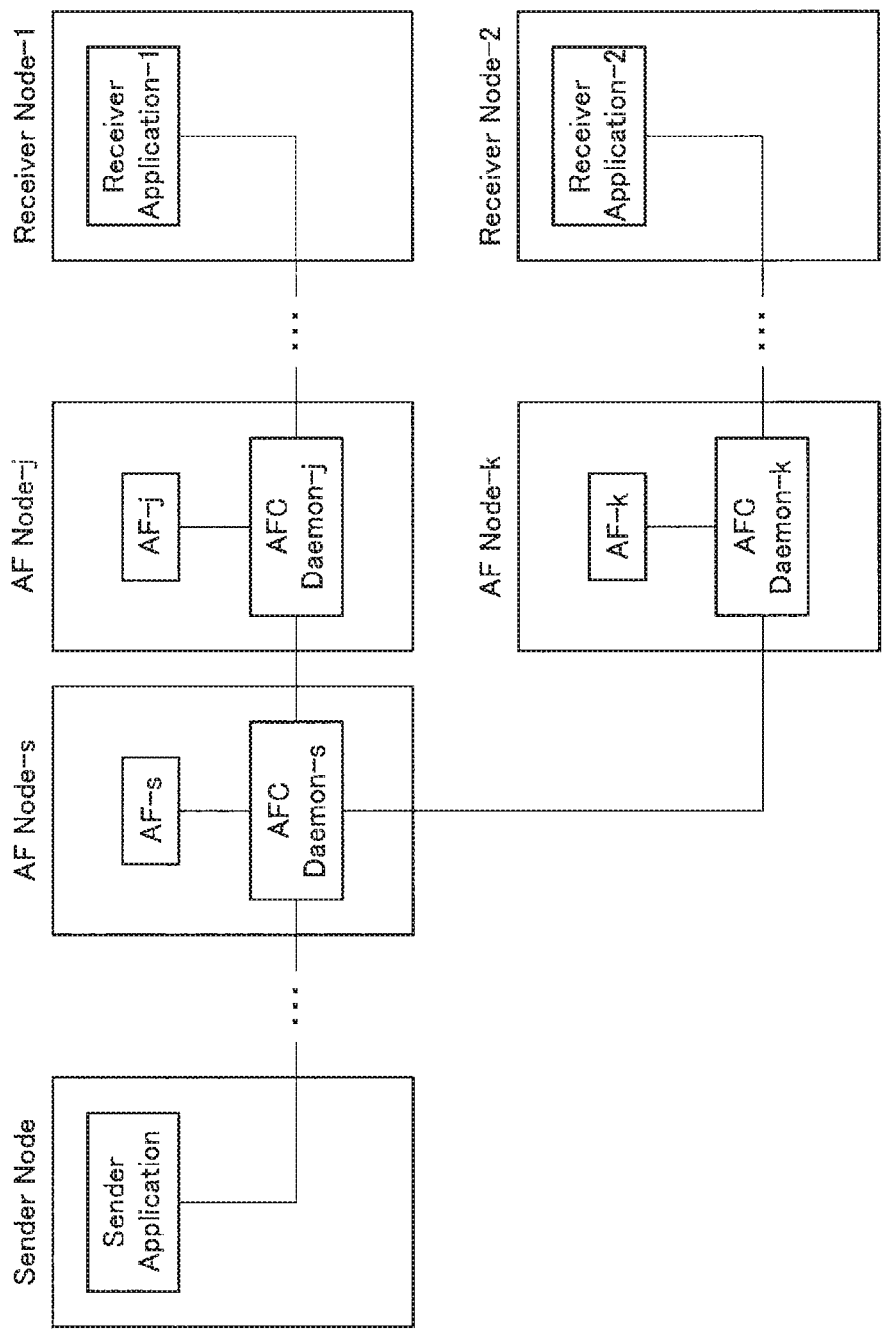
FIG. 4 is an explanatory diagram illustrating an example of the shape of the AFC.
Figure 5:
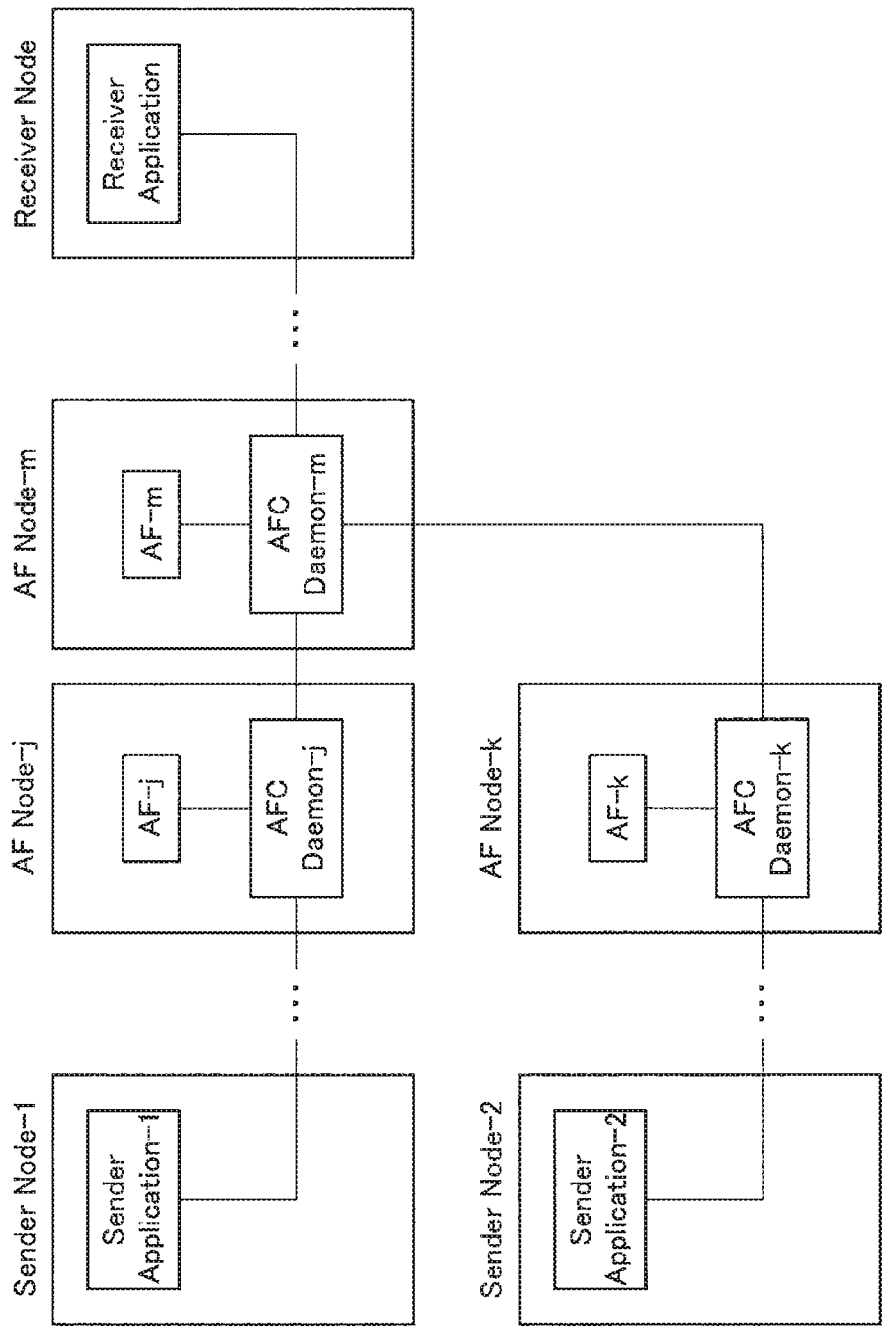
FIG. 5 is an explanatory diagram illustrating an example of the shape of the AFC.

Four types of shapes of the AFC illustrated in FIGS. 2 to 5 are considered. Note that, in FIGS. 2 to 5, the description of the AFC Daemon-p is omitted. FIG. 2 illustrates a shape in which one or more AFs and the Receiver Application are linearly connected from the Sender Application. FIG. 3 illustrates a shape in which the AFC branches at the AF in the middle and joins at another AF. This is a shape in which an AF to be applied in the subsequent processing is selected according to the termination state of the AF processing and a pair of the Sender Application and the Receiver Application can finally communicate with each other. In this example, a case is illustrated where the AFC branches at the single AF and joins at the single AF. However, a plurality of times of branching and joining may be performed. Furthermore, the AFC may branch or join at any AF. FIG. 4 illustrates a shape in which a plurality of Receiver Applications exists with respect to the single Sender Application. This is a shape in which, although multicast is performed from the Sender Application to the plurality of Receiver Applications, the AF to be applied can be selected for each Receiver Application. In this example, a case is indicated in which the number of Receiver Applications is two. However, the number of Receiver Applications may be equal to or more than three. Furthermore, the AFC may branch at any AF. FIG. 5 illustrates a shape in which the single Receiver Application exists with respect to the plurality of Sender Applications. This is a shape in which there is a plurality of data sources as sensors, the AF to be applied can be selected for each data source, and the single Receiver Application can finally collect data. In this example, a case is indicated in which the number of Sender Applications is two. However, the number of Sender Applications may be equal to or more than three. Furthermore, the AFC may join at any AF. In the above example, the single AF operates in the single AF Node. However, the plurality of AFs may operate in the single AF Node.

(Authentication Authorization)

In the present embodiment, processing for confirming that a specific AF Node has an authority for executing a specific AF by the Requester Application is referred to as AF authentication authorization. The Requester Application holds an AF Credential for the AF authentication authorization. The AF Credential is, for example, an identifier of a user who uses the Requester Application, a password, or the like. The AFC Manager confirms validity of the AF Credential by inquiring the AAA server. The AAA server has a well-known port for control communication. When the validity is confirmed, the AFC Manager generates a SKey that is a session key that is shared with the Requester Application and the AFC Daemon and notifies the Requester Application and the AFC Daemon of the generated key. Note that, in a case where the AFC Manager is not introduced, the AF authentication authorization processing is executed by making an inquiry to the AAA server by the AFC Daemon, and the AFC Daemon generates the SKey.

In a case where the Requester Application serves as the Sender Application, in the subsequent AFC communication, the Sender Application includes an AF Certificate in a data packet to be transmitted as information indicating that the AF authentication authorization processing has been executed. The AF Certificate is a hash value obtained by applying the SKey combined with data included in a specific field of a data packet to be transmitted to a predetermined hash function. When receiving the data packet including the AF Certificate from the Sender Application, the AFC Daemon applies the hash function obtained by combining the SKey shared with the Sender Application with the data included in the specific field of the packet and confirms whether or not the result coincides with the AF Certificate included in the packet. When the result coincides with the AF Certificate, it can be confirmed that the AF authentication authorization has already been executed on the Sender Application.

In a case where a unit other than the Requester Application serves as the Sender Application, it is assumed that the Requester Application transmit the SKey to the Sender Application via the secure communication path.

(Message Fields)

Information exchanged between the Requester Application, the AFC Manager, the AAA server, and the AFC Daemon for setting or deletion of the AF is referred to as a message. The message used in the present embodiment has fields below.

A Type field holds a type of the message. A Requester App ID field holds an identifier of the Requester Application. An AF Credential field, an AF Session Key field, and an AF Certificate field hold the above described information regarding the authentication authorization processing. A Time to Live field holds an effective time of the AF. An AF Node IP Address field holds an IP address of the AF Node. An AF File Name field holds a name of an AF executable file. An AF Parameters field holds a parameter when the AF is activated. An AF ID field holds an identifier assigned to the AF. An AFC Daemon Data Port field holds a port number of the AFC Daemon for data communication. An AFC Daemon Control Port field holds a port number of the AFC Daemon for control communication. A Status field holds a processing result.

(AFC Header Fields)

A data packet using the AFC includes an IP header, a UDP header, an AFC header, and user data. The AFC header used in the present embodiment has fields below.

A Sender App ID field holds an identifier of the Sender Application that has transmitted the data packet. A Sequence Number field holds a sequence number of the data packet. A No of AFs field holds the number of AFs to be applied to the user data in the AFC. An AF Index field holds a number of the AF that is currently to be processed, and a first AF is indicated by zero. For each AF, six fields exist, i.e., an AF Node IP Address field, an AFC Daemon Data Port field, an AF ID field, an AF Certificate field, a Next Index Length field, and a Next Index field. An AF Node IP Address field holds an IP address of the AF Node. An AFC Daemon Data Port field holds a port number of the AFC Daemon for data communication. The AF ID field holds an identifier of the AF. The AF Certificate field holds the AF Certificate described above. The Next Index Length field holds a length of the subsequent Next Index field. The Next Index field includes one or more pairs of "conditional expression" and "index", and a first pair is indicated by zero. In a case where the result of applying a conditional expression to a first one-byte value of the output of the AF is "true", an AF or Receiver Application indicated by an index is selected as a next stage. Note that, in a case where the index value is equal to or larger than a value of the No of AFs field, it is assumed to indicate the Receiver Application. A Sender Node IP Address field holds an IP address of the Sender Node. A Sender App Data Port field holds a port number of the Sender Application for data communication. A No of Recv App field holds the number of Receiver Applications. For each Receiver Application, two fields including a Receiver Node IP Address field and a Receiver App Data Port field exist. The Receiver Node IP Address field holds an IP address of the Receiver Node. The Receiver App Data Port field holds a port number of the Receiver Application for data communication. A No of Applied AFs field holds the number of AFs applied to this packet. A List of Applied AFs field holds a list of identifiers of the AF applied to this packet. By referring to the List of Applied AFs field by the "conditional expression" included in the Next Index field, it is possible to select an AF at the next stage according to the number and a combination of the applied AFs.

(Table Held by AFC Manager)

The AFC Manager holds a Requester Table for each Requester Application.

The Requester Table has fields below. A Ptr to Next Requester Table field holds a pointer used to manage the plurality of Requester Tables as a list. A Requester App ID field holds an identifier of the Requester Application that sets the AFC. A Time to Live field holds an effective time of the AFC. A Ptr to AF Node Table holds a pointer indicating an AF Node Table used to manage the AF Node in which the AF set by the Requester Application operates.

The AF Node Table has fields below. A Ptr to Next AF Node Table field holds a pointer used to manage the plurality of AF Node Tables as a list. An AF Node IP Address field holds an IP address of the AF Node. An AFC Daemon Data Port field holds a port number of the AFC Daemon for data communication. An AFC Daemon Control Port field holds a port number of the AFC Daemon for control communication. A Ptr to AF Table holds a pointer indicating an AF Table used to manage the AF set by the Requester Application.

The AF Table has fields below. A Ptr to Next AF Table field holds a pointer used to manage the plurality of AF Tables as a list. An AF File Name field holds a name of an AF executable file. An AF ID field holds an identifier of the AF. An AF Session Key field holds the AF Session Key described above.

(Table Held by AFC Daemon) The AFC Daemon holds a Requester Table for each Requester Application. A Ptr to Next Requester Table field holds a pointer used to manage the plurality of Requester Tables as a list. A Requester App ID field holds an identifier of the Requester Application that sets the AFC. A Ptr to AF Table holds a pointer indicating an AF Table used to manage the AF set by the Requester Application. Note that, in a case where the AFC Manager is not introduced, the Requester Table further has a Time to Live field and holds the effective time of the AFC.

The AF Table has fields below. A Ptr to Next AF Table field holds a pointer used to manage the plurality of AF Tables as a list. An AF File Name field holds a name of an AF executable file. An AF ID field holds an identifier of the AF. An AF In Port field holds a port number used to input data to the AF. An AF Out Port field holds a port number used to receive the output data of the AF. An AF Session Key field holds the AF Session Key described above. A Ptr to Seq Num Table field holds a pointer indicating a Seq Num Table used to manage a sequence number of the data packet. The Seq Num Table is created for each Sender Application. A Sender App ID field holds the identifier of the Sender Application. To cope with Replay Attack, the Sequence Number field holds a sequence number of a data packet that is most recently received. A Ptr to Next Seq Num Table field holds a pointer used to manage the plurality of Seq Num Tables as a list.

(Table Held by Requester Application)

The Requester Application holds an AFC Table. A Requester ID field holds its own identifier. A Time to Live field holds an effective time of the AFC. A Ptr to AF Table holds a pointer indicating an AF Table used to manage the AF set by the Requester Application.

The AF Table has fields below. A Ptr to Next AF Table field holds a pointer used to manage the plurality of AF Tables as a list. An AF File Name field holds a name of an AF executable file. An AF ID field holds an identifier of the AF. An AF Node IP Address field holds an IP address of the AF Node. An AFC Daemon Data Port field holds a port number of the AFC Daemon for data communication. An AF Session Key field holds the AF Session Key described above. A Sequence Number field holds a sequence number of the data packet. When the data packet is transmitted, in a case where the plurality of AF Tables exists, an AF Table having the largest value in the Sequence Number field is selected, and a value obtained by incrementing the value in the Sequence Number field is stored in the Sequence Number field of each AF Table and is stored in the Sequence Number field of the data packet.

(Example of AF Setting Processing (1))

Figure 6:
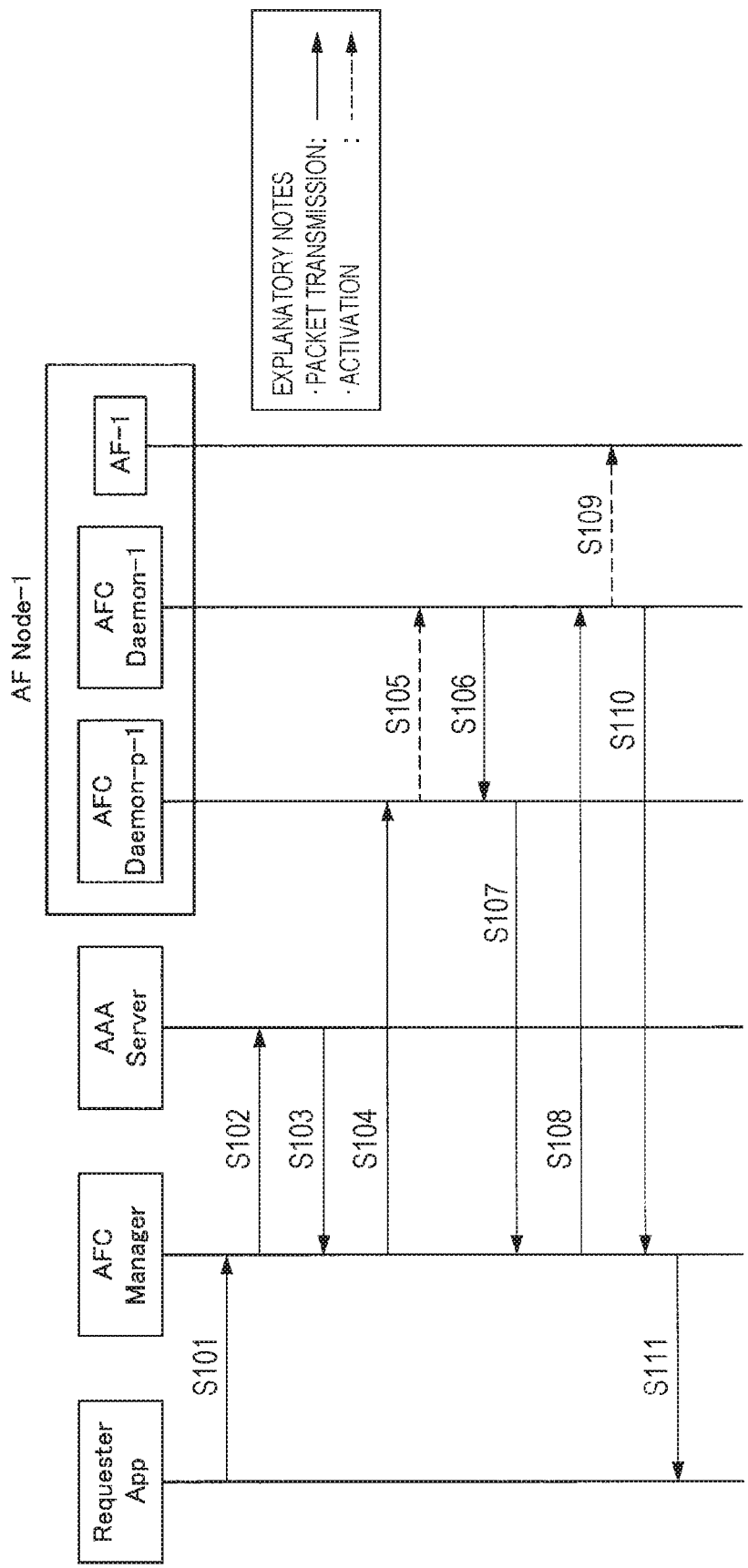
FIG. 6 is a flowchart illustrating an example of AF setting processing.

Next, a procedure for setting the AF by the Requester Application will be indicated. This example is a case where the Requester Application sets the AF for the first time and also a case where the AFC Manager does not execute processing on another Requester Application. FIG. 6 is a flowchart illustrating an example of AF setting processing. FIG. 6 illustrates an example in which the Requester Application activates the AF-1 in the AF Node-1. In this example, the identifier of the Requester Application is assumed to be PID-p1. Furthermore, an IP address of the AF Node-1 is assumed to be IP-afn1. Furthermore, a name of the AF-1 executable file is assumed to be FName-af1, and a parameter when the file is executed is assumed to be Params-af1. Authentication authorization information for setting the AF-1 in the AF Node-1 by the Requester Application is assumed to be Cred-p1-af1.

Note that each of the AFC Manager, the AAA server, and the AFC Daemon-p performs communication by using the port for control communication that is the well-known port thereof. The AFC Daemon performs communication by using a port for control communication that is created at the time of activation. A port used by the Requester Application depends on the Requester Application.

The Requester Application generates an AF setting request message illustrated in FIG. 7A. A value of the Type field is AF Setup Request. A value of the Requester App ID field is PID-p1. A value of the AF Credential field is Cred-p1-af1. A value of the AF Node IP Address field is IP-afn1. A value of the AF Fille Name field is FName-af1. A value of the AF Parameters field is Params-af1. Next, the Requester Application transmits the generated AF setting request message to the AFC Manager (step S101).

When receiving the AF setting request message, the AFC Manager searches for the list of the Requester Tables held by the AFC Manager using the value in the Requester App ID field as a key. At this time, since the corresponding Requester Table is not found, the AFC Manager recognizes that the message is a first AF setting request packet from the Requester Application. Next, in order to check whether or not the Requester Application has an authority for executing the AF, the AFC Manager generates an AF authentication authorization request message illustrated in FIG. 8A. A value of the Type field is AF AA Request. A value of the Requester App ID field is PID-p1. A value of the AF Credential field is Cred-p1-af1. A value of the AF Node IP Address field is IP-afn1. A value of the AF File Name field is FName-af1. Next, the AFC Manager transmits the AF authentication authorization request message to the AAA server (step S102).

When receiving the AF authentication authorization request message, the AAA server confirms that the Requester Application has the authority for executing the AF-1 in the AF Node-1 from the value of the AF Credential field and generates an AF authentication authorization response message illustrated in FIG. 8B. A value of the Type field is AF AA Response. A value of the Requester App ID field is PID-p1. A value of the Status field is OK that indicates success. Next, the AAA server transmits the AF authentication authorization response message to the AFC Manager (step S103).

Figures 11, 12:
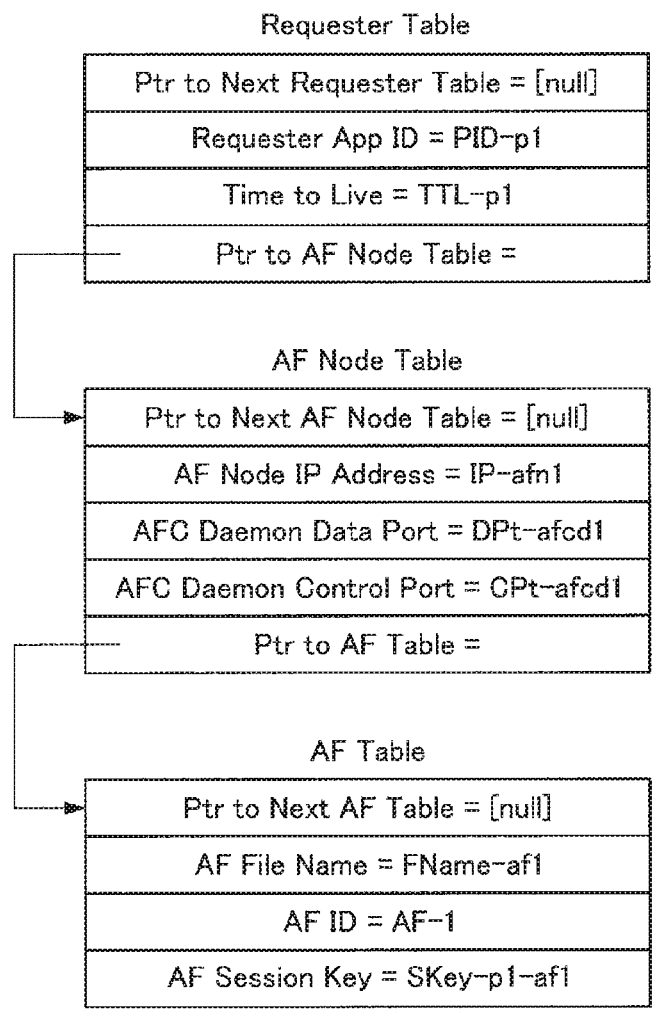
FIG. 11 is an explanatory diagram illustrating an exemplary structure of a table.
FIG. 12 is an explanatory diagram illustrating an exemplary structure of the table.

When receiving the AF authentication authorization response message, the AFC Manager creates the Requester Table illustrated in FIG. 11 and connects the created table to the list of the Requester Tables. A value of the Ptr to Next Requester Table is [null]. A value of the Requester App ID field is PID-p1. A value of the Time to Live field is unknown at this time point. A value of the Ptr to AF Node Table is [null]. Because the AFC Manager recognizes that the AFC Daemon for the Requester Application does not operate yet in the AF Node (AF Node-1) indicated by the AF Node IP Address field of the AF setting request message, the AFC Manager generates an AFC Daemon activation request message illustrated in FIG. 9A. A value of the Type field is AFC Daemon Invoke Request. A value of the Requester App ID field is PID-p1. Next, the AFC Manager transmits an AFC Daemon activation request message to an AFC Daemon-p-1 that operates in the AF Node-1 (step S104).

When receiving the AFC Daemon activation request message, the AFC Daemon-p-1 activates an AFC Daemon-1 (step S105).

The AFC Daemon-1 generates a data communication port DPt-afcd1 and a control communication port CPt-afcd1. Next, an AFC Daemon Ready notification message illustrated in FIG. 9B is generated. A value of the Type field is AFC Daemon Ready Indication. A value of the Requester App ID field is PID-p1. A value of the Status field is OK that indicates success. A value of the AFC Daemon Data Port field is DPt-afcd1. A value of the AFC Daemon Control Port field is CPt-afcd1. Next, the AFC Daemon-1 transmits the AFC Daemon Ready notification message to the AFC Daemon-p-1 (step S106).

When receiving the AFC Daemon Ready notification message, the AFC Daemon-p-1 generates an AFC Daemon activation response message illustrated in FIG. 9C. A value of the Type field is AFC Daemon Invoke Response. A value of the Requester App ID field is PID-p1. A value of the Status field is OK that indicates success. A value of the AFC Daemon Data Port field is DPt-afcd1. A value of the AFC Daemon Control Port field is CPt-afcd1. Next, the AFC Daemon-p-1 transmits the AFC Daemon activation response message to the AFC Manager (step S107).

When receiving the AFC Daemon activation response message, the AFC Manager generates a session key SKey-p1-af1 that proves that the Requester Application has an authority for using the AF-1 in the AF Node-1. The Requester Application and the AFC Daemon-1 share the SKey-p1-af1. Next, the AFC Manager generates an AF activation request message illustrated in FIG. 10A. A value of the Type field is AF Invoke Request. A value of the Requester App ID field is PID-p1. A value of the AF Session Key field is SKey-p1-af1. A value of the AF File Name field is FName-af1. A value of the AF Parameters field is Params-af1. Next, the AFC Manager transmits the AF activation request message to the AFC Daemon-1 (step S108).

When receiving the AF activation request message, the AFC Daemon-1 activates an executable file specified by the AF File Name field as an AF (step S109). At this time, parameters specified by the AF Parameters field are used. When the AF is activated, a standard input and a standard output of the AF are connected to the AFC Daemon-1. A port number to make an input to the AF is assumed to be InPt-af1, and a port number that receives the output from the AF is assumed to be OutPt-af1. Furthermore, AF-1 is given to the activated AF as an identifier.

After activating the AF, the AFC Daemon-1 generates an AF activation response message illustrated in FIG. 10B. A value of the Type field is AF Invoke Response. A value of the Requester App ID field is PID-p1. A value of the Status field is OK that indicates success. A value of the AF ID field is AF-1. Next, the AFC Daemon-1 transmits the AF activation response message to the AFC Manager (step S110).

When receiving the AF activation response message, the AFC Manager determines TTL-p1 as an effective time of the AF set by the Requester Application. Next, the AFC Manager generates an AF setting response message illustrated in FIG. 7B. A value of the Type field is AF Setup Response. A value of the Requester App ID field is PID-p1. A value of the Status field is OK that indicates success. A value of the AF ID field is AF-1. A value of the AF Session Key field is SKey-p1-af1. A value of the AFC Daemon Data Port field is DPt-afcd1. A value of the Time to Live field is TTL-p1. Next, the AFC Manager transmits the AF setting response message to the Requester Application (step S111).

After the above processing, the AFC Manager holds a table illustrated in FIG. 12. In the Requester Table, a value of the Ptr to Next Requester Table field is [null]. A value of the Requester App ID field is PID-p1. A value of the Time to Live field is TTL-p1. The Ptr to AF Node Table indicates the AF Node Table for the AF Node-1.

In the AF Node Table, a value of a Ptr to Next AF Node Table is [null]. A value of the AF Node IP Address field is IP-afn1. A value of the AFC Daemon Data Port field is DPt-afcd1. A value of the AFC Daemon Control Port field is CPt-afcd1. A Ptr to AF Table field indicates the AF Table for the AF-1.

In the AF Table, a value of a Ptr to Next AF Table is [null]. A value of the AF File Name field is FName-af1. A value of the AF ID field is AF-1. A value of the AF Session Key field is SKey-p1-af1.

Figure 13:
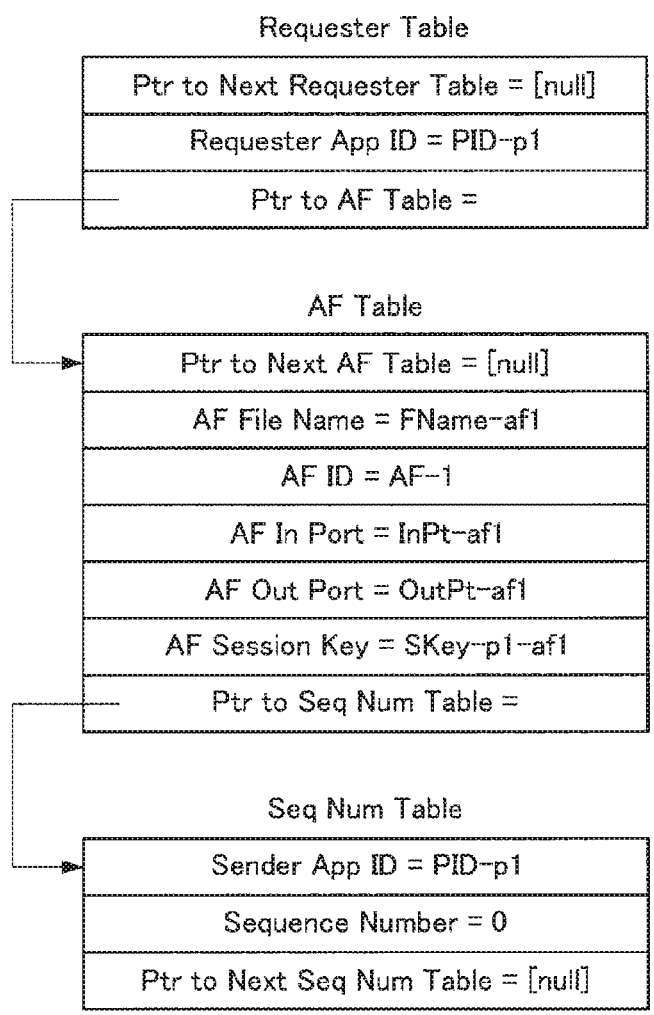
FIG. 13 is an explanatory diagram illustrating an exemplary structure of the table.

An AF Daemon-1 holds a table illustrated in FIG. 13. In the Requester Table, a value of the Ptr to Next Requester Table field is [null]. A value of the Requester App ID field is PID-p1. A value of the Ptr to AF Table field is a pointer indicating the AF Table for the AF-1.

In the AF Table, a value of the Ptr to Next AF Table field is [null]. A value of the AF File Name field is FName-af1. A value of the AF ID field is AF-1. A value of the AF In Port field is InPt-af1. A value of the AF Out Port field is OutPt-af1. A value of the AF Session Key field is SKey-p1-af1. A value of the Ptr to Seq Num Table field is a pointer indicating the Seq Num Table.

In the Seq Num Table, it is assumed that the Requester Application serve as the Sender Application, and the value of the Sender App ID field is PID-p1 that is the identifier of the Requester Application. A value of the Sequence Number field is a specific initial value (for example, zero). A value of the Ptr to Next Seq Num Table field is [null].

Figure 14:
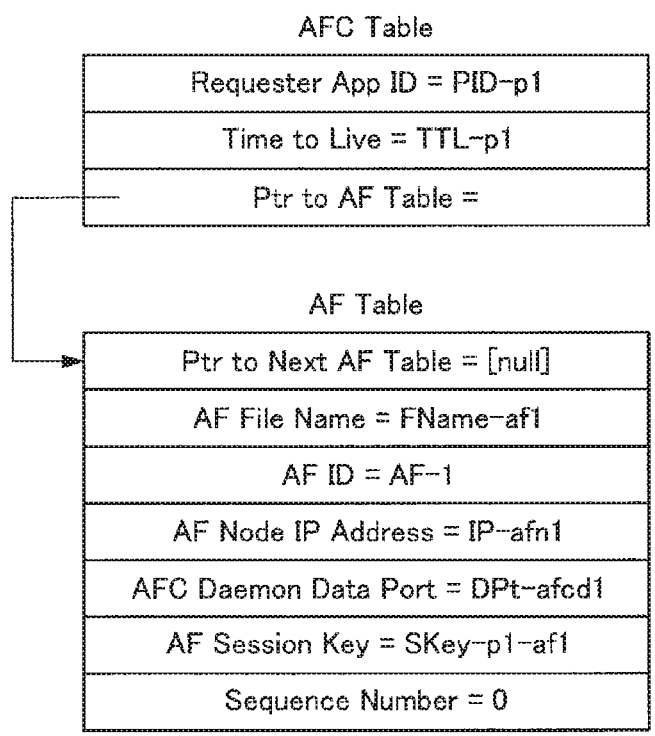
FIG. 14 is an explanatory diagram illustrating an exemplary structure of the table.

The Requester Application holds a table illustrated in FIG. 14. In the AFC Table, a value of the Requester App ID field is PID-p1. A value of the Time to Live field is TTO-p1. The Ptr to AF Table field is a pointer indicating the AF Table for the AF-1.

In the AF Table, a value of the Ptr to Next AF Table field is [null]. A value of the AF File Name field is FName-af1. A value of the AF ID field is AF-1. A value of the AF Node IP address field is IP-afn1. A value of the AFC Daemon Data Port field is DPt-afcd1. A value of the AF Session Key field is SKey-p1-af1. A value of the Sequence Number field is a specific initial value (for example, zero).

(Example of AF Setting Processing (2))

Figure 15:
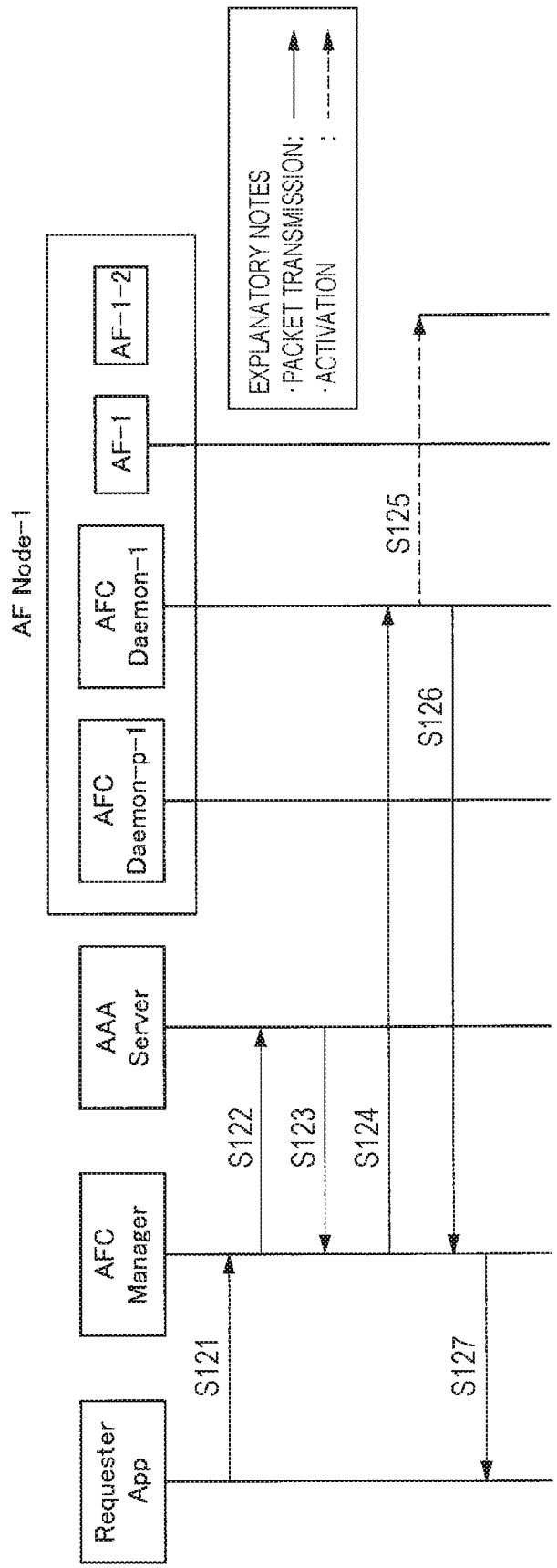
FIG. 15 is a flowchart illustrating an example of the AF setting processing.

Next, another example of the procedure for setting the AF by the Requester Application will be indicated. Here, a case will be described where, after the AF setting processing that has been described in the example of the AF setting processing (1), the Requester Application further activates the AF. FIG. 15 illustrates an example in which the Requester Application activates an AF-1-2 for the AF Node-1. A name of an executable file of the AF-1-2 is assumed to be FName-af1-2, and a parameter at the time of activation is assumed to be Params-af1-2. Authentication authorization information used to set the AF-1-2 in the AF Node-1 by the Requester Application is assumed to be Cred-p1-af1-2.

The Requester Application generates an AF setting request message illustrated in FIG. 16A. This message is the same as the AF setting request message illustrated in FIG. 7A other than that values of the AF Credential field, the AF File Name field, and the AF Parameters field are respectively Cred-p1-af1-2, FName-af1-2, and Params-af1-2. Next, the Requester Application transmits the AF setting request message to the AFC Manager (step S121).

When receiving the AF setting request message, the AFC Manager generates an AF authentication authorization request message illustrated in FIG. 17A. This message is the same as the AF authentication authorization request message illustrated in FIG. 8A other than that the AF Credential field and the AF File Name field are respectively AF-Cred-req-1-2 and FName-1-2. Next, the AFC Manager transmits the generated AF authentication authorization request message to the AAA server (step S122).

When receiving the AF authentication authorization request message, the AAA server confirms that the Requester Application has the authority for executing the AF-1-2 in the AF Node-1 from the value of the AF Credential field and generates an AF authentication authorization response message illustrated in FIG. 17B. This message is the same as the AF authentication authorization response message illustrated in FIG. 8B. Next, the AAA server transmits the generated AF authentication authorization response message to the AFC Manager (step S123).

When receiving the AF authentication authorization response message, the AFC Manager refers to the table illustrated in FIG. 12 and recognizes that the AFC Daemon has already operated in the AF Node-1. Next, a session key SKey-p1-af1-12 is generated that proves that the Requester Application has an authority for using the AF-1-2 in the AF Node-1. The Requester Application and the AFC Daemon-1 share SKey-p1-af1-2. Next, the AFC Manager generates an AF activation request message illustrated in FIG. 18A. This message is the same as the AF activation request message illustrated in FIG. 10A other than that the values of the AF Session Key field, the AF File Name field, and the AF Parameters field are respectively SKey-p1-af1-2, FName-af1-2, and Params-af1-2. Next, the AFC Manager transmits the generated AF activation request message to the AFC Daemon-1 (step S124).

When receiving the AF activation request message, the AFC Daemon-1 activates an executable file specified by the AF File Name field as an AF (step S125). At this time, the AFC Daemon-1 uses parameters specified by the AF Parameters field. When the AF is executed, the standard input and the standard output of the AF are connected to the AFC Daemon-1. A port number to make an input to the AF is assumed to be InPt-af1, and a port number that receives the output from the AF is assumed to be OutPt-af1. Furthermore, the AF-1-2 is given to the activated AF as an identifier.

The AFC Daemon-1 generates an AF activation response message illustrated in FIG. 18B. This message is the same as the AF activation response message illustrated in FIG. 10B other than that the value of the AF ID field is AF-1-2. Next, the AFC Daemon-1 transmits the generated AF activation response message to the AFC Manager (step S126).

When receiving the AF activation response message, the AFC Manager generates an AF setting response message illustrated in FIG. 16B. This message is the same as the AF setting response message illustrated in FIG. 7B other than that the values of the AF ID field and the AF Session Key field are respectively AF-1-2 and SKey-p1-af1-2. Next, the AFC Manager transmits the generated AF setting response message to the Requester Application (step S127).

Figure 20:
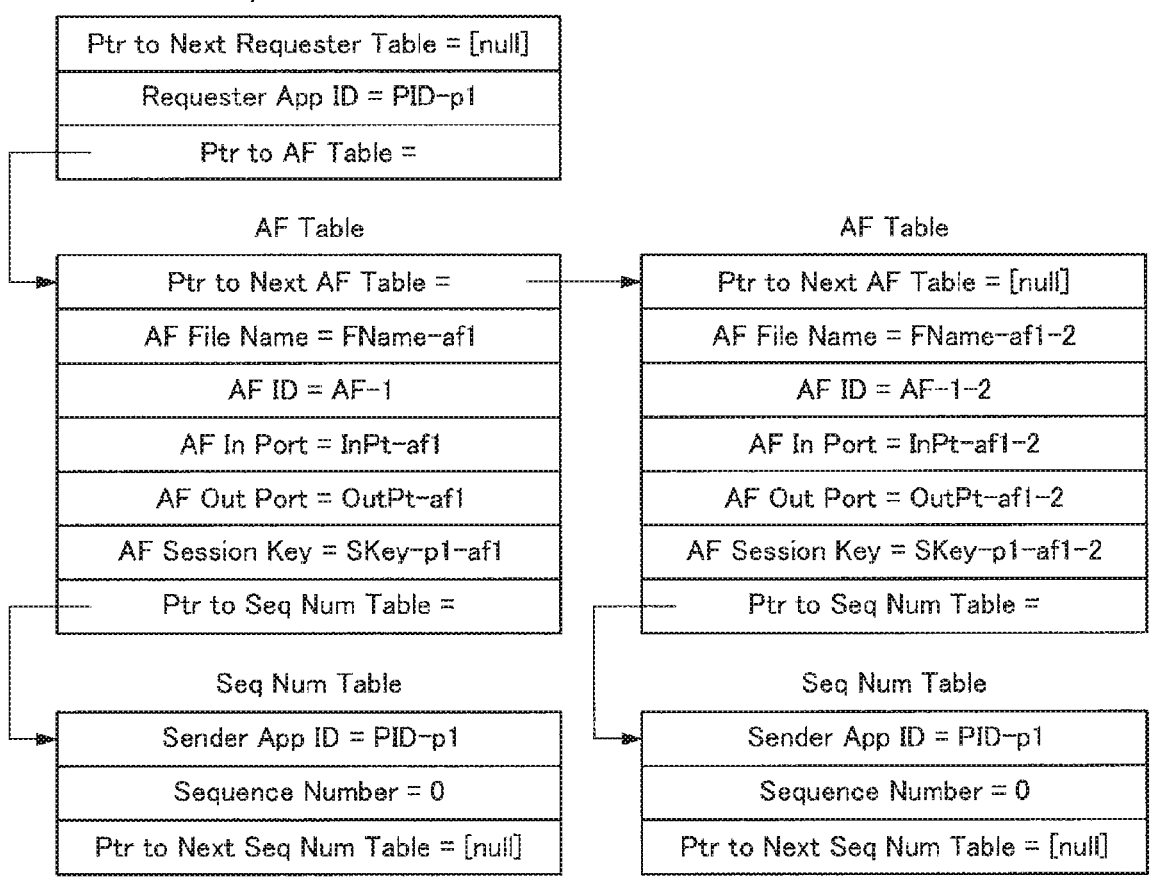
FIG. 20 is an explanatory diagram illustrating an exemplary structure of the table.
Figure 21:
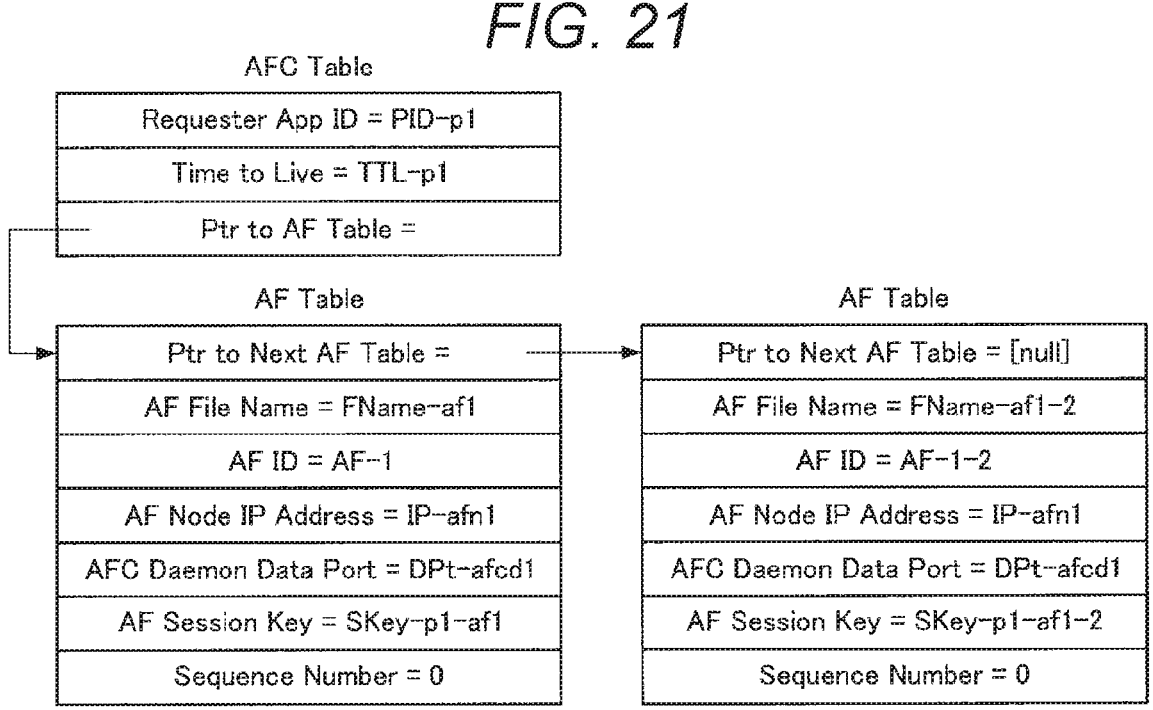
FIG. 21 is an explanatory diagram illustrating an exemplary structure of the table.

After the above processing, the AFC Manager holds a table illustrated in FIG. 19. This table is obtained by adding an AF Table for the AF-1-2 to FIG. 12. The AF Daemon-1 holds a table illustrated in FIG. 20. This table is obtained by adding the AF Table and a Seq Num Table for the AF-1-2 to FIG. 13. The Requester Application holds a table illustrated in FIG. 21. This table is obtained by adding an AF Table for the AF-1-2 to FIG. 14.

(Example of AF Deletion Processing (1))

Figure 22:
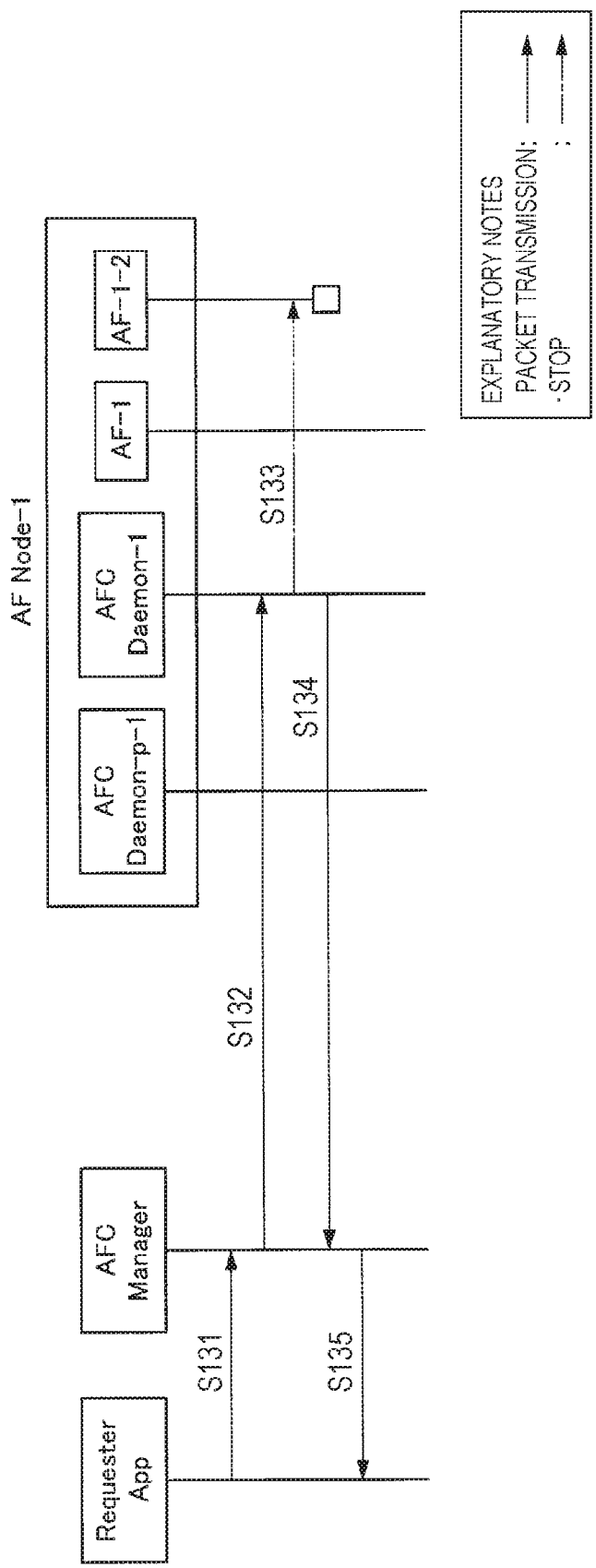
FIG. 22 is a flowchart illustrating an example of AF deletion processing.

Subsequently, an example of AF deletion processing will be indicated. Here, a case will be described where, after the AF setting processing that has been described in the example of the AF setting processing (2), the Requester Application deletes a single AF. FIG. 22 illustrates an example in which the AF-1-2 is deleted from the AF Node-1 in which two AFs (AF-1 and AF-1-2) operate.

The Requester Application generates an AF deletion request message illustrated in FIG. 23A. A value of the Type field is AF Delete Request. A value of the Requester App ID field is PID-p1. A value of the AF Node IP address field is IP-afn1. A value of the AF ID field is AF-1-2. A value of the AF Certificate field is Cert-p1-af1-2. Next, the Requester Application transmits the generated AF deletion request message to the AFC Manager (step S131).

When receiving the AF deletion request message, the AFC Manager generates an AF stop request message illustrated in FIG. 24A. A value of the Type field is AF Stop Request. A value of the Requester App ID field is PID-p1. A value of the AF ID field is AF-1-2. A value of the AF Certificate field is Cert-p1-af1-2. Next, the AFC Manager transmits the generated AF stop request message to the AFC Daemon-1 (step S132).

When receiving the AF stop request message, the AFC Daemon-1 confirms that the Requester Application has an authority for using the AF-1-2 from the value of the AF Certificate field. Next, the AF Daemon-1 stops the execution of the AF-1-2 (step S133).

The AFC Daemon-1 generates an AF stop response message illustrated in FIG. 24B. A value of the Type field is AF Stop Response. A value of the Requester App ID field is PID-p1. A value of the Status field is OK that indicates success. A value of the AF ID field is AF-1-2. Next, the AFC Daemon-1 transmits the generated AF stop response message to the AFC Manager (step S134).

When receiving the AF stop response message, the AFC Manager generates an AF deletion response message illustrated in FIG. 23B. A value of the Type field is AF Delete Response. A value of the Requester App ID field is PID-p1. A value of the Status field is OK that indicates success. A value of the AF ID field is AF-1-2. Next, the AFC Manager transmits the generated AF deletion response message to the Requester Application (step S135).

After the above processing, the AFC Manager holds the table illustrated in FIG. 12. The AFC Daemon holds a table illustrated in FIG. 13. The Requester Application holds a table illustrated in FIG. 14.

(Example of AF Deletion Processing (2))

Figures 25, 26A:
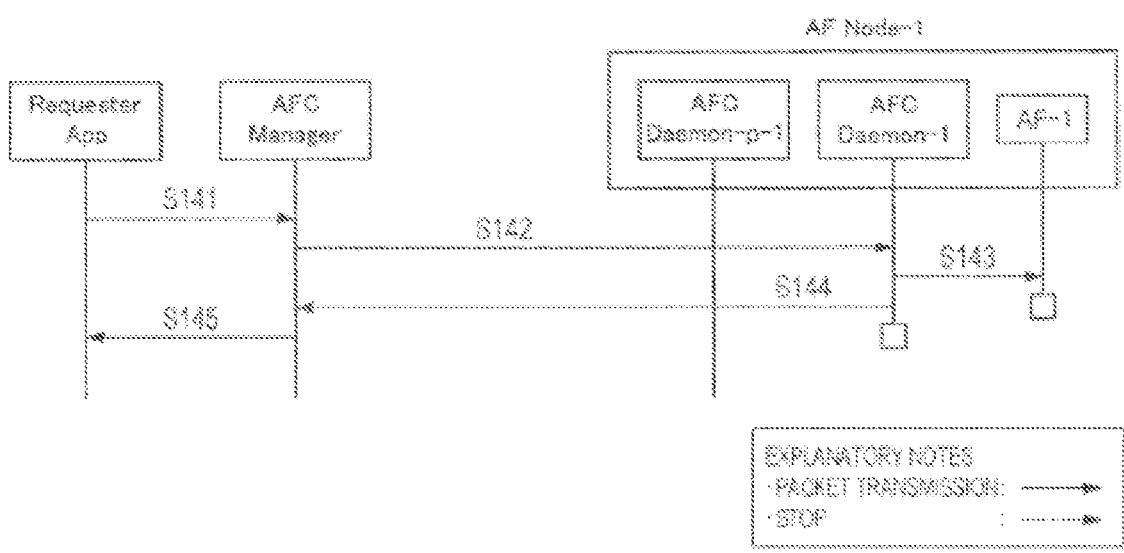
FIG. 25 is a flowchart illustrating an example of the AF deletion processing.
FIG. 26A is an explanatory diagram illustrating an example of the format of the message.

Subsequently, an example of AF deletion processing will be indicated. Here, a case will be described where, after the AF deletion processing in the example of the AF deletion processing (1), the Requester Application further deletes an AF. FIG. 25 illustrates an example in which the AF-1 is deleted in the AF Node-1 in which only a single AF (AF-1) operates.

The Requester Application generates an AF deletion request message illustrated in FIG. 26A. This message is obtained by replacing the values of the AF ID field and the AF Certificate field in the AF deletion request message illustrated in FIG. 23A respectively with AF-1 and Cert-p1-af1. Next, the Requester Application transmits the generated AF deletion request message to the AFC Manager (step S141).

Figures 26B, 27A, 27B, 28:
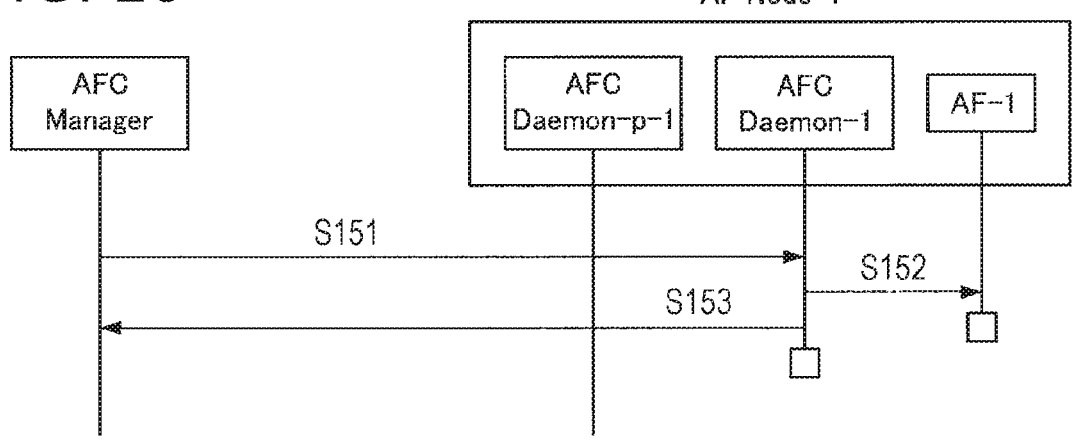
FIG. 26B is an explanatory diagram illustrating an example of the format of the message.
FIG. 27A is an explanatory diagram illustrating an example of the format of the message.
FIG. 27B is an explanatory diagram illustrating an example of the format of the message.
FIG. 28 is a flowchart illustrating an example of AF deletion processing due to timeout.

When receiving the AF deletion request message, the AFC Manager generates an AF stop request message illustrated in FIG. 27A. This message is obtained by replacing the values of the AF ID field and the AF Certificate field in the AF stop request message illustrated in FIG. 24A respectively with AF-1 and Cert-p1-af1. Next, the AFC Manager transmits the generated AF stop request message to the AFC Daemon-1 (step S142).

When receiving the AF stop request message, the AFC Daemon-1 confirms that the Requester Application has an authority for using the AF-1 from the value of the AF Certificate field. Next, the AF Daemon-1 stops the execution of the AF-1 (step S143).

The AFC Daemon-1 generates an AF stop response message illustrated in FIG. 27B. This message is obtained by replacing the value of the AF ID field in the AF stop response message illustrated in FIG. 24B with AF-1. Next, the AFC Daemon-1 transmits the generated AF stop response message to the AFC Manager (step S144). Since the AF that is managed by the AFC Daemon-1 no longer exists, the AFC Daemon-1 stops the execution of the AFC Daemon-1.

When receiving the AF stop response message, the AFC Manager generates an AF deletion response message illustrated in FIG. 26B. This message is obtained by replacing the value of the AF ID field in the AF deletion response message illustrated in FIG. 23B with AF-1. Next, the AFC Manager transmits the generated AF deletion response message to the Requester Application (step S145).

After the above processing, the AFC Manager holds a table illustrated in FIG. 11. The Requester Application deletes the held table.

(Example of AF Deletion Processing Due to Timeout)

The AFC Manager decrements a value of the Time to Live field in the Requester Table held by the AFC Manager at regular intervals (for example, one second). As a result, when the value becomes zero, the AFC Manager stops an AF related to the Requester Table. FIG. 28 illustrates processing in a case where the timeout occurs after the AF setting described in the example of the AF setting processing (1). Processing in step S151 to S153 in FIG. 28 is similar to the processing in steps S142 to S144 in FIG. 25.

(Example of AFC Timeout Extension Processing)

Figures 29, 30A, 30B:
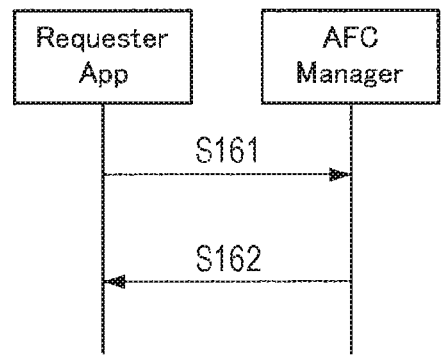
FIG. 29 is a flowchart illustrating an example of AFC timeout extension processing.
FIG. 30A is an explanatory diagram illustrating an example of the format of the message.
FIG. 30B is an explanatory diagram illustrating an example of the format of the message.

Next, FIG. 29 illustrates an example in which the Requester Application extends an AFC timeout after the AF setting described in the example of the AF setting processing (2). At this point, the Requester Application sets two AFs (AF-1 and AF-1-2). However, it is assumed that the timeout of all the AFs be extended by extending the timeout of one of the two AFs.

The Requester Application generates an AFC timeout extension request message illustrated in FIG. 30A. A value of the Type field is AFC Timeout Extend Request. A value of the Requester App ID field is PID-p1. A value of the AF ID field is AF-1. A value of an AFC Certificate field is Cert-p1-af1. A value of a desired timeout TTL-p1-2 is stored in the Time to Live field. Next, the Requester Application transmits the generated AFC timeout extension request message to the AFC Manager (step S161).

When receiving the AFC timeout extension request message, the AFC Manager searches the list of the Requester Table held by the AFC Manager by using the value of the Requester App ID field as a key. As a result, the Requester Table illustrated in FIG. 19 is found. Next, it is confirmed that the Requester Application has an authority for using the AF-1 from the value of the AFC Certificate field in the AFC timeout extension request message. Next, the AFC Manager stores the value of the Time to Live field in the AFC timeout extension request message in the Time to Live field of the Requester Table. Next, the AFC Manager generates an AFC timeout extension response message illustrated in FIG. 30B. A value of the Type field is AFC Timeout Extend Response. A value of the Requester App ID field is PID-p1. A value of the Status field is OK that indicates success. Next, the AFC Manager transmits the generated AFC timeout extension response message to the Requester Application (step S162).

(Example of AF Setting Processing (3))

In the above, an example of processing in a case where the AFC Manager exists in a system has been indicated. Next, an example of processing in a case where the AFC Manager does not exist in the system will be described. First, a procedure will be indicated in which the Requester Application sets an AF in a case where the AFC Manager does not exist. FIG. 31 illustrates an example in which the Requester Application activates the AF-1 in the AF Node-1. An identifier of the Requester Application is assumed to be PID-p1. An IP address of the AF Node-1 is assumed to be IP-afn1. A name of an executable file of the AF-1 is assumed to be FName-af1, and a parameter at the time of execution is assumed to be Params-af1. Authentication authorization information for setting the AF-1 in the AF Node-1 by the Requester Application is assumed to be Cred-p1-af1.

Note that the AAA server and the AFC Daemon-p perform communication through ports for control communication. The AFC Daemon performs communication by using a port for control communication that is created at the time of activation. A port used by the Requester Application depends on the Requester Application.

The Requester Application establishes a TLS connection with the AFC Daemon-p-1 (step S171).

When receiving a TLS connection establishment request, the AFC Daemon-p-1 activates the AFC Daemon-1 (step S172). The AFC Daemon-1 generates a data communication port DPt-afcd1 and a control communication port CPt-afcd1. The subsequent processing is executed by the AFC Daemon-1. The AFC Daemon-1 establishes a TLS connection with the Requester Application (step S173).

The Requester Application generates an AF setting request message illustrated in FIG. 7A. Next, the Requester Application transmits the generated AF setting request message to the AFC Daemon-1 (step S174).

When receiving an AF setting message, the AFC Daemon-1 searches the list of the Requester Table held by the AFC Daemon-1 using the value of the Requester App ID field as a key. Since a corresponding Requester Table is not found, it is found that this is a first AF setting request packet from the Requester Application. Next, in order to check whether or not the Requester Application has an authority for executing the AF, the AFC Daemon-1 generates an AF authentication authorization request message illustrated in FIG. 8A. Next, the AFC Daemon-1 transmits the generated AF authentication authorization request message to the AAA server (step S175).

When receiving the AF authentication authorization request message, the AAA server confirms that the Requester Application has the authority for executing an AF-1 in the AF Node-1 from the value of the AF Credential field and generates an AF authentication authorization response message illustrated in FIG. 8B. Next, the AAA server transmits the AF authentication authorization response message to the AFC Daemon-1 (step S176).

When receiving the AF authentication authorization response message, the AFC Daemon-1 activates an executable file specified by the AF File Name field in the AF activation request message as an AF (step S177). At this time, parameters specified by the AF Parameters field are used. When the AF is activated, a standard input and a standard output of the AF are connected to the AFC Daemon-1. A port number to make an input to the AF is assumed to be InPt-af1, and a port number that receives the output from the AF is assumed to be OutPt-af1. Furthermore, AF-1 is given to the activated AF as an identifier. Next, a session key SKey-p1-af1 is generated that proves that the Requester Application has an authority for using the AF-1 in the AF Node-1. The Requester Application and the AFC Daemon-1 share the SKey-p1-af1.

The AFC Daemon-1 generates an AF activation response message illustrated in FIG. 10B. Next, the AFC Daemon-1 transmits the generated AF activation response message to the AFC Manager (step S178).

When receiving the AF activation response message, the Requester Application disconnects the TLS connection with the AFC Daemon-1 (step S179).

Figure 32:
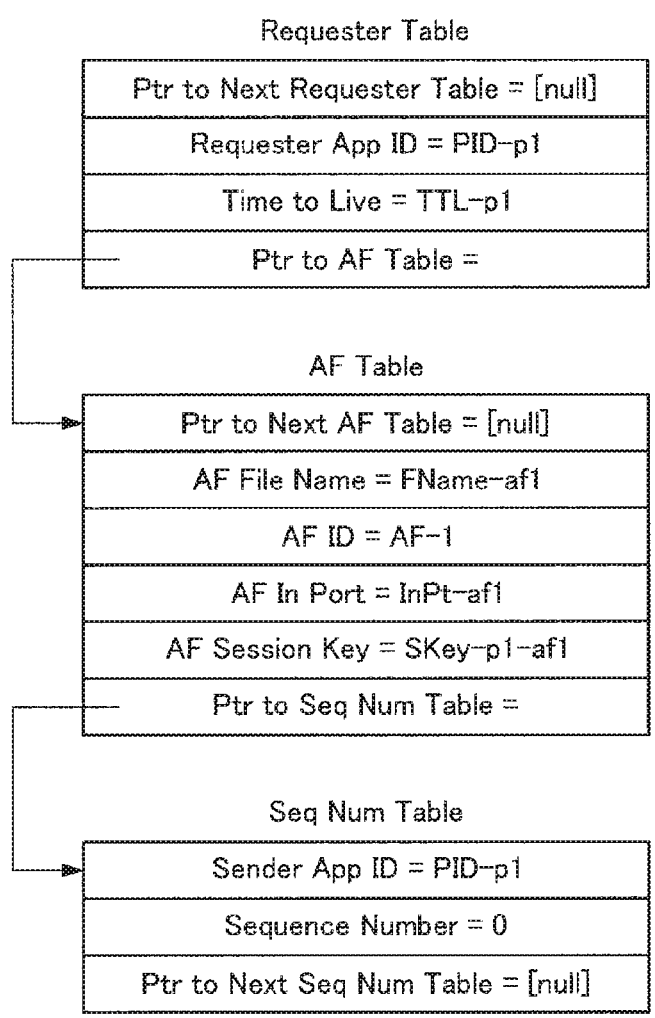
FIG. 32 is an explanatory diagram illustrating an exemplary structure of the table.

After the above processing, the AFC Daemon-1 holds a table illustrated in FIG. 32. This table is obtained by adding the Time to Live field to the Requester Table illustrated in FIG. 13. The Requester Application holds a table illustrated in FIG. 14.

(Example of AF Setting Processing (4))

Figure 33:
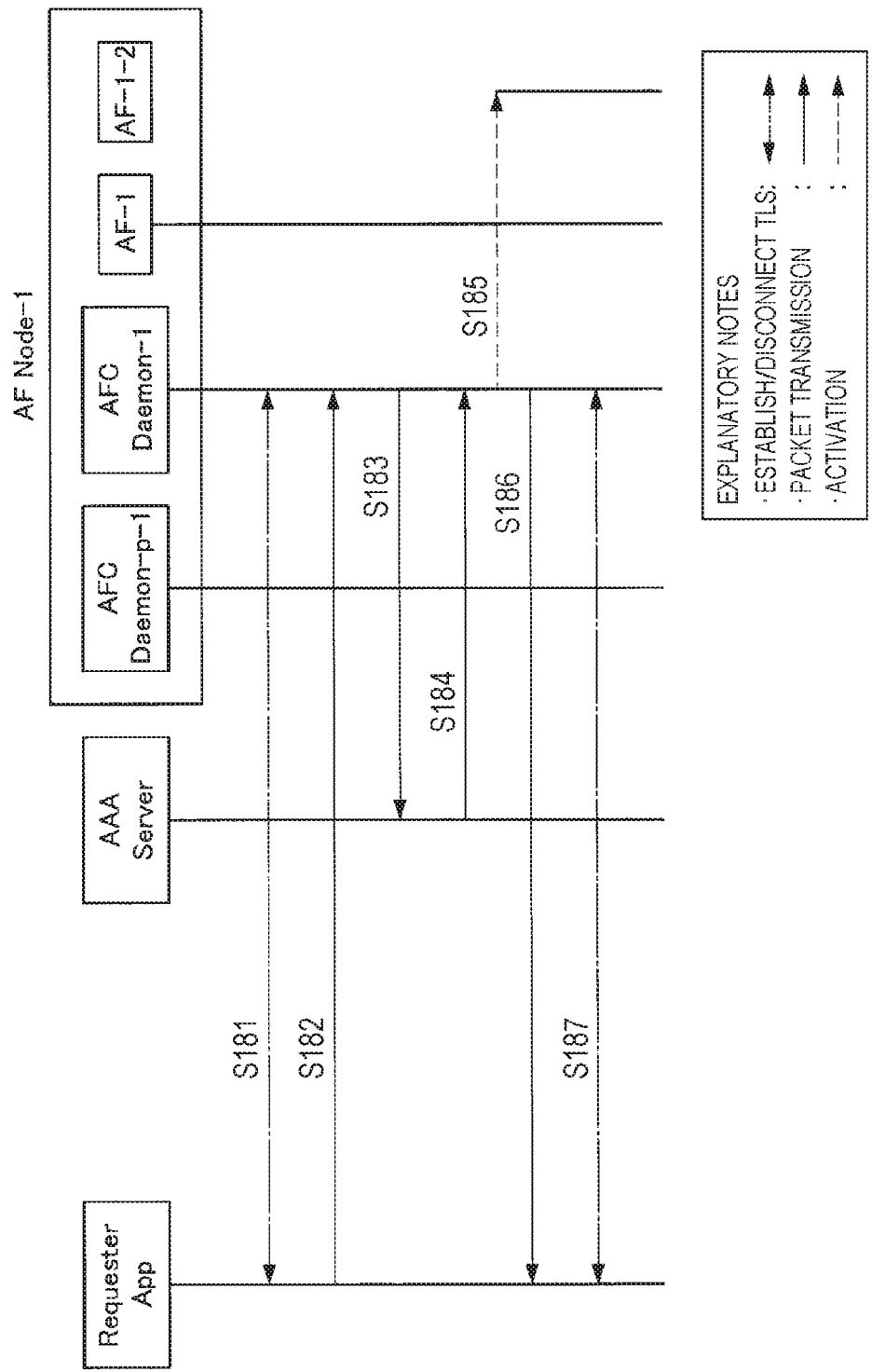
FIG. 33 is a flowchart illustrating an example of the AF setting processing.

A case will be described where the Requester Application further activates the AF after the AF setting processing described in the example of the AF setting processing (3). FIG. 33 illustrates an example in which the Requester Application activates the AF-1-2 in the AF Node-1. A name of an executable file of the AF-1-2 is assumed to be FName-af1-2, and a parameter at the time of activation is assumed to be Params-af1-2. Authentication authorization information used to set the AF-1-2 in the AF Node-1 by the Requester Application is assumed to be Cred-p1-af1-2.

The Requester Application establishes a TLS connection with the AFC Daemon-1 (step S181).

The Requester Application generates an AF setting request message illustrated in FIG. 16A. Next, the Requester Application transmits the generated AF setting request message to the AFC Daemon-1 (step S182).

Figure 34:
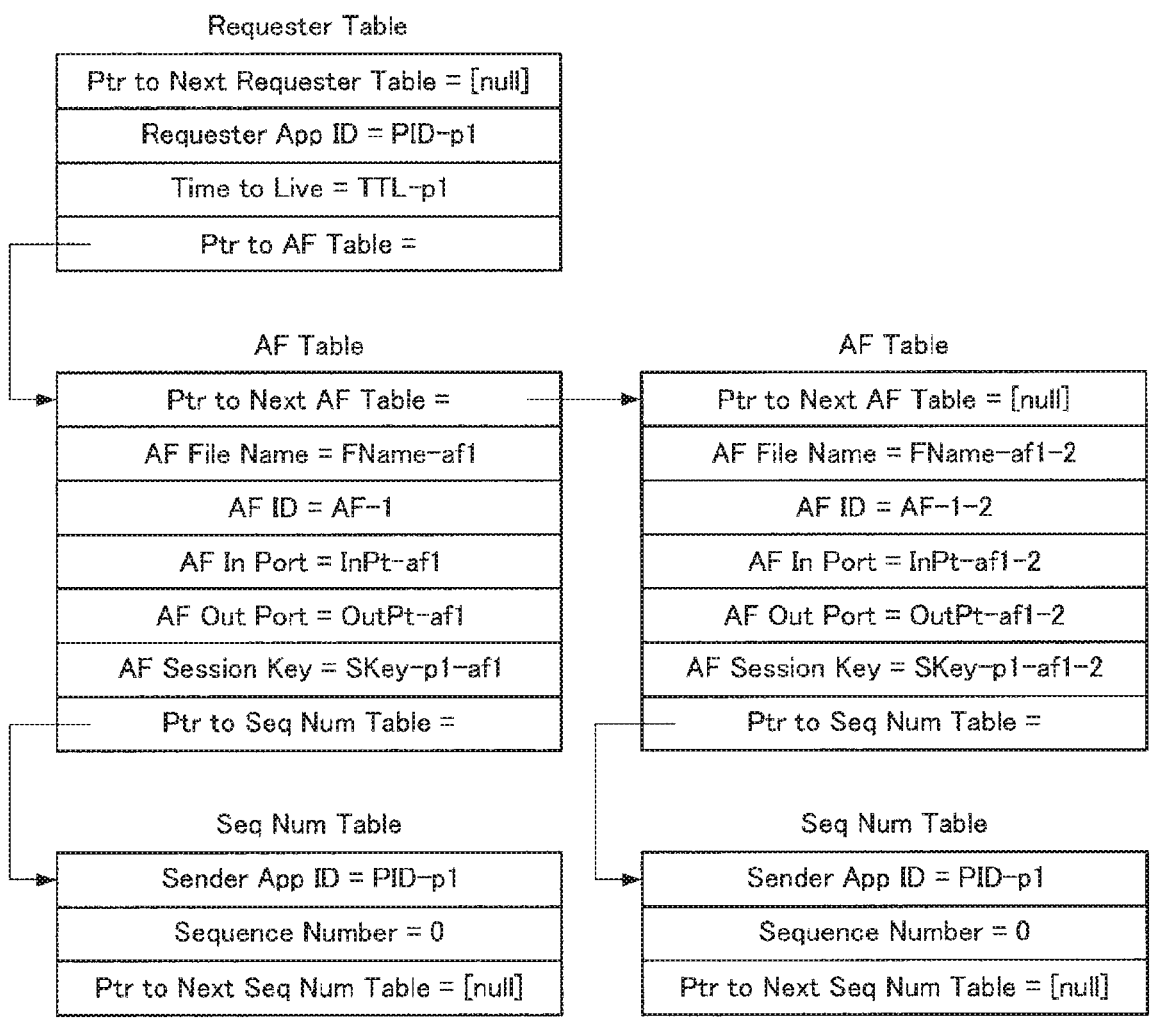
FIG. 34 is an explanatory diagram illustrating an exemplary structure of the table.

When receiving an AF setting message, the AFC Daemon-1 searches the list of the Requester Table held by the AFC Daemon-1 using the value of the Requester App ID field as a key. As a result of the search, a corresponding Requester Table is found. Therefore, a new AF Table is inserted after the existing AF Table as illustrated in FIG. 34. Next, in order to check whether or not the Requester Application has an authority for executing the AF, the AFC Daemon-1 generates an AF authentication authorization request message illustrated in FIG. 17A. Next, the AFC Daemon-1 transmits the generated AF authentication authorization request message to the AAA server (step S183).

When receiving the AF authentication authorization request message, the AAA server confirms that the Requester Application has the authority for executing the AF-1-2 in the AF Node-1 from the value of the AF Credential field and generates an AF authentication authorization response message illustrated in FIG. 17B. Next, the AAA server transmits the generated AF authentication authorization response message to the AFC Daemon-(step S184).

When receiving the AF authentication authorization response message, the AFC Daemon-1 activates an executable file specified by the AF File Name field in the AF activation request message as an AF (step S185). At this time, parameters specified by the AF Parameters field are used. When the AF is activated, a standard input and a standard output of the AF are connected to the AFC Daemon-1. A port number to make an input to the AF is assumed to be InPt-af1-2, and a port number that receives the output from the AF is assumed to be OutPt-af1-2. Furthermore, AF-1-2 is given to the activated AF as an identifier. Next, a session key SKey-p1-af1-2 is generated that proves that the Requester Application has an authority for using the AF-1-2 in the AF Node-1. The Requester Application and the AFC Daemon-1 share SKey-p1-af1-2.

The AFC Daemon-1 generates an AF activation response message illustrated in FIG. 10B. Next, the AFC Daemon-1 transmits the generated AF activation response message to the AFC Manager (step S186).

When receiving the AF activation response message, the Requester Application disconnects the TLS connection with the AFC Daemon-1 (step S187).

After the above processing, the AFC Daemon-1 holds a table illustrated in FIG. 34. The Requester Application holds a table illustrated in FIG. 21.

(Example of AF Deletion Processing (3))

Figure 35:
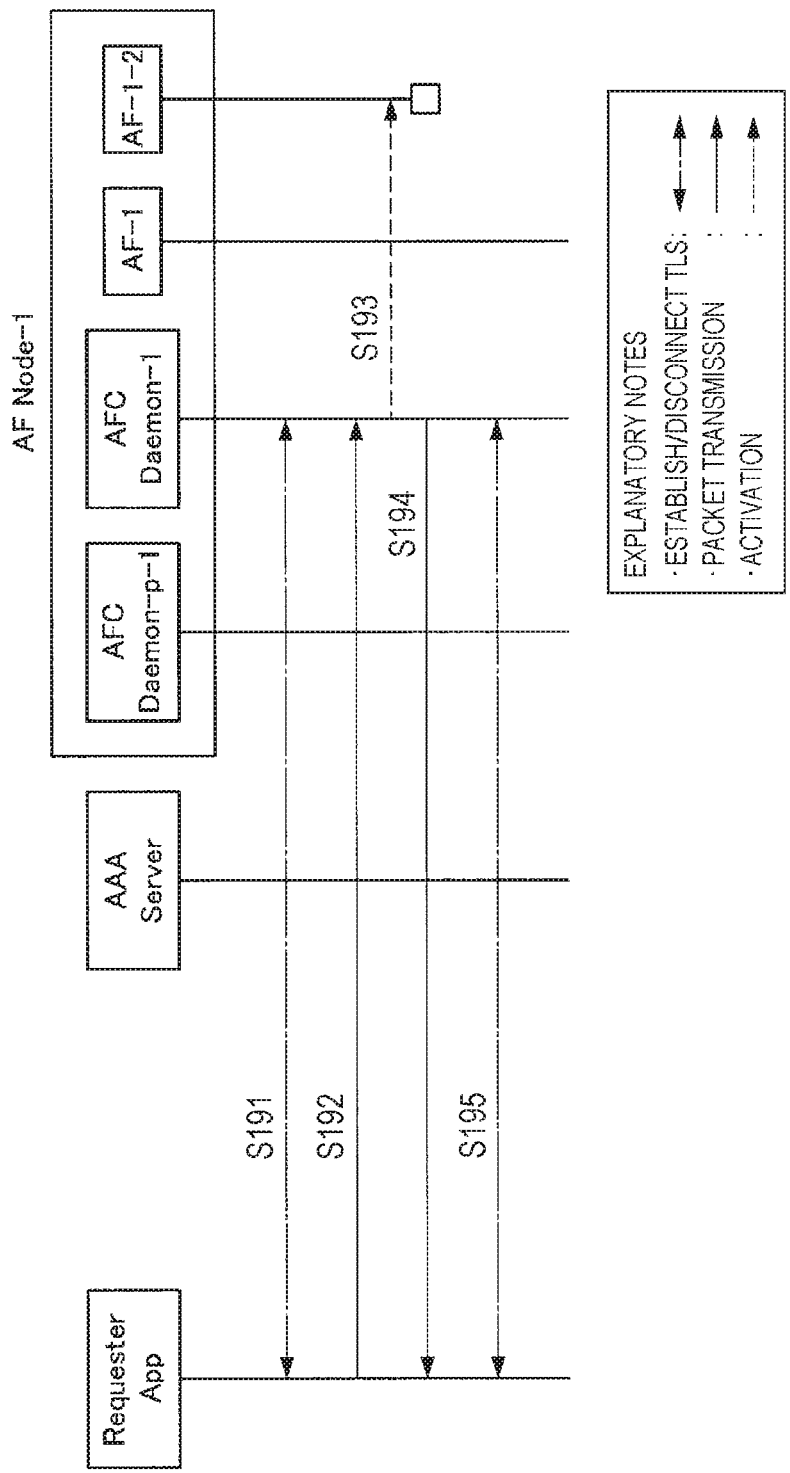
FIG. 35 is a flowchart illustrating an example of the AF deletion processing.

Next, a procedure will be indicated in which the Requester Application deletes an AF in a case where the AFC Manager does not exist. Here, a case will be described where the Requester Application deletes a single AF after the AF setting processing described in the example of the AF setting processing (4). FIG. 35 illustrates an example in which the AF-1-2 is deleted from the AF Node-1 in which two AFs (AF-1 and AF-1-2) operate.

The Requester Application establishes a TLS connection with the AFC Daemon-1 (step S191).

The Requester Application generates an AF deletion request message illustrated in FIG. 23A. Next, the Requester Application transmits the generated AF deletion request message to the AFC Daemon-1 (step S192).

When receiving the AF deletion request message, the AFC Daemon-1 confirms that the Requester Application has an authority for using the AF-1-2 from the value of the AF Certificate field. Next, the AF Daemon-1 stops the execution of the AF-1-2 (step S193).

The AFC Daemon-1 generates an AF deletion response message illustrated in FIG. 23B. Next, the AFC Daemon-1 transmits the generated AF deletion response message to the Requester Application (step S194).

When receiving the AF deletion response message, the Requester Application disconnects the TLS connection with the AFC Daemon-1 (step S195).

After the above processing, the AFC Daemon-1 holds a table illustrated in FIG. 32. The Requester Application holds a table illustrated in FIG. 14.

(Example of AF Deletion Processing (4))

Figure 36:
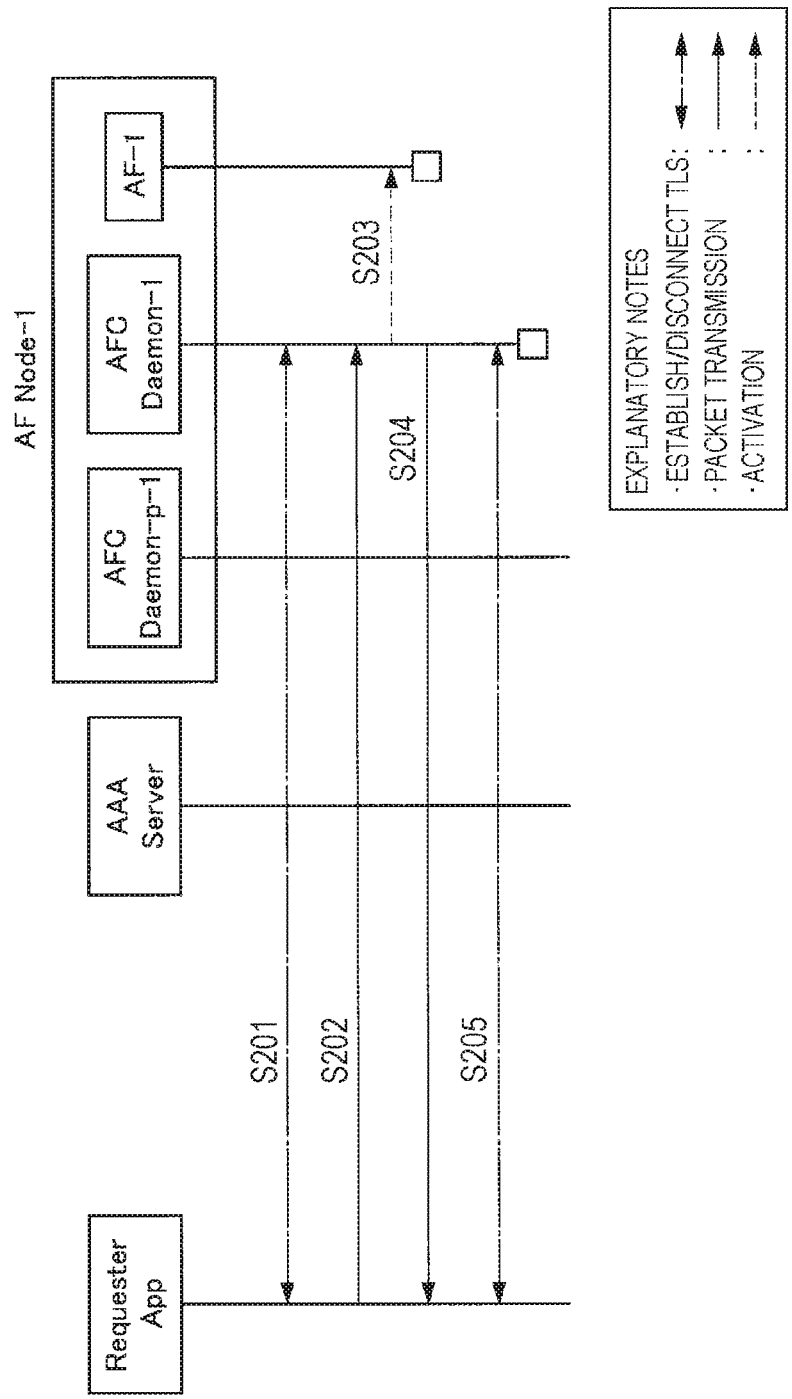
FIG. 36 is a flowchart illustrating an example of the AF deletion processing.

A case will be described where the Requester Application further deletes an AF after the AF deletion processing described in the example of the AF deletion processing (3). FIG. 36 illustrates an example in which the AF-1 is deleted in the AF Node-1 in which only a single AF (AF-1) operates.

The Requester Application establishes a TLS connection with the AFC Daemon-1 (step S201).

The Requester Application generates an AF deletion request message illustrated in FIG. 26A. Next, the Requester Application transmits the generated AF deletion request message to the AFC Daemon-1 (step S202).

When receiving the AF deletion request message, the AFC Daemon-1 confirms that the Requester Application has an authority for using the AF-1 from the value of the AF Certificate field. Next, the AF Daemon-1 stops the execution of the AF-1 (step S203).

The AFC Daemon-1 generates an AF deletion response message illustrated in FIG. 26B. Next, the AFC Daemon-1 transmits the generated AF deletion response message to the Requester Application (step S204).

When receiving the AF deletion response message, the Requester Application disconnects the TLS connection with the AFC Daemon-1 (step S205). Thereafter, the AFC Daemon-1 terminates the execution.

After the above processing, the Requester Application deletes the held table.

(Example of AF Deletion Processing Due to Timeout (2))

Figure 37:
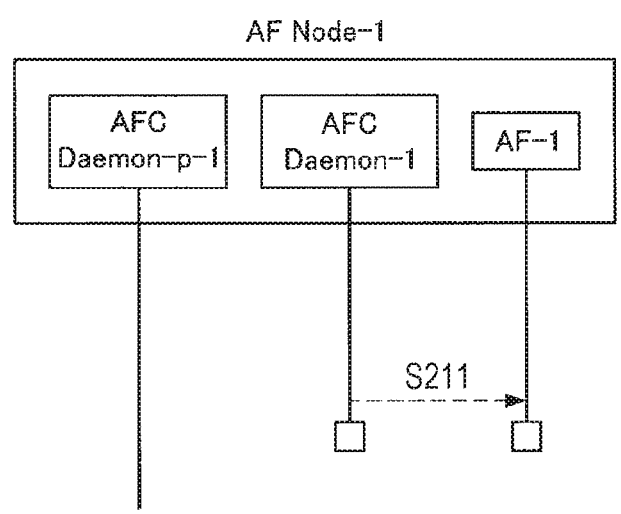
FIG. 37 is a flowchart illustrating an example of the AF deletion processing due to the timeout.

The AFC Daemon decrements a value of the Time to Live field in the Requester Table held by the AFC Daemon at regular intervals (for example, one second). As a result, when the value becomes zero, the AFC Daemon stops an AF related to the Requester Table. FIG. 37 illustrates processing in a case where the timeout occurs after the AF setting described in the example of the AF setting processing (3). When the timeout occurs, the AFC Daemon-1 stops the AF-1 (step S211), and the AFC Daemon-1 terminates the execution.

(Example of AFC Timeout Extension Processing (2))

Figure 38:
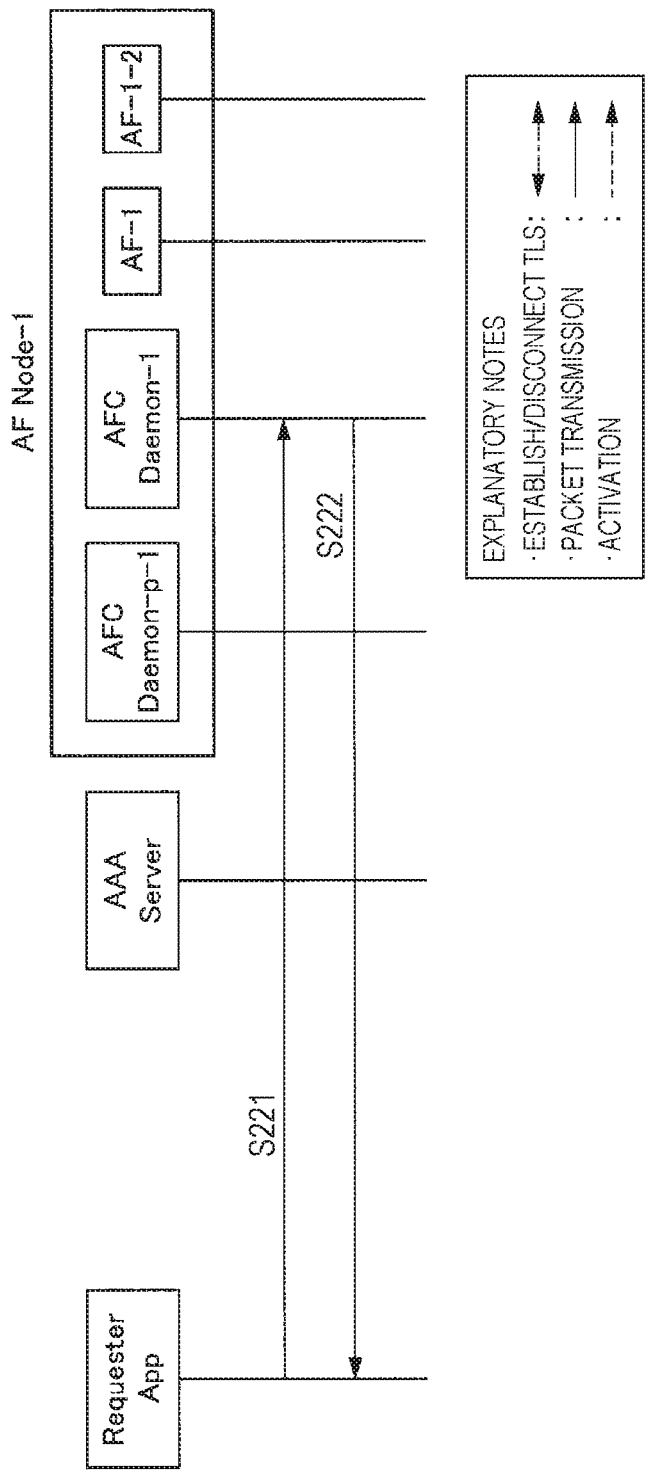
FIG. 38 is a flowchart illustrating an example of the AFC timeout extension processing.

FIG. 38 illustrates an example in which the Requester Application extends the AFC timeout after the AF setting described in the example of the AF setting processing (4). At this point, the Requester Application sets two AFs (AF-1 and AF-1-2). However, it is assumed that the timeout of all the AFs be extended by extending the timeout of one of the two AFs.

The Requester Application generates an AFC timeout extension request message illustrated in FIG. 30A. Next, the Requester Application transmits the generated AFC timeout extension request message to the AFC Daemon-1 (step S221).

When receiving the AFC timeout extension request message, the AFC Daemon-1 searches the list of the Requester Table held by the AFC Daemon-1 by using the value of the Requester App ID field as a key. As a result, the Requester Table illustrated in FIG. 34 is found. Next, it is confirmed that the Requester Application has an authority for using the AF-1 from the value of the AFC Certificate field in the AFC timeout extension request message. Next, the AFC Manager stores the value of the Time to Live field in the AFC timeout extension request message in the Time to Live field of the Requester Table. Next, the AFC Daemon-1 creates the AFC timeout extension response message illustrated in FIG. 30B. Next, the AFC Daemon-1 transmits the AFC timeout extension response message to the Requester Application (step S222).

(AFC Setting Example)

Figure 39:
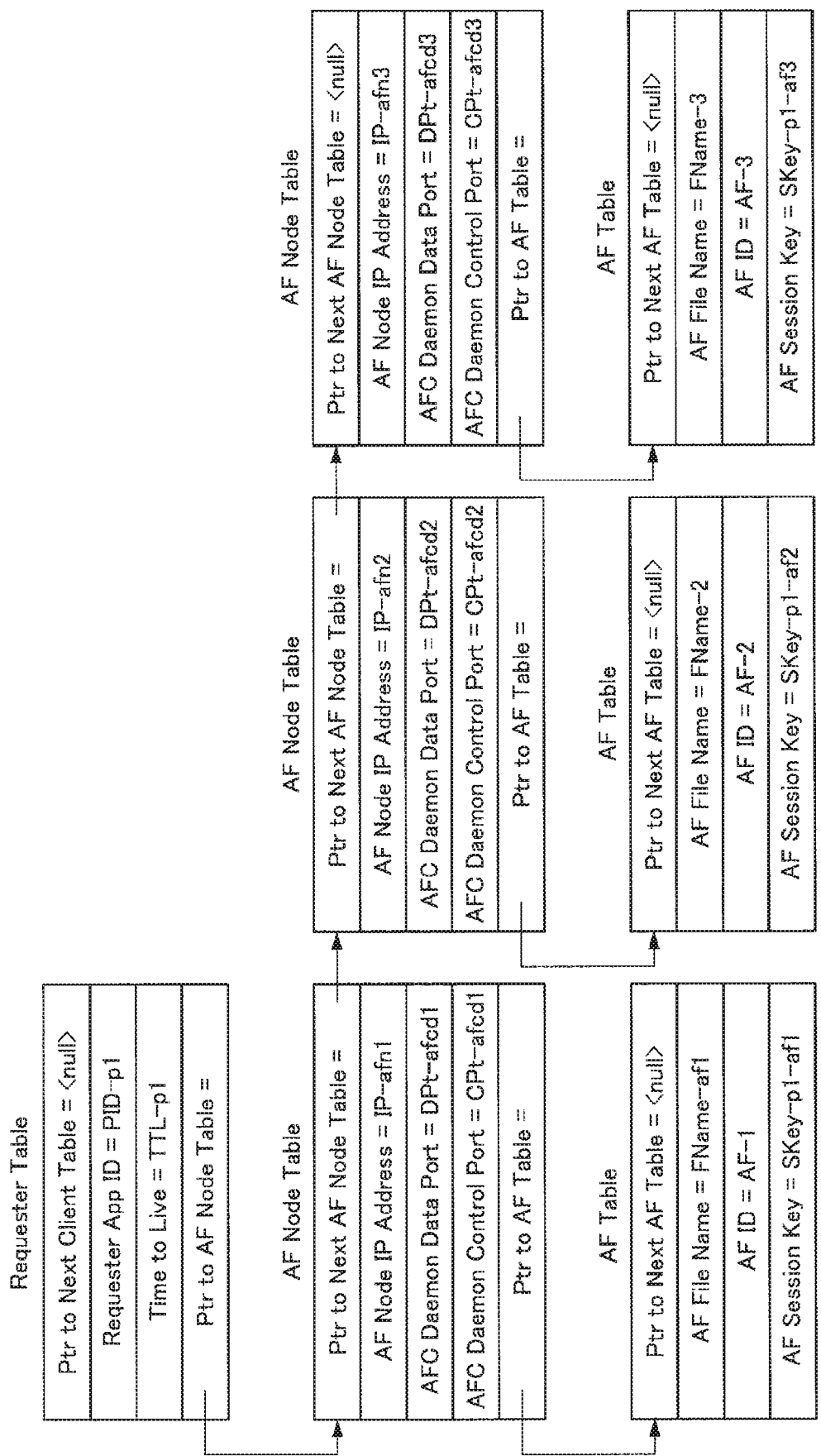
FIG. 39 is an explanatory diagram illustrating an exemplary structure of the table.
Figure 40A:
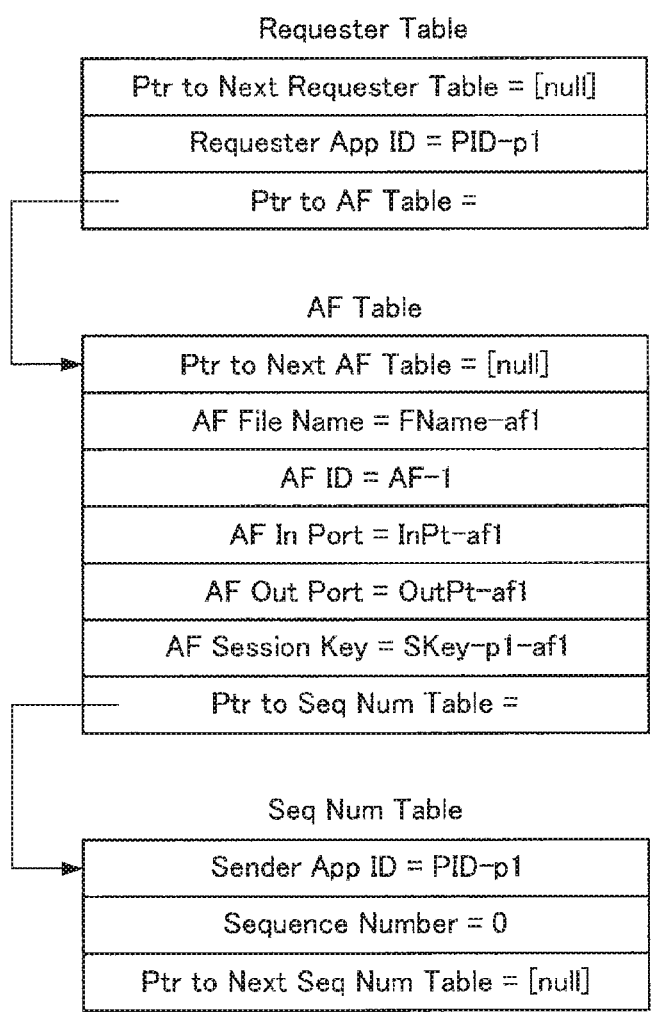
FIG. 40A is an explanatory diagram illustrating an exemplary structure of the table.
Figure 40B:
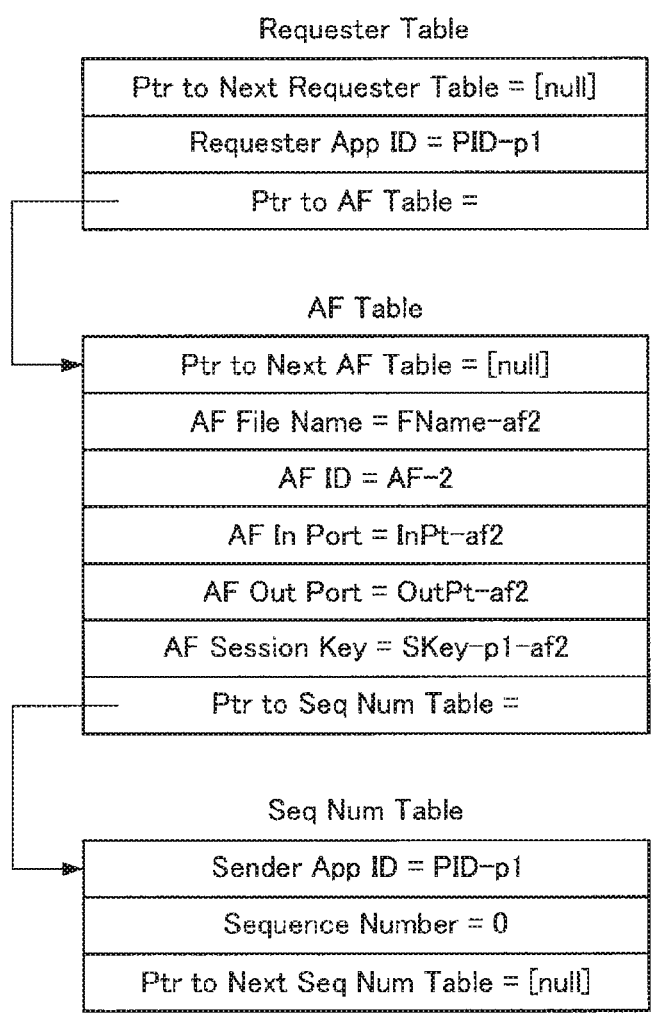
FIG. 40B is an explanatory diagram illustrating an exemplary structure of the table.
Figure 40C:
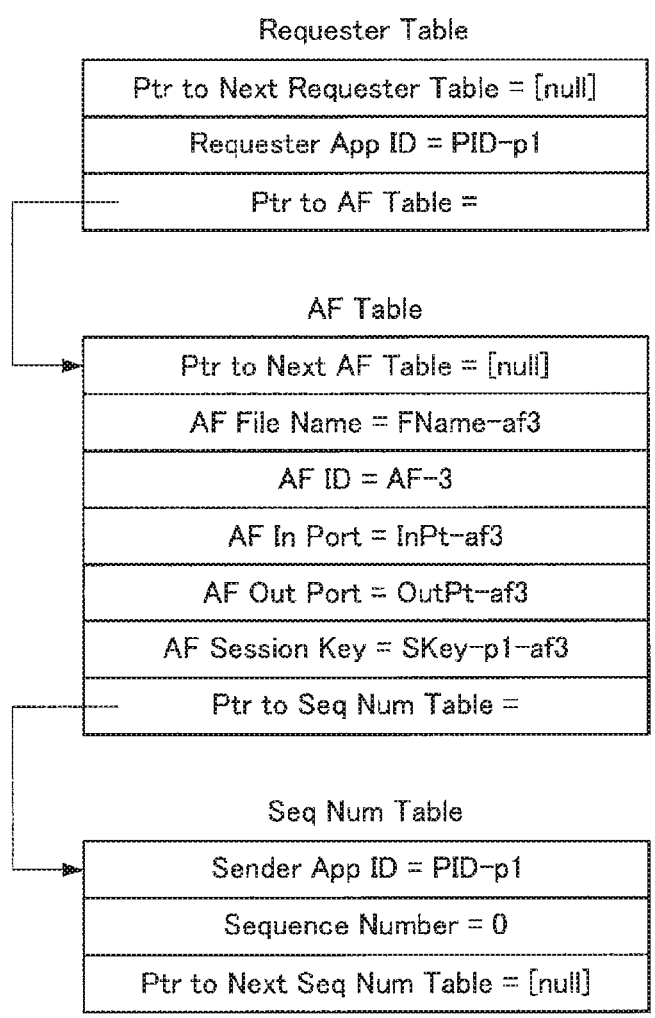
FIG. 40C is an explanatory diagram illustrating an exemplary structure of the table.
Figure 41A:
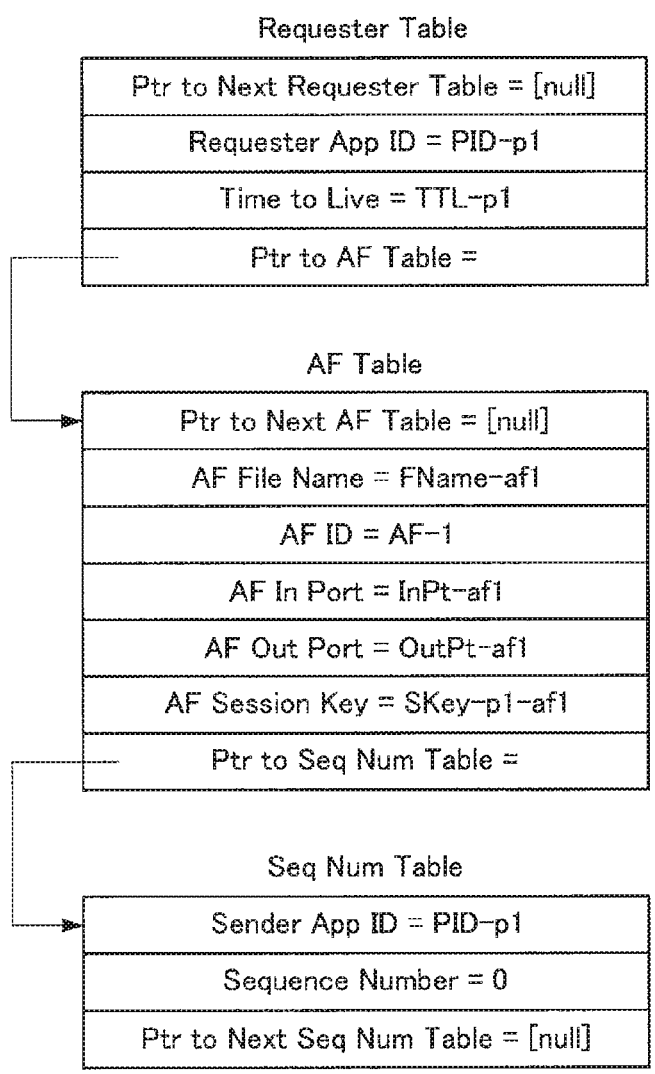
FIG. 41A is an explanatory diagram illustrating an exemplary structure of the table.
Figure 41B:
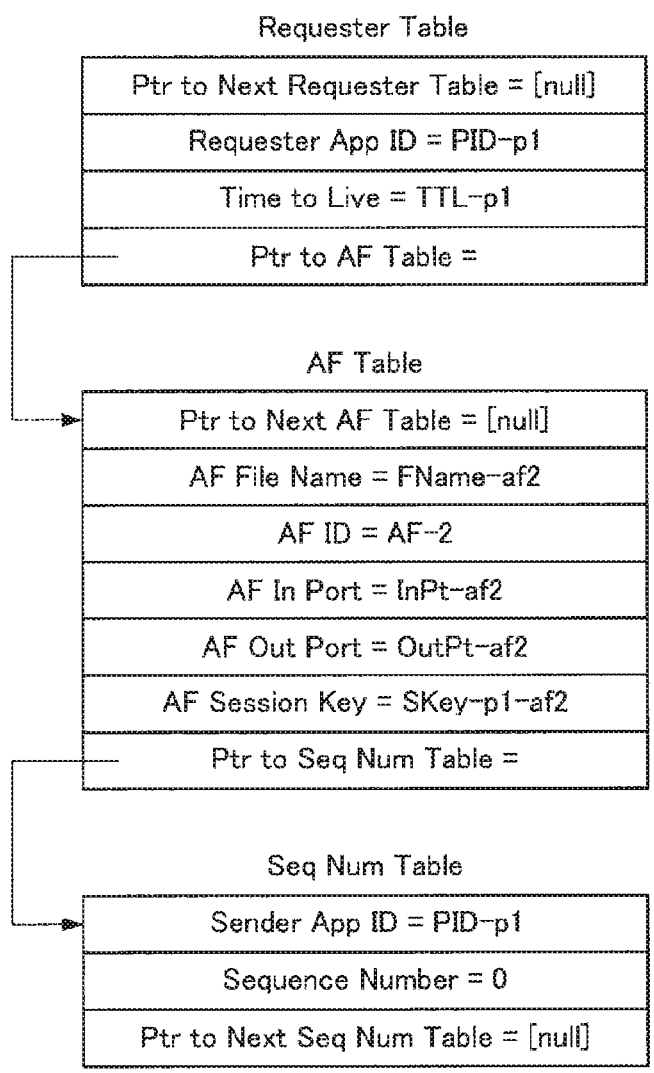
FIG. 41B is an explanatory diagram illustrating an exemplary structure of the table.
Figure 41C:
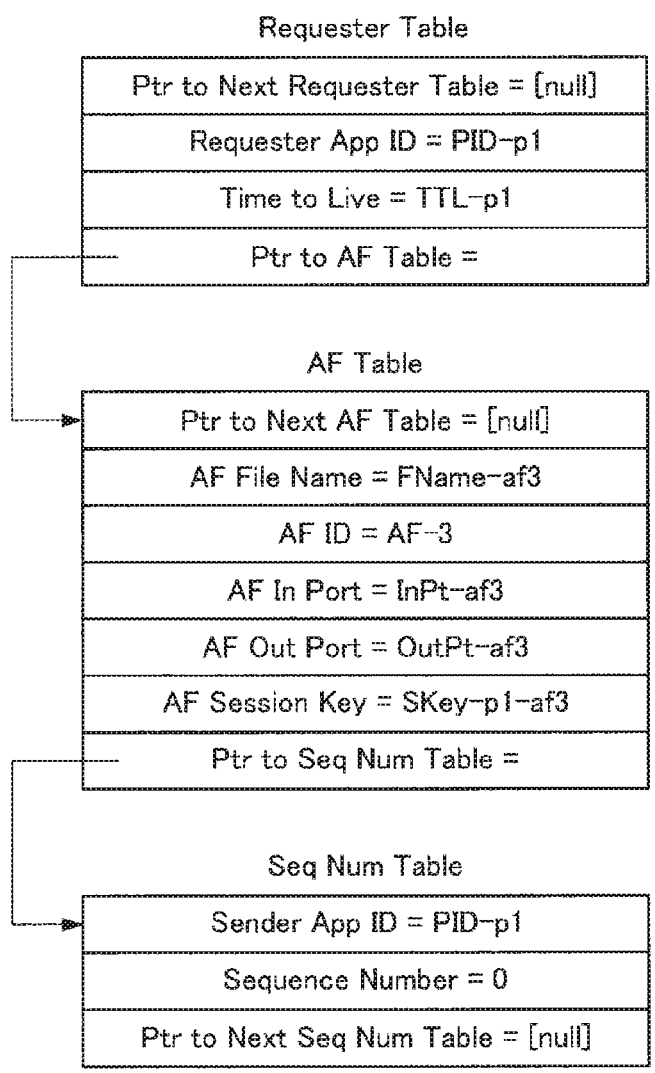
FIG. 41C is an explanatory diagram illustrating an exemplary structure of the table.

By executing the above processing, it is possible to activate and delete the AF. Here, it is assumed that the Requester Application activate the AF-1 in the AF Node-1, the AF-2 in the AF Node-2, and the AF-3 in the AF Node-3 from an initial state where the AF is not activated. As a result, the AFC Manager holds a table illustrated in FIG. 39. The AFC Daemon-1 operating in the AF Node-1 holds a table illustrated in FIG. 40A. An AFC Daemon-2 operating in the AF Node-2 holds a table illustrated in FIG. 40B. An AFC Daemon-3 operating in the AF Node-3 holds a table illustrated in FIG. 40C. Note that, in a case where the AFC Manager is not introduced, the AFC Daemon-1 that operates in the AF Node-1 holds a table illustrated in FIG. 41A. The AFC Daemon-2 operating in the AF Node-2 holds a table illustrated in FIG. 41B. The AFC Daemon-3 operating in the AF Node-3 holds a table illustrated in FIG. 41C. The Requester Application holds a table illustrated in FIG. 42. Note that IP addresses of the AF Node-1, the AF Node-2, and the AF Node-3 are respectively assumed to be IP-afn1, IP-afn2, and IP-afn3. A port for data communication and a port for control communication of the AFC Daemon-1 are respectively assumed to be DPt-afcd1 and CPt-afcd1. A port for data communication and a port for control communication of the AFC Daemon-2 are respectively assumed to be DPt-afcd2 and CPt-afcd2. A port for data communication and a port for control communication of the AFC Daemon-3 are respectively assumed to be DPt-afcd3 and CPt-afcd3.

(Example of Linear AFC Communication)

AFC communication in the AF setting state described in the AFC setting example described above will be described. Here, a case where the Requester Application serves as the Sender Application will be described. A case will be described where a packet transmitted by the Sender Application reaches the Receiver Application via the AF-1 and the AF-2. Note that an IP address of the Sender Node and an IP address of the Receiver Node are respectively assumed to be IP-tx and IP-rx. A port number of the Sender Application for data communication and a port number of the Receiver Application for data communication are respectively assumed to be DPt-tx and DPt-rx. The AFC Daemon-1 and the AFC Daemon-2 perform communication by using DPt-afcd1 and DPt-afcd2 that are the ports for data communication of the AFC Daemon-1 and the AFC Daemon-2.

Figure 44:
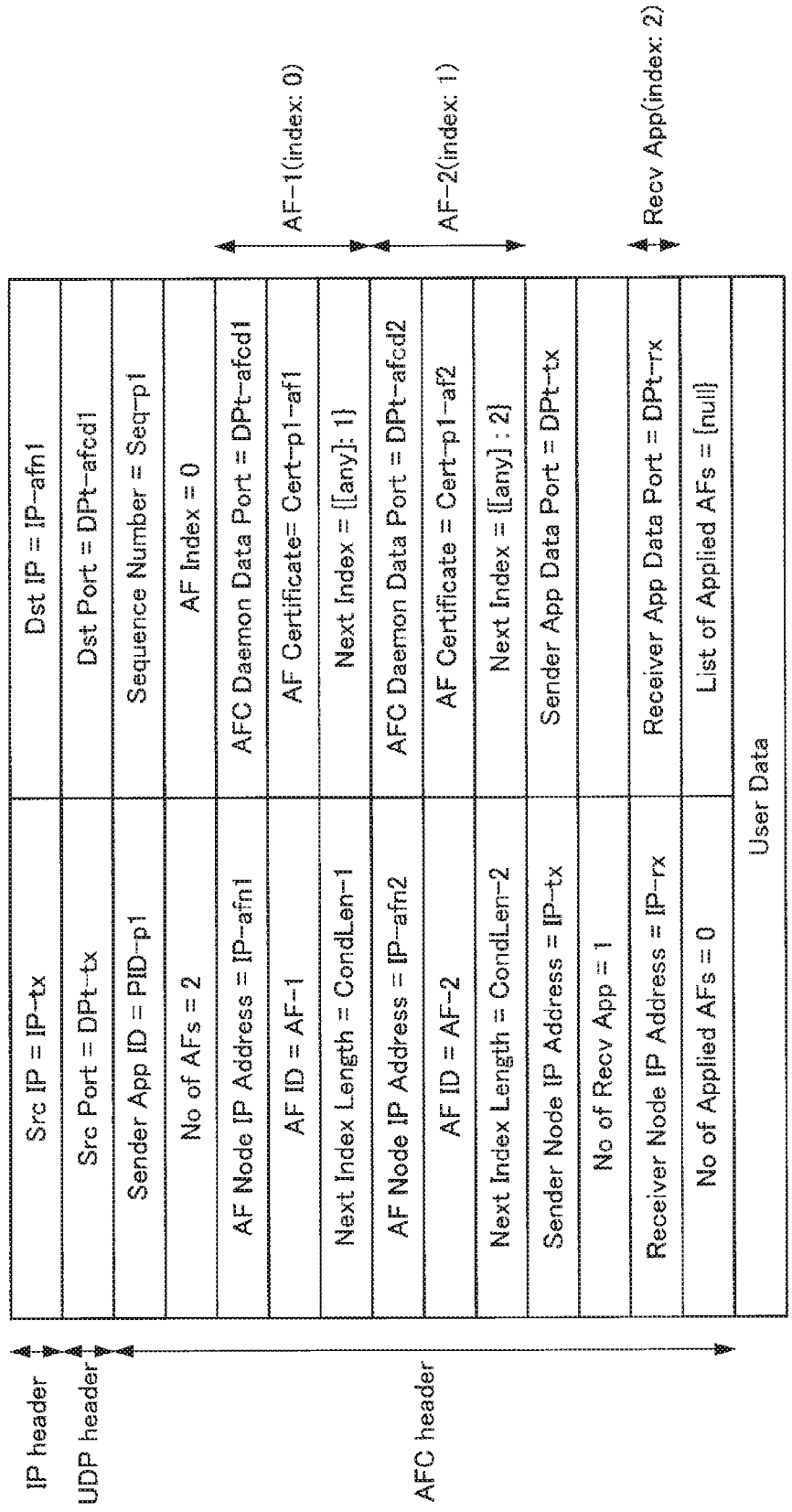
FIG. 44 is an explanatory diagram illustrating an example of a format of a data packet.

The Sender Application generates a data packet illustrated in FIG. 44. The data packet includes an IP header, a UDP header, an AFC header, and user data. In the IP header, only a start point IP address (Src IP) field and an end point IP address (Dst IP) field are illustrated. In this example, IP-tx and IP-afn1 are illustrated. In the UDP header, only a start point port number (Src Port) field and an end point port number (Dst Port) field are illustrated. In this example, DPt-tx and DPt-afcd1 are illustrated.

Content of the AFC header is as follows. A value of the Sender App ID field is PID-p1. The Sequence Number field stores a value obtained by adding one to the maximum value of the Sequence Number field in the three AF Tables illustrated in FIG. 42 and stores the same value in the Sequence Number field in each AF Table. The No of AFs field indicates the number of AFs through which the data packet passes. In an example of the communication as in FIG. 43, the value of the No of AFs field is two. A value of an AF Index field is zero. The AF Node IP Address field is IP-afn1 for a 0th AF (AF-1) and IP-afn2 for a first AF (AF-2). The AFC Daemon Data Port field is DPt-afcd1 for the 0th AF and DPt-afcd2 for the first AF. The AF ID field is AF-1 for the 0th AF and AF-2 for the first AF. The AF Certificate field is Cert-p1-af1 for the 0th AF and Cert-p1-af2 for the first AF. In the Next Index field, since a conditional expression for the 0th AF is [any], it is indicated that a next stage is the first AF (AF-2) regardless of an output value of the AF-1. Since a conditional expression for the first AF is also [any], it is indicated that a next stage is a second (Receiver Application) regardless of an output value of the AF-2. A value of the Sender Node IP Address field is IP-tx. A value of the Sender App Data Port field is DPt-tx. A value of the No of Recv App field is one. A value of the Receiver Node IP Address field is IP-rx, and a value of the Receiver App Data Port field is DPt-rx. The user data is stored in a User Data field.

Next, the Sender Application transmits a data packet (step S231). The data packet reaches the AFC Daemon-1 according to values of the Dst IP field and the Dst Port field.

When receiving the data packet, because the value of the AF Index field in the AFC header is zero, the AFC Daemon-1 recognizes that the 0th AF (AF-1) is applied to the User Data. The AFC Daemon-1 confirms that the Sender Application has an authority for executing the AF-1 from the value of the 0th AF Certificate field. The AFC Daemon-1 compares the value of the Sequence Number field in the AFC header with the value of the Sequence Number field in the Seq Num Table related to the AF-1 held by the AFC Daemon-1. In a case where the value in the AFC header is larger than the value in the Seq Num Table, the AFC Daemon-1 inputs the User Data of the AFC header to the AF-1 (step S232). At the same time, the value of the Sequence Number field in the AFC header is substituted to the Sequence Number field in the Seq Num Table. Otherwise, it is determined that the data packet is made by a replay attack, and the data packet is discarded.

The AFC Daemon-1 receives an output of the AF-1 (step S233) and stores the received output in a User Data field of the data packet.

Figure 45:
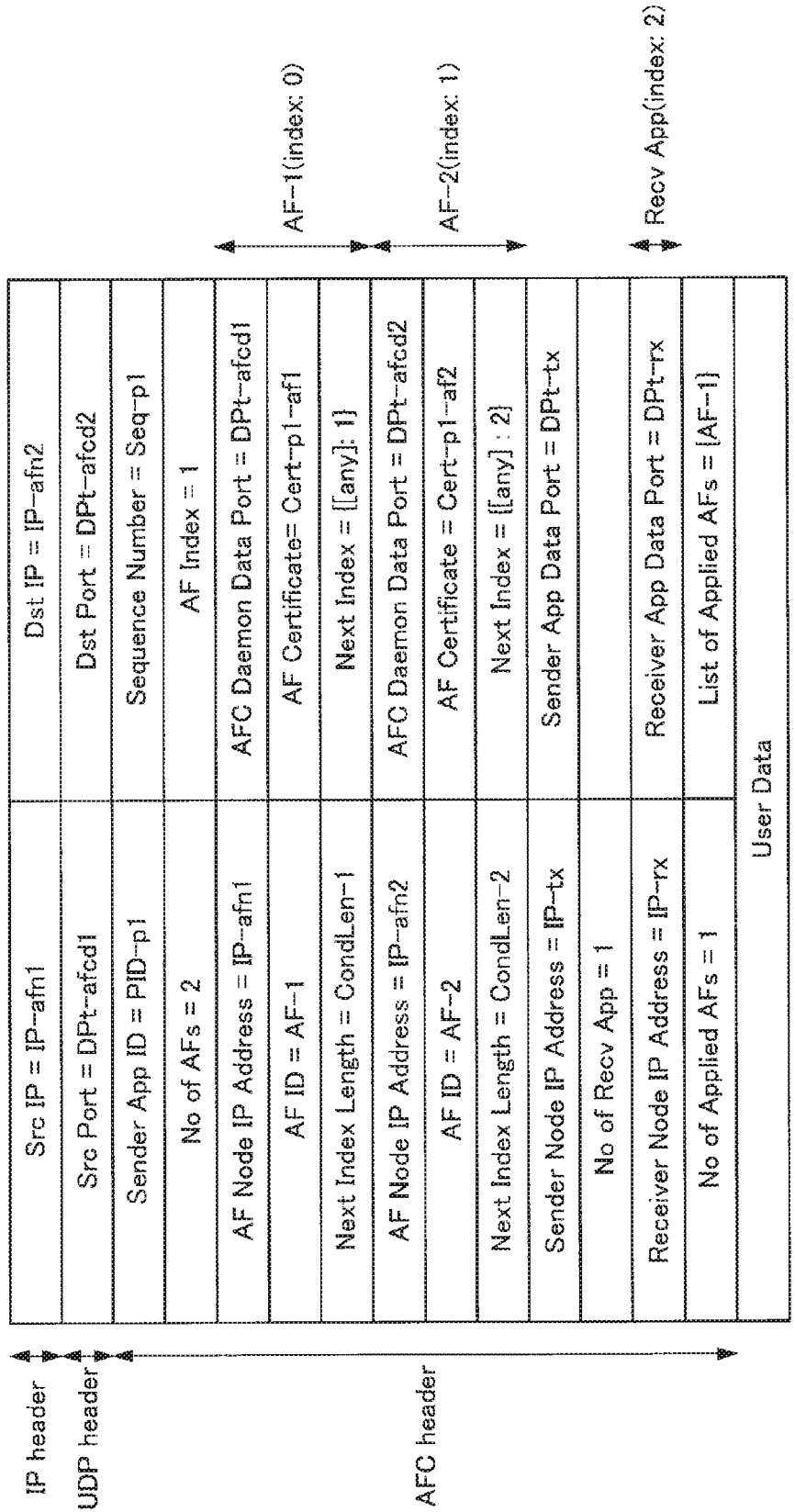
FIG. 45 is an explanatory diagram illustrating an example of the format of the data packet.

Because the 0th Next Index field in the AFC header indicates that a next stage is the first AF (AF-2), the AFC Daemon-1 modifies the AFC header as in FIG. 45. The AFC Daemon-1 sets a value of the Src IP field to IP-afn1, a value of the Dst IP field to IP-afn2, a value of the Src Port field to DPt-afcd1, and a value of the Dst Port field to DPt-afcd2.

Furthermore, the AFC Daemon-1 increments the value of the AF Index field to one. Next, the AFC Daemon-1 transmits a data packet (step S234). The data packet transmitted by the AFC Daemon-1 reaches the AFC Daemon-2 according to the values of the Dst IP field and the Dst Port field.

When receiving the packet, because the value of the AF Index field in the AFC header is one, the AFC Daemon-2 recognizes that the first AF (AF-2) is applied to the User Data. The AFC Daemon-2 confirms that the Sender Application has an authority for executing the AF-2 from the value of the first AF Certificate field. As in step S232, the AFC Daemon-2 confirms that the packet is not a replay attack and inputs the User Data in the data packet to the AF-2 (step S235).

The AFC Daemon-2 receives an output of the AF-2 (step S236) and stores the received output in a User Data field of the data packet.

Figure 46:
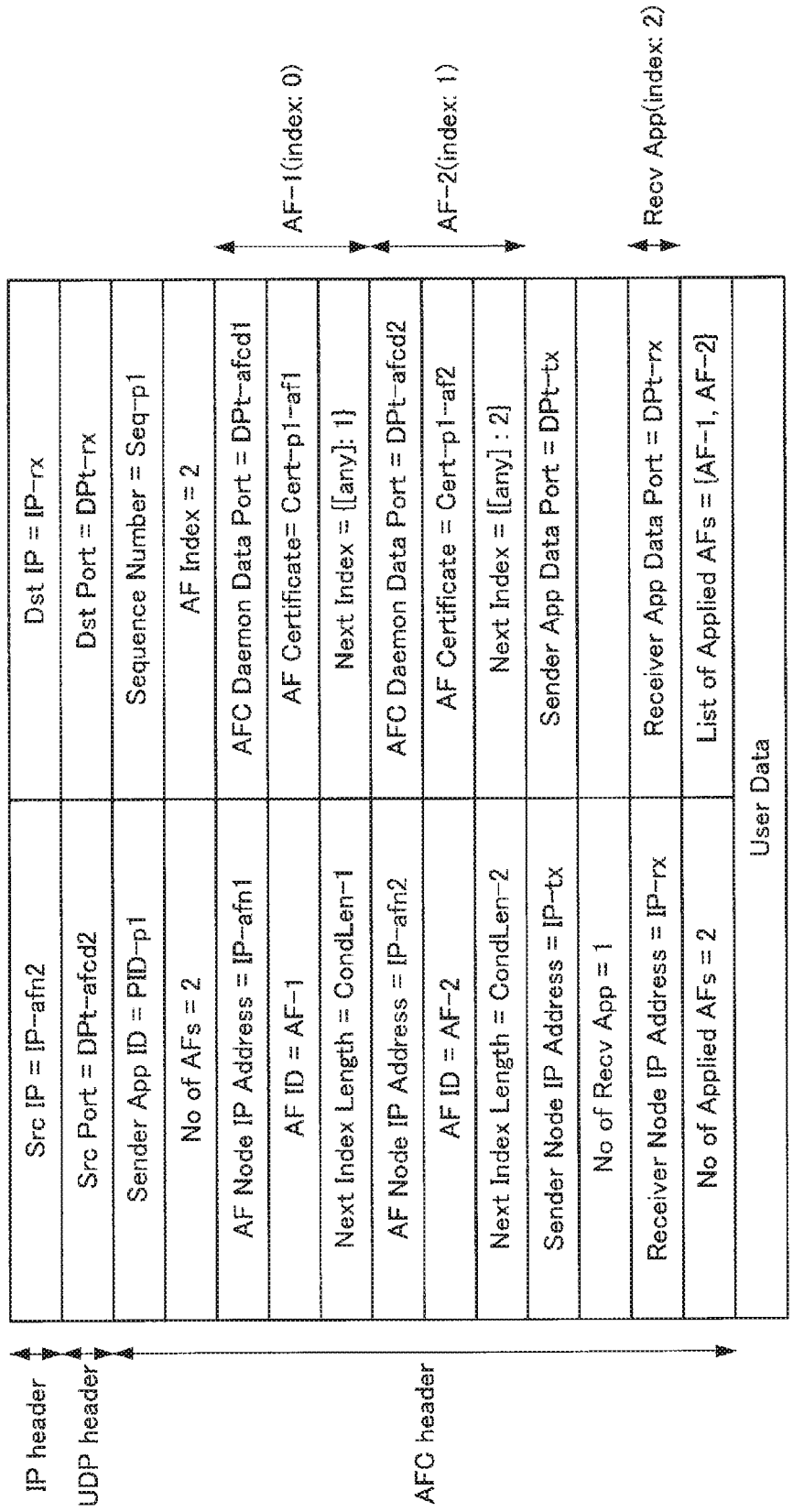
FIG. 46 is an explanatory diagram illustrating an example of the format of the data packet.

A first Next Index field in the AFC header indicates that a next stage is the second (Receiver Application), the AFC Daemon-2 modifies the AFC header as in FIG. 46. The AFC Daemon-2 sets the value of the Src IP field to IP-afn2, the value of the Dst IP field to IP-rx, the value of the Src Port field to DPt-afcd2, and the value of the Dst Port field to DPt-rx. Furthermore, the AFC Daemon-2 increments the value of the AF Index field to two. Next, the AFC Daemon-2 transmits a data packet (step S237). The data packet transmitted by the AFC Daemon-2 reaches the Receiver Application according to the values of the Dst IP field and the Dst Port field.

(Example of AFC Communication Having Branching and Joining)

Figure 47:
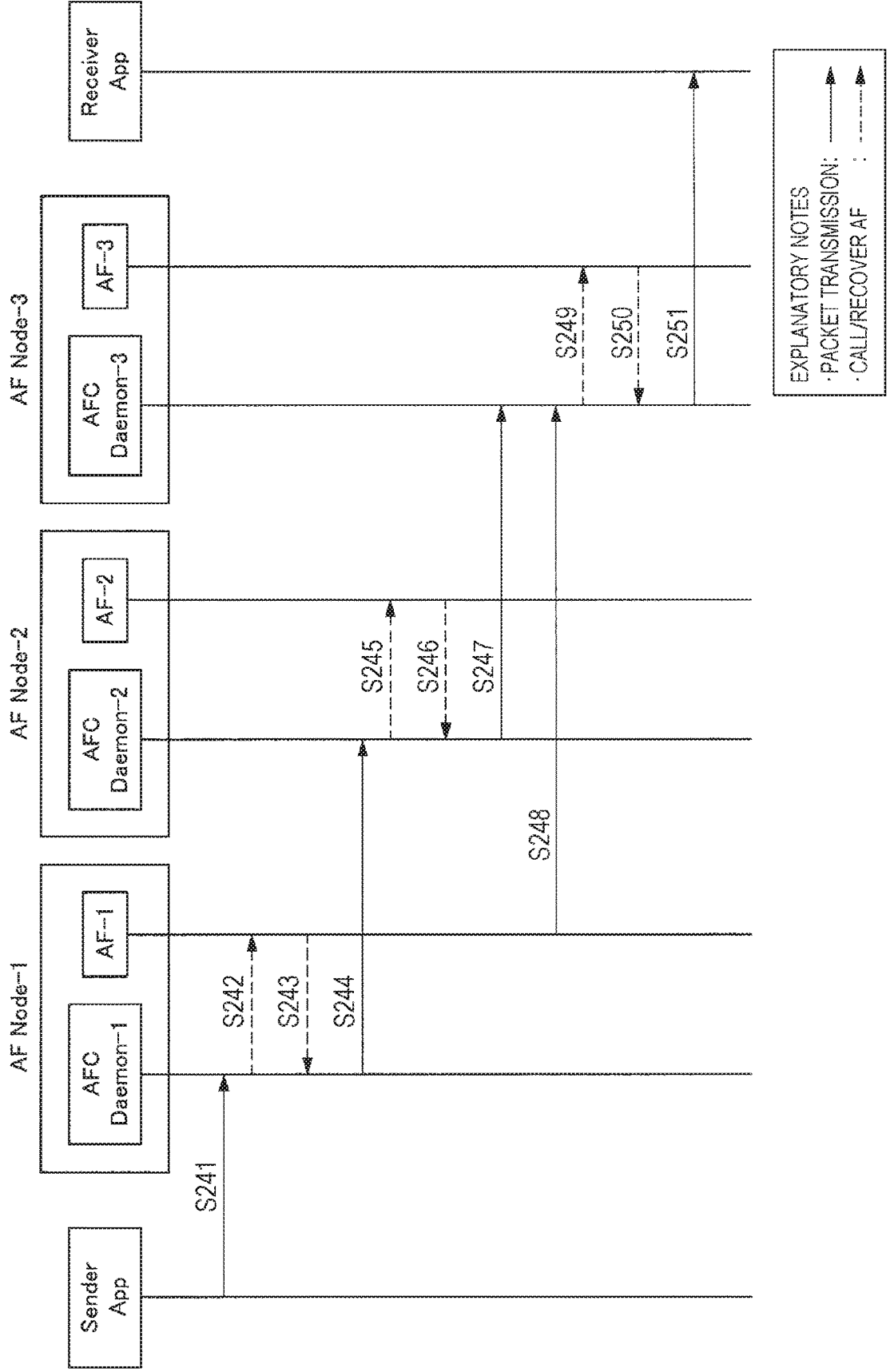
FIG. 47 is flowchart illustrating AFC communication having branching and joining.

Next, a case will be described in which a path is branched on the basis of the result of applying the AF to the user data in the data packet and the branched paths are joined again. In FIG. 47, the user data of the data packet transmitted by the Sender Application is processed by the AF-1 first. Although the path is branched into two paths on the basis of the result of the processing, the two paths are joined at the AF-3 and finally reach the Receiver Application. Although one of the two paths passes through the AF-2, another path does not pass through the AF-2.

Figure 48:
FIG. 48 is an explanatory diagram illustrating an example of the format of the data packet.

The Sender Application generates a packet illustrated in FIG. 48. In this packet, in comparison with the packet illustrated in FIG. 44, the value of the No of AFs field is three, and a field for a second AF (AF-3) is added. Moreover, a value of the Next Index field of the 0th AF (AF-1) is set to "{cond-1:2}, {[any]:1}". This indicates that, in a case where a first one-byte value of the output of the AF-1 satisfies a conditional expression of cond-1, the next stage is the second AF (AF-3). Otherwise, the next stage is the first AF (AF-2). Next, the Sender Application transmits the generated data packet (step S241). The data packet reaches the AFC Daemon-1 according to values of the Dst IP field and the Dst Port field.

When receiving the data packet, because the value of the AF Index field in the AFC header is zero, the AFC Daemon-1 recognizes that the 0th AF (AF-1) is applied to the User Data. The AFC Daemon-1 confirms that the Sender Application has an authority for executing the AF-1 from the value of the 0th AF Certificate field. The AFC Daemon-1 compares the value of the Sequence Number field in the AFC header with the value of the Sequence Number field in the Seq Num Table related to the AF-1 held by the AFC Daemon-1. In a case where the value in the AFC header is larger than the value in the Seq Num Table, the AFC Daemon-1 inputs the User Data of the AFC header to the AF-1 (step S242). At the same time, the value of the Sequence Number field in the AFC header is substituted to the Sequence Number field in the Seq Num Table. Otherwise, it is determined that the data packet is made by a replay attack, and the data packet is discarded.

The AFC Daemon-1 receives an output of the AF-1 (step S243) and stores the received output in a User Data field of the data packet.

Figure 43:
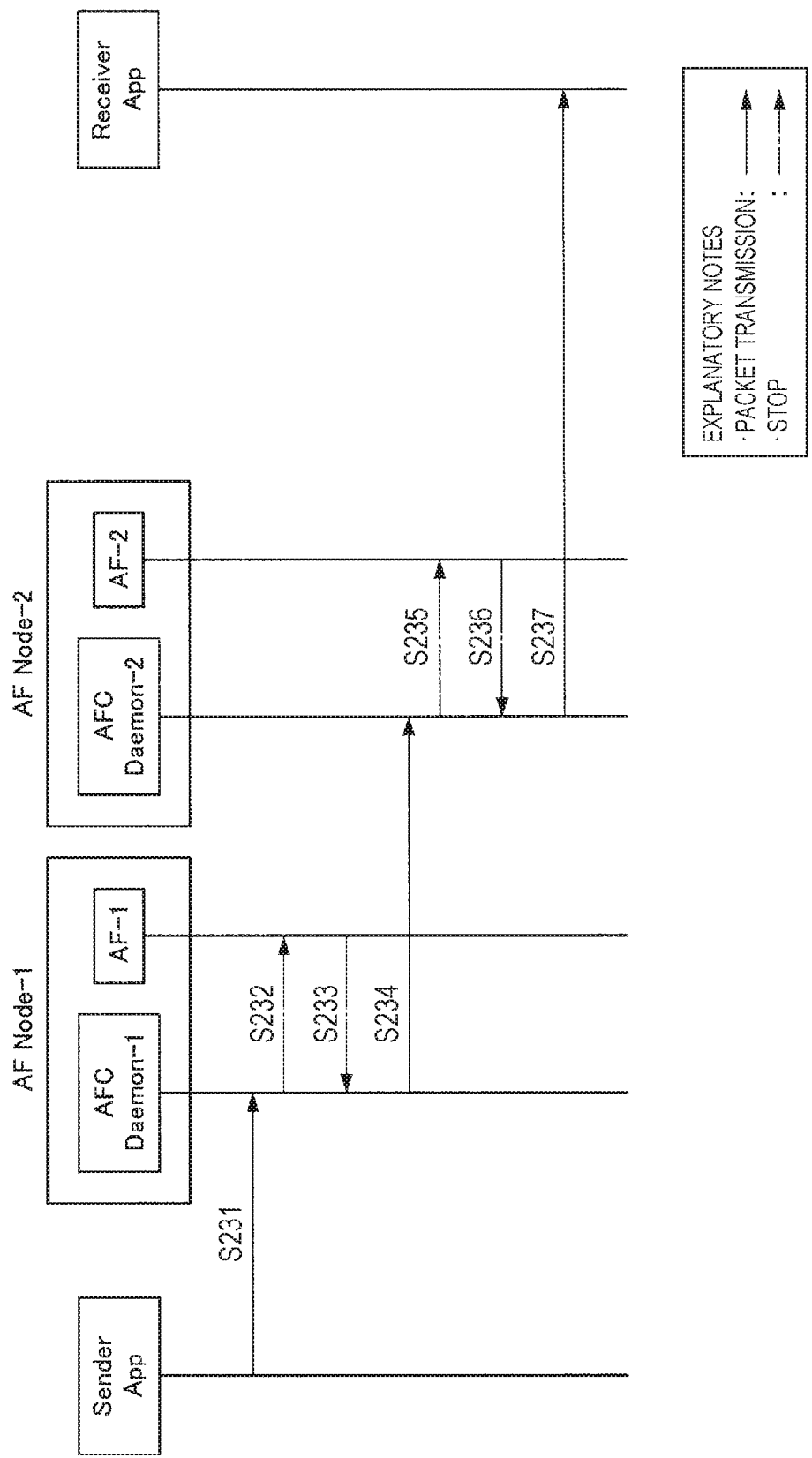
FIG. 43 is a flowchart illustrating an example of linear AFC communication.

In a case where the first one-byte value of the output of the AF-1 does not satisfy the conditional expression of cond-1, as described in steps S234 to S237 in FIG. 43, the packet reaches the Receiver Application via the AF-2 and the AF-3 (steps S244 to S247).

On the other hand, in a case where the first one-byte value of the output of the AF-1 satisfies the conditional expression of cond-1, the AFC Daemon-1 transmits the data packet (step S248). The data packet transmitted by the AFC Daemon-1 reaches the AFC Daemon-3 according to the values of the Dst IP field and the Dst Port field. Thereafter, the packet reaches the Receiver Application via the AF-3 (steps S249 to S251).

(Example of AFC Communication in which Plurality of Receiver Applications Exists)

Figure 49:
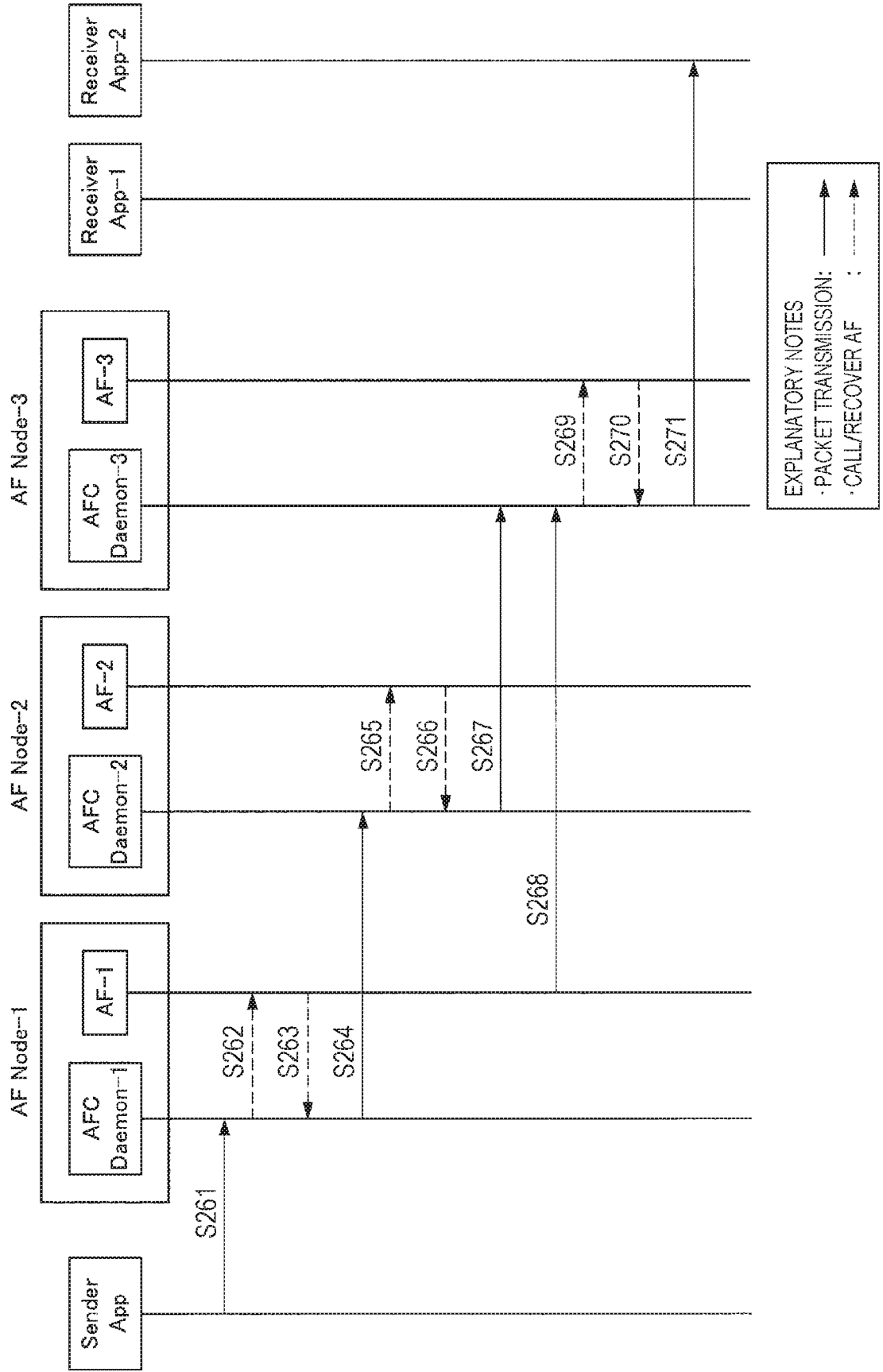
FIG. 49 is a flowchart illustrating an example of AFC communication in which a plurality of Receiver Applications exists.

Next, a case will be described where a data packet transmitted by a single Sender Application is duplicated in the middle and finally reaches the plurality of Receiver Applications. In FIG. 49, a case will be assumed where the Requester Application serves as the Sender Application. A data packet transmitted by the Sender Application first passes through the AF-1 and is duplicated into two pieces. One data packet reaches a Receiver Application-1 via the AF-2. Another data packet reaches a Receiver Application-2 via the AF-3.

Figure 50:
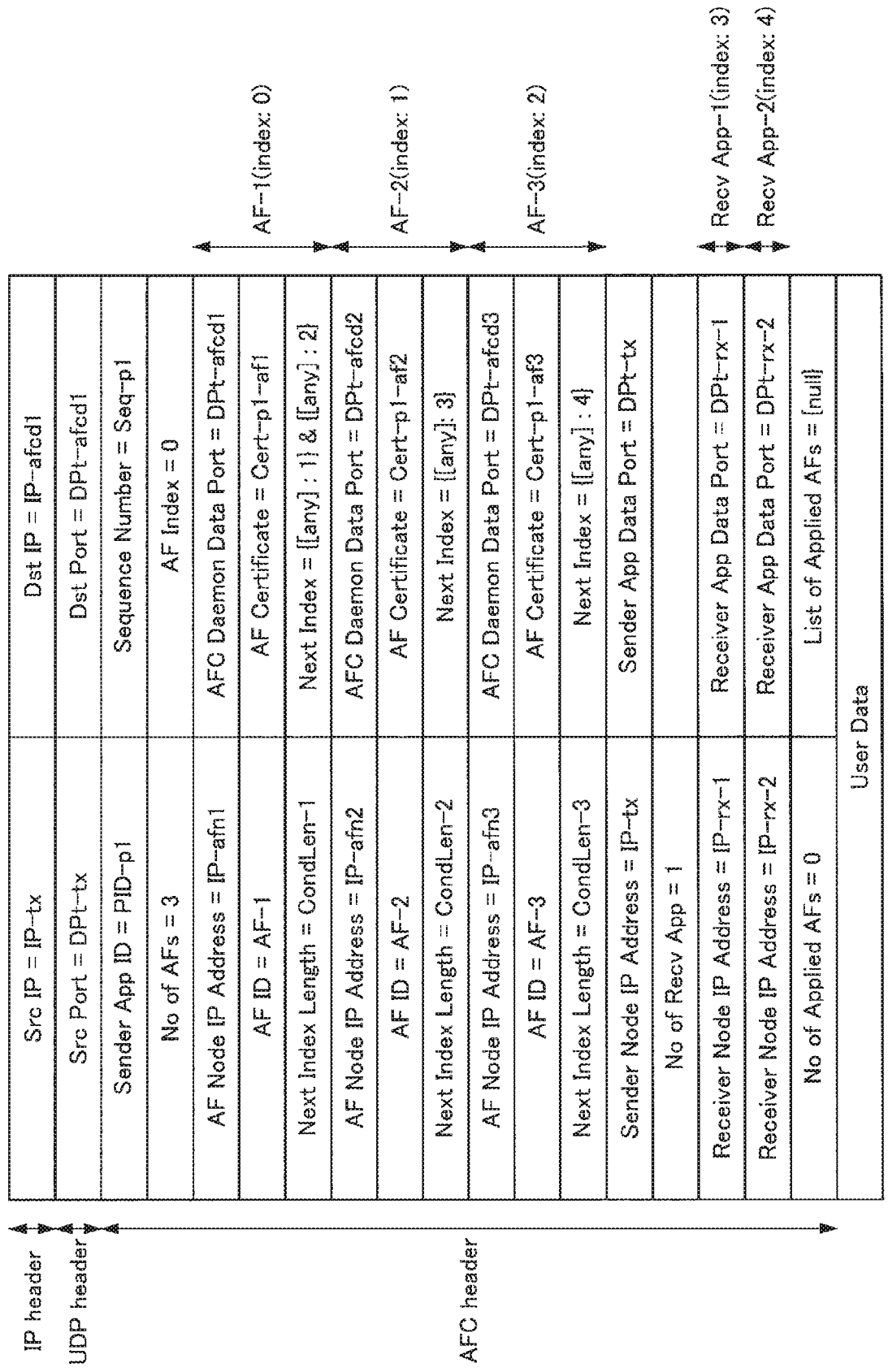
FIG. 50 is an explanatory diagram illustrating an example of the format of the data packet.

The Sender Application generates a data packet illustrated in FIG. 50. In this packet, in comparison with the packet illustrated in FIG. 44, the value of the No of AFs field is three, and a field for a second AF (AF-3) is added. Moreover, a value of the Next Index field of the 0th AF (AF-1) is set to "{[any]:1} & {[any]:2}". This indicates that the data packet is duplicated regardless of the first one-byte value of the output of the AF-1, a next stage of one of the duplicated data packets is set to the first AF (AF-2), and a next stage of another one is set to the second AF (AF-3). Next, the Sender Application transmits the data packet. The data packet reaches the AFC Daemon-1 according to values of the Dst IP field and the Dst Port field (step S261).

In the AFC Daemon-1, as in steps S232 and S233 in FIG. 43, the AF-1 is applied to the User Data of the packet (steps S262 and S263).

The AFC Daemon-1 duplicates the packet into two pieces, and one packet reaches the Receiver Application-1 as in steps S234 to S237 in FIG. 43 (steps S264 to S267). Another packet reaches the Receiver Application-1 as in steps S248 to S251 in FIG. 47 (steps S268 to S271).

(Example of AFC Communication in which Plurality of Sender Applications Exists)

Figure 51:
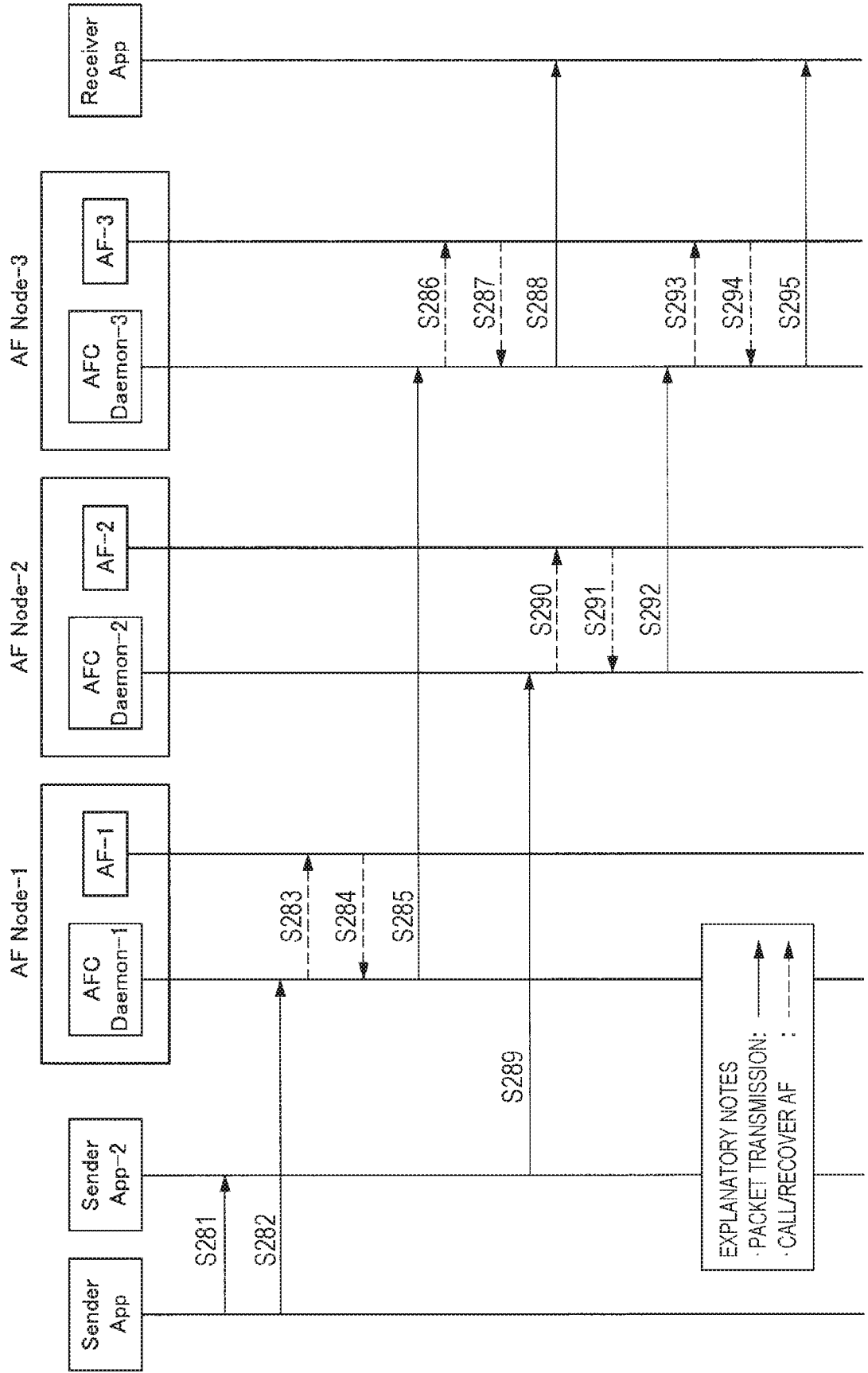
FIG. 51 is a flowchart illustrating an example of AFC communication in which a plurality of Sender Applications exists.

Next, a case will be described where data packets transmitted by the plurality of Sender Applications are joined at the AF in the middle and reach the single Receiver Application. In FIG. 51, a case is assumed where the Requester Application serves as the Sender Application. A packet transmitted by the Sender Application reaches the Receiver Application via the AF-1 and the AF-3. On the other hand, a packet transmitted by a Sender Application-2 reaches the Receiver Application via the AF-2 and the AF-3. An identifier of the Sender Application-2 is assumed to be PID-p2.

Figure 42:
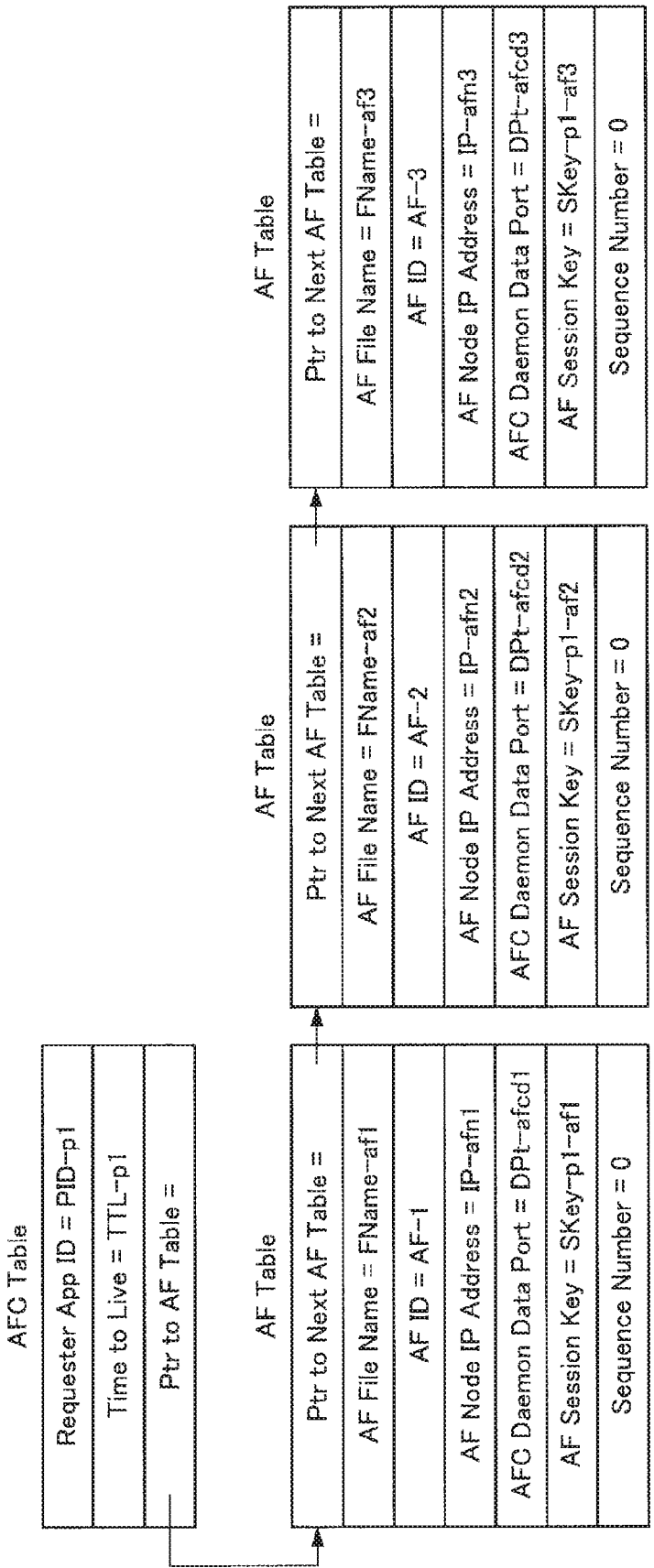
FIG. 42 is an explanatory diagram illustrating an exemplary structure of the table.

The Sender Application transmits content of the table illustrated in FIG. 42 to the Sender Application-2 (step S281). The Sender Application-2 receives and saves the table transmitted from the Sender Application.

Figure 52:
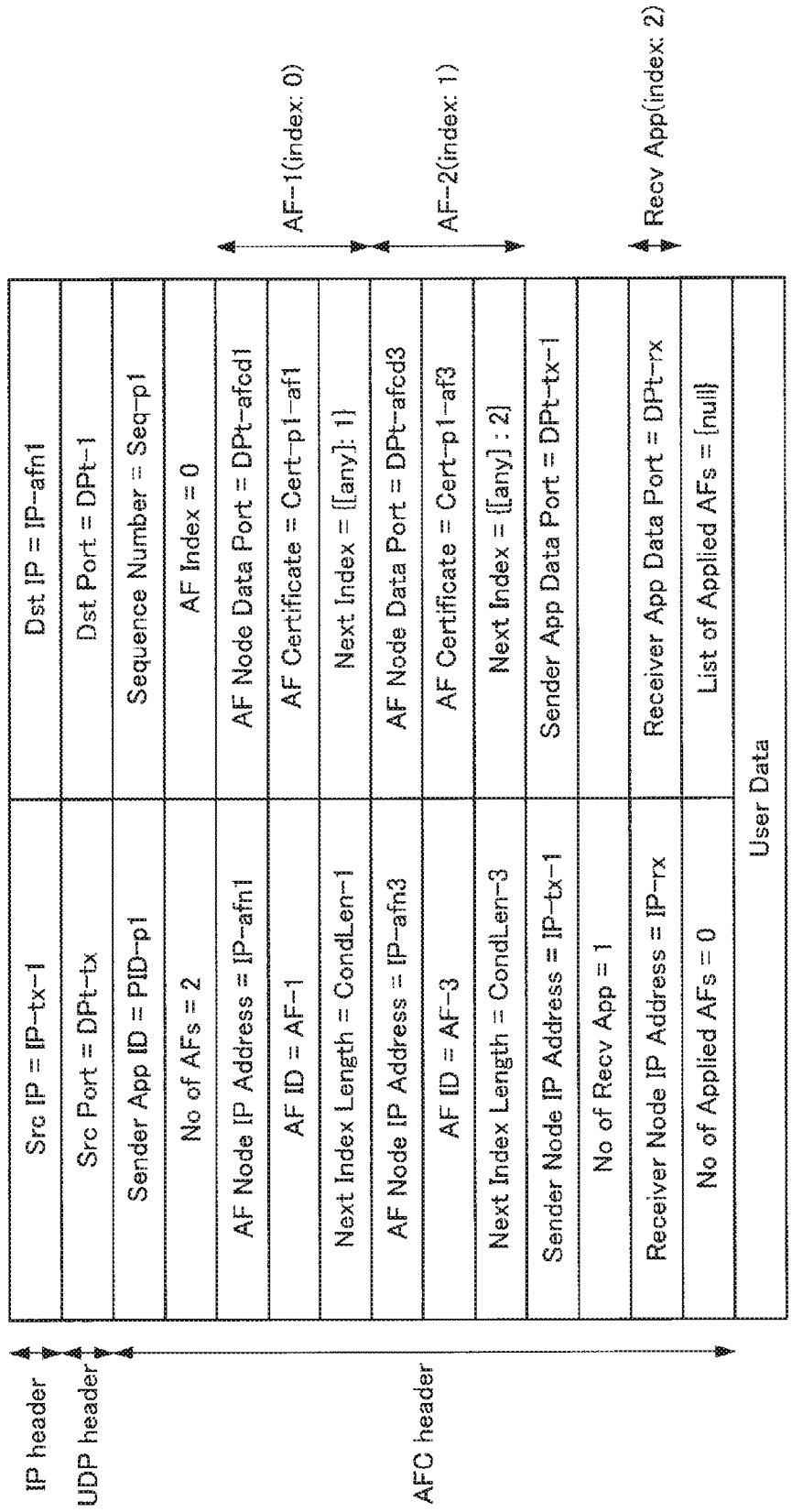
FIG. 52 is an explanatory diagram illustrating an example of the format of the data packet.

The Sender Application generates a data packet illustrated in FIG. 52. This data packet is set to reach the Receiver Application via the AF-1 that operates in the AF Node-1 and the AF-3 that operates in the AF Node-3. Next, the Sender Application transmits the generated data packet (step S282). The data packet reaches the AFC Daemon-1 according to values of the Dst IP field and the Dst Port field. Thereafter, the processing described above is executed by each node so that the packet reaches the Receiver Application (steps S283 to S288).

Figure 53:
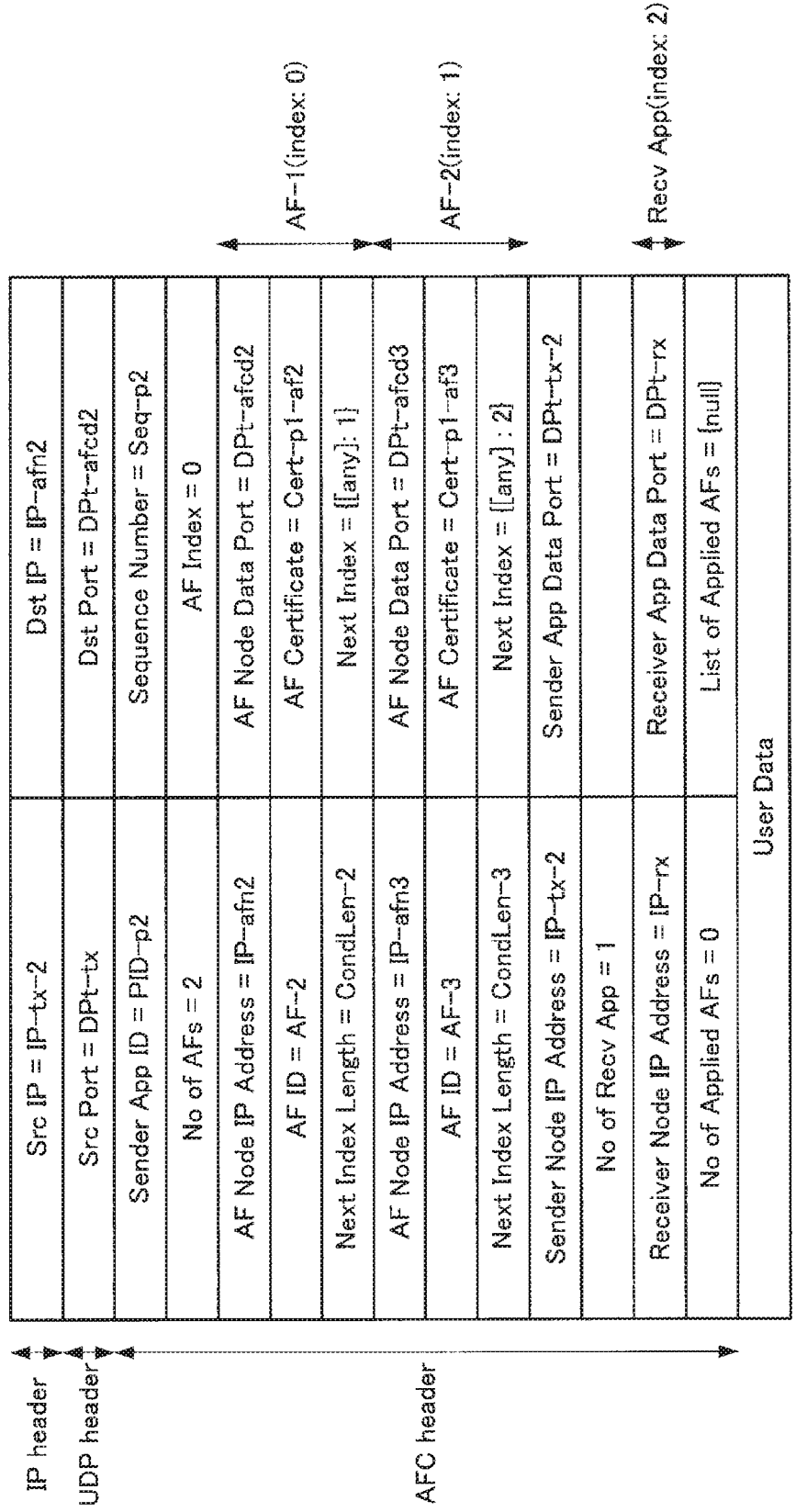
FIG. 53 is an explanatory diagram illustrating an example of the format of the data packet.
Figure 54:
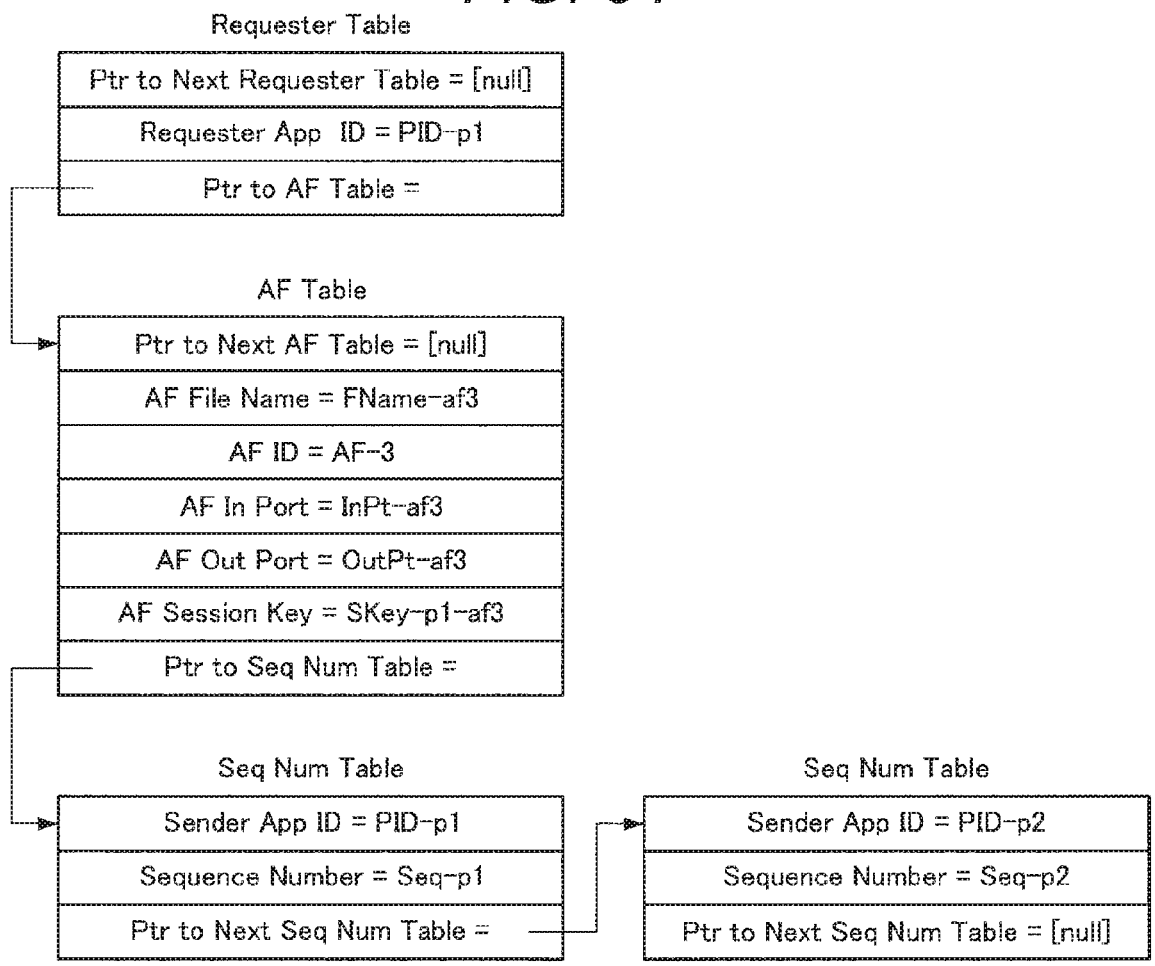
FIG. 54 is an explanatory diagram illustrating an exemplary structure of the table.

The Sender Application-2 generates a data packet illustrated in FIG. 53. This packet is set to reach the Receiver Application via the AF-2 that operates in the AF Node-2 and the AF-3 that operates in the AF Node-3. Next, the Sender Application-2 transmits the generated data packet (step S289). The data packet reaches the AFC Daemon-2 according to the values of the Dst IP field and the Dst Port field. Thereafter, the above described processing is executed by each node so that the packet reaches the Receiver Application (steps S290 to S295). Note that, when the AFC Daemon-3 receives the packet from the Sender Application-2 first in step S292, it can be confirmed that the Sender Application-2 also has an authority for executing the AF-3 from the value of the AF Certificate for the first AF (AF-2). Therefore, the AFC Daemon-3 generates a Seq Num Table related to the Sender Application-2 as illustrated in FIG. 54.

1.3. Exemplary Functional Configuration of Communication Device

Subsequently, an exemplary functional configuration of a communication device that may function as each application or node according to the embodiment of the present disclosure will be described.

Figure 55:
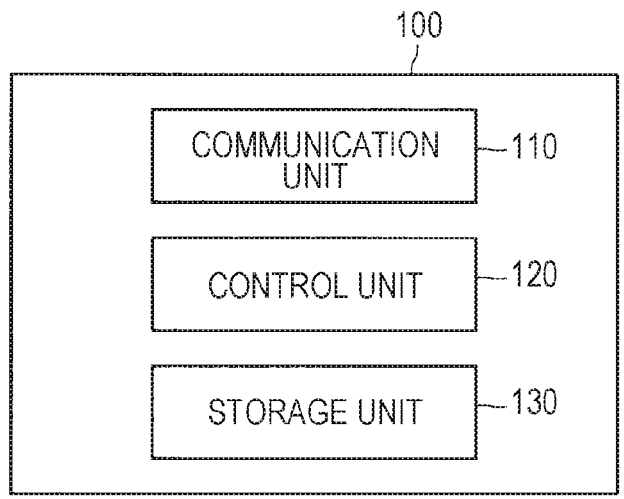
FIG. 55 is an explanatory diagram illustrating an exemplary functional configuration of a communication device.

FIG. 55 is an explanatory diagram illustrating an exemplary functional configuration of a communication device 100 that may function as each node according to the embodiment of the present disclosure. The communication device 100 illustrated in FIG. 55 includes a communication unit 110, a storage unit 120, and a control unit 130.

The communication unit 110 performs communication between the nodes. The communication between the nodes may be wired or wireless. The packet and the message described above from the communication unit 110 are transmitted from a predetermined port and received by a predetermined port to and from the other node under control by the control unit 130.

The storage unit 120 stores various information and programs used for the AFC architecture described above. For example, the storage unit 120 stores the various tables described above. The storage unit 120 may include various memories, HDDs, or the like.

The control unit 130 includes, for example, a processor such as a CPU and executes processing based on the AFC architecture described above. For example, the control unit 130 sets a path to a target node, communicates with a target node, executes processing when an AF node is added, changed, deleted, or the like, activates an AFC Daemon, or executes a function of the AF. That is, in a case where a path between the Sender Node and the Receiver Node changes, the control unit 130 generates a message to newly set an AF. This change may be, for example, a change in a case where the path is branched between the Sender Node and the Receiver Node. Furthermore, this change may be, for example, a change in a case where the AF node is deleted between the Sender Node and the Receiver Node.

If the communication device 100 is a relay node, that is, an AF Node, the control unit 130 may cause the activated function act on the packet received from the other node. Furthermore, if the communication device 100 is the AF Node, the control unit 130 may determine a transfer destination of the packet on the basis of content of the AFC header. Furthermore, if the communication device 100 is the relay node, the control unit 130 may change the content of the AFC header, in particular, may partially change, add, or delete path information recorded in the AFC header, for example. For example, the control unit 130 may change an AF Index recorded in the AFC header or change (substitute) a Sequence Number, for example.

In a case where the communication device 100 is a target node, that is, a Receiver Node, the control unit 130 may transfer the packet received from the other node to an application in an upper layer. Furthermore, in a case where the communication device 100 is a Receiver Node, the control unit 130 may execute processing for generating a packet to be a response to the node that has transmitted the data packet and making a reply to the node. Furthermore, in a case where the communication device 100 is the Receiver Node, before the packet is transferred to the application in the upper layer, the control unit 130 may execute processing for making a function included in the device act on the packet received from the other node on the basis of information written in the AFC header. In a case where the communication device 100 is the Receiver Node, the control unit 130 may combine and execute the processing described above.

2. Summary

As described above, according to the embodiment of the present disclosure, a communication device is provided that can make a single or a plurality of functions desired by a service user act on a packet desired by the service user in a service for transferring a packet in a network.

Each step in the processing executed by each device herein is not necessarily executed along the order described in the sequence diagram or the flowchart in times series. For example, each step in the processing executed by each device may be executed in an order different from the order described as the flowchart or may be executed in parallel.

Furthermore, a computer program can be created that can make hardware such as a CPU, a ROM, a RAM, or the like provided in each device perform a function equivalent to the configuration of each device. Furthermore, a storage medium that stores the computer program can be provided. Furthermore, by configuring each functional block illustrated in a functional block diagram by hardware, a series of processing can be executed by the hardware.

The preferred embodiment of the present disclosure has been described in detail above with reference to the drawings. However, the technical scope of the present disclosure is not limited to the examples. It is obvious that a person who has normal knowledge in the technical field of the present disclosure can arrive at various variations and modifications in the scope of the technical ideas described in claims. It is understood that the variations and modifications naturally belong to the technical scope of the present disclosure.

Furthermore, the effects described in the present specification are merely illustrative and exemplary and not limited. That is, the technology according to the present disclosure may exhibit other effects obvious to those skilled in the art from the description in the present specification together with or instead of the above described effects.

Note that the following configurations belong to the technical scope of the present disclosure.

(1)

A communication device including:

a communication unit configured to communicate with another node; and a control unit configured to control the communication by the communication unit, in which the control unit generates path information with a target node, and in the path information with the target node, at least information regarding communication with at least a single relay node that exists between the communication device and the target node, information regarding a function to be performed by the relay node, and content of processing according to the function execution result by the relay node.

(2)

The communication device according to (1), in which the content of the processing includes selection of a node subsequent to the relay node.

(3)

The communication device according to (1) or (2), in which in the path information with the target node, information regarding authentication authorization by the relay node is further written.

(4)

The communication device according to any one of (1) to (3), in which in a case where the path information with the target node is changed, the control unit generates new path information.

(5)

The communication device according to (4), in which in a case where the path information is changed in order to insert a new relay node between the communication device and the target node, the control unit generates new path information.

(6)

The communication device according to (4), in which in a case where the path information is changed in order to branch a path to the target node, the control unit generates new path information.

(7)

The communication device according to (4), in which in a case where the path information is changed in order to establish a path to a new target node, the control unit generates new path information.

(8)

The communication device according to (4), in which in a case where the path information is changed in order to delete the relay node between the communication device and the target node, the control unit generates new path information.

(9)

The communication device according to any one of (1) to (8), in which the communication unit transmits the path information generated by the control unit to the head relay node written in the path information.

(10)

A communication device including:

a communication unit configured to communicate with another node; and a control unit configured to control the communication by the communication unit, in which the control unit determines whether the communication device is a target node or a relay node by referring to path information transmitted from the other node, when the communication device is the target node, the control unit transfers a packet received from the other node to an application in an upper layer, and when the communication device is the relay node, the control unit makes a function included in the communication device act on the packet received from the other node on the basis of information described in the path information and executes processing on the basis of content written in the path information according to a result of performing the function.

(11)

The communication device according to (10), in which the content of the processing includes selection of a node subsequent to the relay node.

(12)

The communication device according to (10) or (11), in which the control unit activates a function by referring to content registered in a database when a node is set.

(13)

A data structure used in a communication device including;

a communication unit that communicates with another node; and a control unit that controls the communication by the communication unit, in which as path information between the communication device and a target node, at least path information between the communication device and the target node includes at least information regarding communication with at least a single relay node that exists between the communication device and the target node, information regarding a function to be performed by the relay node, and content of processing according to a result of performing the function by the relay node.

(14)

The data structure according to (13), in which the content of the processing includes selection of a node subsequent to the relay node.

(15)

A communication method including:

communicating with another node; and controlling the communication with the other node, in which the control of the communication with the other node includes generation of path information with a target node, and in the path information with the target node, at least information regarding communication with at least a single relay node that exists between a communication device and the target node, information regarding a function to be performed by the relay node, and content of processing according to a result of performing the function by the relay node are written.

(16)

A communication method including:

communicating with another node; and controlling the communication with the other node, in which the control of the communication with the other node includes to determine whether a device is a target node or a relay node by referring to path information transmitted from the other node, when the device is the target node, a packet received from the other node is transferred to an application in an upper layer as the control of the communication with the other node, and when the device is the relay node, a function included in the device is made to act on the packet received from the other node on the basis of information described in the path information, and processing is executed on the basis of the content written in the path information according to the execution result of the function, as the control of the communication with the other node.

(17)

A computer program for causing a computer to execute processing including:

communicating with another node; and controlling the communication with the other node, in which the control of the communication with the other node includes generation of path information with a target node, and in the path information with the target node, at least information regarding communication with at least a single relay node that exists between a communication device and the target node, information regarding a function to be performed by the relay node, and content of processing according to a result of performing the function by the relay node are written.

(18)

A computer program for causing a computer to execute processing including:

communicating with another node; and controlling the communication with the other node, in which the control of the communication with the other node includes to determine whether a device is a target node or a relay node by referring to path information transmitted from the other node, when the device is the target node, a packet received from the other node is transferred to an application in an upper layer as the control of the communication with the other node, and when the device is the relay node, a function included in the device is made to act on the packet received from the other node on the basis of information written in the path information, and processing is executed on the basis of the written content in the path information according to the execution result of the function, as the control of the communication with the other node.

REFERENCE SIGNS LIST

100 Communication device
110 Communication unit
120 Storage unit
130 Control unit

The invention claimed is:

1. A communication device, comprising:

a communication unit; and a control unit configured to:

generate first path information with a first target node, wherein the first path information with the first target node includes:

information regarding communication with at least one relay node between the communication device and the first target node, information regarding a function to be executed by the at least one relay node, and content of processing corresponding to a function execution result of the function executed by the at least one relay node, wherein the content of processing includes information associated with selection of one of a first relay node or a second relay node as a subsequent node of the at least one relay node; and control the communication unit to communicate the generated first path information to the at least one relay node.

2. The communication device according to claim 1, wherein the first path information with the first target node further includes information regarding authentication authorization by the at least one relay node.

3. The communication device according to claim 1, wherein the control unit is further configured to generate second path information based on a change in the first path information with the first target node.

4. The communication device according to claim 3, wherein the control unit is further configured to generate second path information based on insertion of a third relay node between the communication device and the first target node.

5. The communication device according to claim 3, wherein the control unit is further configured to generate second path information based on change in the first path information to branch a path to the first target node.

6. The communication device according to claim 3, wherein the control unit is further configured to generate the second path information based on change in the first path information to establish a path to a second target node.

7. The communication device according to claim 3, wherein the control unit is further to generate the second path information based on deletion of the at least one relay node between the communication device and the first target node.

8. The communication device according to claim 1, wherein the communication unit is further configured to transmit the first path information to a head relay node, and the first path information includes information of the head relay node.

9. A communication device, comprising:

a communication unit; and a control unit configured to:

receive, from a first node, a packet that includes path information;

determine that the communication device is one of a target node or a relay node based on the received path information;

transfer the packet to an application in a specific layer based on the communication device is the target node; and execute, based on the communication device is the relay node, a function on the received packet, wherein the execution of the function is based on the received path information, and execute, based on the communication device is the relay node, a process based on content in the received path information and a result of the execution of the function, wherein
the content includes information associated with selection of one of a first relay node or a second relay node as a subsequent node of the relay node; and control the communication unit to communicate the received path information to the relay node.

10. The communication device according to claim 9, wherein the control unit is further configured to activate the function based on content registered in a database.

11. A data structure used in a communication device, including:
a communication unit; and
a control unit configured to:
generate path information between the communication device and a target node, wherein the path information between the communication device and the target node includes:
information regarding communication with at least one relay node between the communication device and the target node,
information regarding a function to be executed by the at least one relay node, and
content of processing corresponding to a function execution result of the function executed by the at least one relay node, wherein
the content of processing includes information associated with selection of one of a first relay node or a second relay node as a subsequent node of the at least one relay node; and
control the communication unit to communicate the generated path information to the at least one relay node.

12. A communication method, comprising:
generating path information with a target node, wherein the path information with the target node includes:
information regarding communication with at least one relay node between a communication device and the target node,
information regarding a function to be executed by the at least one relay node, and
content of processing corresponding to a function execution result of the function executed by the at least one relay node, wherein
the content of processing includes information associated with selection of one of a first relay node or a second relay node as a subsequent node of the at least one relay node, and
controlling a communication unit to communication the generated path information to the at least one relay node.

13. A communication method, comprising:
receiving, from a first node, a packet that includes path information;
determining that a communication device is one of a target node or a relay node based on the received path information, transferring the packet to an application in a specific layer based on the communication device is the target node, and executing, in a case where the communication device is the relay node, a function on the received packet, wherein the execution of the function is based on information in the received path information, and executing, based on the communication device is the relay node, a process based on a content in the received path information and a result of the execution of the function, wherein
the content includes information associated with selection of one of a first relay node or a second relay node as a subsequent node of the relay node; and controlling a communication unit to communicate the received path information to the relay node.

14. A non-transitory computer-readable medium having stored thereon, computer-executable instructions which, when executed by a processor, cause the processor to execute operations, the operations comprising:
generating path information with a target node, wherein the path information with the target node includes:
information regarding communication with at least one relay node between a communication device and the target node,
information regarding a function to be executed by the at least one relay node, and
content of processing corresponding to a function execution result of the function executed by the at least one relay node, wherein
the content of processing includes information associated with selection of one of a first relay node or a second relay node as a subsequent node of the at least one relay node,
controlling a communication unit to communication the generated path information to the at least one relay node.

15. A non-transitory computer-readable medium having stored thereon, computer-executable instructions which, when executed by a processor, cause the processor to execute operations, the operations comprising:
receiving, from a first node, a packet that includes path information;
determining that a communication device is one of a target node or a relay node based on the received path information,
transferring the packet to an application in a specific layer based on the communication device is the target node, and
executing, in a case where the communication device is the relay node, a function on the received packet, wherein the execution of the function is based on information in the received path information, and
executing, based on the communication device is the relay node, a process based on a content in the received path information and a result of the execution of the function, wherein
the content of processing includes information associated with selection of one of a first relay node or a second relay node as a subsequent node of the relay node; and
controlling a communication unit to communicate the received path information to the relay node.

* * * * *